(12) United States Patent
Fujita et al.

(10) Patent No.: US 7,811,002 B2
(45) Date of Patent: Oct. 12, 2010

(54) ROLLING DEVICE

(75) Inventors: Shinji Fujita, Fukuoka (JP); Hiroyuki Uchida, Samukawa (JP); Yasuo Murakami, Hadano (JP); Koichi Hachiya, Sagamihara (JP); Daiju Takahashi, Setagaya-ku (JP)

(73) Assignee: NSK, Ltd., Tokyo (JP)

( * ) Notice: Subject to any disclaimer, the term of this patent is extended or adjusted under 35 U.S.C. 154(b) by 525 days.

(21) Appl. No.: 11/792,344

(22) PCT Filed: Oct. 5, 2005

(86) PCT No.: PCT/JP2005/018472

§ 371 (c)(1),
(2), (4) Date: Jun. 5, 2007

(87) PCT Pub. No.: WO2006/077682

PCT Pub. Date: Jul. 27, 2006

(65) Prior Publication Data

US 2008/0107369 A1    May 8, 2008

(30) Foreign Application Priority Data

| Jan. 18, 2005 | (JP) | 2005-010068 |
| Feb. 7, 2005 | (JP) | 2005-030547 |
| Feb. 8, 2005 | (JP) | 2005-031766 |
| Feb. 10, 2005 | (JP) | 2005-034398 |
| Feb. 25, 2005 | (JP) | 2005-051133 |
| Mar. 24, 2005 | (JP) | 2005-085730 |
| Mar. 28, 2005 | (JP) | 2005-092375 |
| May 13, 2005 | (JP) | 2005-141339 |
| May 13, 2005 | (JP) | 2005-141340 |
| Jun. 29, 2005 | (JP) | 2005-189962 |

(51) Int. Cl.
*F16C 33/66* (2006.01)

(52) U.S. Cl. .................. 384/463; 384/492; 384/625; 384/907

(58) Field of Classification Search ............... 384/320, 384/463, 596–597, 606, 609, 625, 907, 297–300; 508/108; 427/180, 198
See application file for complete search history.

(56) References Cited

U.S. PATENT DOCUMENTS 3,001,837 A * 9/1961 Lamson et al. ............... 384/463

(Continued)

FOREIGN PATENT DOCUMENTS

EP    1452756 A2 *  9/2004

(Continued)

OTHER PUBLICATIONS

International Search Report dated Jan. 10, 2006 (Three (3) pages).
Form PCT/IB/338, Form PCT/IB/373 dated Jan. 2004 and Form PCT/ISA/237 dated Apr. 2005 (Five (5) pages).

(Continued)

*Primary Examiner*—Marcus Charles
(74) *Attorney, Agent, or Firm*—Crowell & Moring LLP

(57) ABSTRACT

A rolling device in which damage such as seizure or wear is less liable to occur and which has a long life, even when used under severe conditions such as high speed, heavy load, high temperature and insufficient lubrication. A thrust needle roller bearing includes an inner ring 1, outer ring 2, and a plurality of rolling elements 3 rollably arranged between a raceway surface 1*a* of inner ring 1 and a raceway surface 2*a* of outer ring 2. A lubricant film consisting of a solid lubricant is coated over an area equivalent to an area ratio of 75% or more of at least one member of the group consisting of raceway surface 1*a* of inner ring 1, raceway surface 2*a* of outer ring 2, and a rolling contact surface 3*a* of rolling element 3. The thickness of the lubricant film is preferably 0.05 μm or more and 8 μm or less.

10 Claims, 24 Drawing Sheets

U.S. PATENT DOCUMENTS

| | | | |
|---|---|---|---|
| 3,001,838 A * | 9/1961 | Lamson et al. | 384/463 |
| 4,123,122 A * | 10/1978 | Gabrielson et al. | 384/300 |
| 4,293,136 A * | 10/1981 | George | 277/570 |
| 5,222,816 A | 6/1993 | Kondoh et al. | |
| 5,271,679 A * | 12/1993 | Yamazumi et al. | 384/527 |
| 5,845,997 A * | 12/1998 | Kinno et al. | 384/463 |
| 5,927,865 A * | 7/1999 | Ito et al. | 384/625 |
| 6,305,847 B1 * | 10/2001 | Tanaka et al. | 384/297 |
| 6,419,981 B1 * | 7/2002 | Novich et al. | 427/180 |
| 6,523,456 B1 | 2/2003 | Kobayashi et al. | |
| 7,234,873 B2 * | 6/2007 | Kato et al. | 384/463 |
| 7,399,733 B2 * | 7/2008 | Ogihara et al. | 508/108 |

FOREIGN PATENT DOCUMENTS

| | | | |
|---|---|---|---|
| JP | 63072051 A * | 4/1988 | |
| JP | 03-117725 | 5/1991 | |
| JP | 3-172608 A | 7/1991 | |
| JP | 4-282018 A | 10/1992 | |
| JP | 5-126154 A | 5/1993 | |
| JP | 5-209621 A | 8/1993 | |
| JP | 06-042536 | 2/1994 | |
| JP | 06-050343 | 2/1994 | |
| JP | 6-109022 A | 4/1994 | |
| JP | 6-40460 U | 5/1994 | |
| JP | 6-159373 A | 6/1994 | |
| JP | 07-133828 | 5/1995 | |
| JP | 7-243447 A | 9/1995 | |
| JP | 08-074526 | 3/1996 | |
| JP | 09177768 A * | 7/1997 | |
| JP | 2724219 B2 | 11/1997 | |
| JP | 2758518 B2 | 3/1998 | |
| JP | 10089364 A * | 4/1998 | |
| JP | 11-37158 A * | 2/1999 | |
| JP | 2000-34907 A | 2/2000 | |
| JP | 2001-12461 A | 1/2001 | |
| JP | 2001-49274 A | 2/2001 | |
| JP | 2001311427 A * | 11/2001 | |
| JP | 2002-31212 A | 1/2002 | |
| JP | 2002-227848 A | 8/2002 | |
| JP | 2002-339083 A | 11/2002 | |
| JP | 3496286 B2 | 11/2003 | |
| JP | 2004-60742 A | 2/2004 | |
| JP | 8-166021 | 6/2004 | |
| JP | 3567942 B2 | 6/2004 | |
| WO | WO 9823444 A1 * | 6/1998 | |
| WO | WO 01/02712 A1 | 1/2001 | |
| WO | WO 2004/063584 A1 | 7/2004 | |

OTHER PUBLICATIONS

Chinese Office Action dated Jul. 4, 2008 (Four (4) pages).
Japanese Office Action dated Feb. 2, 2010 (three (3) pages).
Office Action in Japanese Patent Application No. 2006-553823 dated May 11, 2010.

* cited by examiner

BEFORE ROTATION TEST

AFTER ROTATION TEST

ROLLING DEVICE

TECHNICAL FIELD

The present invention relates to a rolling device such as a rolling bearing, a linear guide device, a ball screw and a linear motion bearing.

BACKGROUND ART

Generally, in a rolling device such as a rolling bearing, a rolling movement is performed between a rolling element, an outer member and an inner member that constitute a rolling device, and the raceway surfaces of the inner member and the outer member as well as the rolling contact surface of the rolling element receive repeated contact stress. Therefore, the properties required of a material constituting the inner member, outer member and rolling element include hardness, load endurance, a long rolling fatigue life, and favorable wear resistance with respective to sliding.

Thus, as the material constituting these members, SUJ2 according to the Japanese Industrial Standards is generally used as bearing steel, SUS440C according to the Japanese Industrial Standards or 13Cr martensitic stainless steel are generally used as stainless steel, and steels equivalent to SCR420 of the Japanese Industrial Standards are generally used as case hardening steels. To obtain the required properties such as rolling fatigue life, the material is subjected to quenching and tempering in the case of bearing steel or stainless steel, and in the case of case hardening steel the material is subjected to quenching and tempering after carburizing treatment or carbonitriding treatment to acquire a hardness from HRC 58 to HRC 64.

It is known that the rolling fatigue life of a rolling device such as a rolling bearing, a ball screw, a linear guide or a linear motion bearing is closely related to the lubrication state in addition to the aforementioned hardness. As used herein, the term "rolling fatigue life" refers to the total number of rotations until the material wears down and flaking appears on a part of the surface thereof due to the rolling contact surface or raceway surface of the rolling device receiving repeated stress accompanying rotation.

The quality of the lubrication state of the rolling contact surface is represented by an oil film parameter $\Lambda$ (refer to the formula below) as the ratio between the oil film thickness to be formed and surface roughness, where a larger value for $\Lambda$ indicates a better lubrication state. More specifically, when $\Lambda$ is large, surface origin flaking caused by contact between microspikes on the surfaces is less liable to occur and the life is mainly determined by the cleanliness, hardness, material properties, heat treatment and the like of the material. Conversely, it is known that the smaller the value of $\Lambda$, the more likely the occurrence of seizure, peeling damage and surface origin flaking caused by contact between microspikes on the surfaces, and greater the reduction in the life.

$\Lambda = h/\sigma$ h: EHL oil film thickness $\sigma$: composite surface roughness $(\sigma_1^2 + \sigma_2^2)^{1/2}$ $\sigma_1$, $\sigma_2$ represent the roughness of two contacting surfaces (root-mean-square roughness)

This will now be described in further detail taking the example of a radial needle bearing. In a planetary gear bearing that bears a planetary gear that is widely used in transmissions and the like, since a helical gear is generally used so that transmission of force from a planetary gear as an outer member is performed smoothly, as a result of the power relationship the running track of a planetary shaft as an inner member becomes distorted. Consequently, an uneven force acts on a needle roller that is disposed between the planetary gear and the planetary shaft resulting in the occurrence of an edge load or skewing or the like, and thus the life of the bearing decreases and smearing or seizure is liable to occur.

To counteract this problem, conventionally, crowning has been performed for the needle roller to alleviate the edge load, or to prevent skewing the circumferential clearance and radial internal clearance are precisely controlled as a method to suppress the occurrence of skewing before it occurs.

Meanwhile, from the viewpoint of enhancing fuel consumption of engines accompanying $CO_2$ emissions controls, in combination with lowering the viscosity of lubricating oils in order to increase torque at a time of high speed rotation, improved seizure resistance at a time of high speed rotation or improved durability under conditions of lean lubrication are being increasingly demanded for rolling devices. To ensure the lubricity of a needle roller bearing in this kind of usage, for example, the needle roller is provided in multiple rows and a lubrication hole is provided from the shaft end to a position between the needles of the planetary shaft as an inner member, and a lubrication-hole lubricating system is employed that performs lubrication through the lubrication hole. However, when the oil amount is insufficient, there is a risk of a seizure or the occurrence of reeling damage on the rolling contact surface.

As technology to prevent this kind of peeling damage, an automatic transmission bearing has been disclosed (see Patent Document 1) in which a ratio RMS(L)/RMS(C) between axial direction surface roughness RMS(L) and circumferential direction surface roughness RMS(C) is 1.0 or less, a parameter SK value that indicates the degree of distortion in the distribution curve of surface roughness is made a minus value, and the proportion of the surface area occupied by dents is 10 to 40%.

Further, as technology for preventing seizure, a mechanical component provided with a sliding surface that makes a sliding contact action while receiving a thrust load is disclosed in which innumerable independent micro-dents are randomly provided on the sliding surface, the surface roughness of the surface on which the micro-dents are provided is Rmax 0.6 to 2.5 µm, the parameter SK value for surface roughness is −1.6 or less, the mean surface area of micro-dents is 35 to 150 µm², and the proportion of the surface area occupied by micro-dents on the surface is 10 to 40% (see Patent Document 2).

Next, a description is given regarding a ball screw. A ball screw used in a motor-driven injection molding machine or an electrical pressing machine or the like is used at a short stroke at which a heavy load is instantaneously applied, and is used under conditions of reciprocating motion in which the ball screw rotates in reverse after temporarily stopping in a state in which the maximum load acted. For this reason, there is a tendency for the oil film on the ball rolling contact surface to be scraped off, and for it to be difficult for a lubricant to enter the contact surface between the screw groove and the ball, resulting in insufficient oil film formation. There is thus a problem that flaking and abrasion due to surface damage are liable to occur on the rolling contact surface of the ball, the nut and the screw shaft.

In particular, damage is noticeable on contact surfaces of balls that contact with each other when relative slipping occurs at a speed that is double the rolling speed. Further, deformation of the machine stand due to the action of a heavy load or misalignment at the time of fitting make the aforementioned clashing between the balls even more noticeable and reduce the life further.

As a ball screw that can be used for this kind of usage, a ball screw has been disclosed in which fine particles of molybdenum disulfide are injected onto at least one sliding-contact portion among a screw groove, a nut and a rolling element and adhered thereto by collision so as to form a lubricant film with a film thickness of 0.5 μm or less (see Patent Document 3) thereon. Further, Patent Document 4 discloses a material for shot processing of molybdenum disulfide that contains approximately 95 mass % of molybdenum disulfide having an average grain size of approximately 1 μm to 20 μm. This material for shot processing containing molybdenum disulfide is shot at a shot processing speed of 100 m/s or more using a shot peening apparatus.

With respect to the aforementioned planetary bearing and the like, in addition to having a structure that makes it difficult to supply lubricating oil, as the result of a decrease in the size of transmissions or the use of CVTs (Continuously Variable Transmissions) and the like in recent years, there are demands for further acceleration of the maximum speed of revolution of the planetary gear (outer member), and this is considered to be accompanied by a rise in the working temperature. Further, with respect to planetary gear needle bearings, faults such as smearing, seizure, abrasion and peeling have become more noticeable than heretofore as a result of downsizing of the planetary gear needle bearings.

Further, the aforementioned ball screws are being required to bear heavier loads, and because the reciprocating motion stroke is also performed in an even shorter period, an oil film is hardly formed when the ball screw rotates in reverse, and occurrence of abrasion, flaking and seizure due to surface damage on the rolling contact surface of the ball, nut and screw shaft have become more noticeable.

Although the technology disclosed in the aforementioned Patent Document 1 is disclosed as technology that prevents smearing, seizure, abrasion, peeling and the like, further lowering of the viscosity of lubricating oil or insufficient oil levels cannot be adequately dealt with by merely forming indentions to form oil film reservoirs. Further, the technology disclosed in Patent Document 2, similarly to the above technology, cannot adequately deal with further lowering of the viscosity of lubricating oil or insufficient oil levels.

Regarding the ball screw, since it is difficult to obtain a solid lubricant effect when a film is not formed evenly, it is not sufficient to merely specify the film thickness as in the technology disclosed in Patent Document 3. Further, adequate performance can also not be obtained by specifying only the shot material as disclosed in Patent Document 4, and it is necessary to accurately specify the film thickness and the coating state.

An object of the present invention is to solve the problems of the prior art as described above, and provide a rolling device in which failures such as smearing, seizure, abrasion and peeling are less liable to occur even when used under conditions of high speed and a heavy load, and which has a long life.

[Patent Document 1]: Japanese Patent No. 2634495
[Patent Document 2]: Japanese Patent No. 2548811
[Patent Document 3]: JP-A-2004-60742
[Patent Document 4]: JP-A-2002-339083

DISCLOSURE OF THE INVENTION

To solve the above described problems, the present invention is configured as described hereunder. More specifically, a rolling device according to the present invention comprises an inner member having a raceway surface on an outer surface, an outer member having a raceway surface facing the raceway surface of the inner member and disposed outward of the inner member, and a plurality of rolling elements that are rollably disposed between the two raceway surfaces, characterized in that at least one of the group consisting of the raceway surface of the inner member, the raceway surface of the outer member and the rolling contact surface of the rolling element is coated with a lubricant film that consists of a solid lubricant over an area that is equivalent to an area ratio of 75% or more.

According to this configuration, since metal-to-metal contact is inhibited by a lubricant film, for example, even if the rolling device is used in a boundary lubrication environment in which an oil film parameter $\Lambda$ is 3 or less, the occurrence of failures such as smearing, seizure, abrasion and flaking is reduced, resulting in a longer life.

If the area ratio of the section on which the lubricant film is coated is less than 75%, there is a risk that the life of the rolling device will be insufficient. Also, if the area ratio of the section on which the lubricant film is coated exceeds 95%, there is a risk that the oil reservoir effect will decrease somewhat. Although there is a possibility of the lubricant film falling off, particularly in the case of grease lubrication or the like a lubricant film that fell off may sometimes be mixed in grease and act as a solid lubricant. The lubricant film may also be formed on only the surface of one part of a rolling element or the like.

The thickness of the lubricant film is preferably not less than 0.05 μm and not more than 8 μm. This configuration allows the life of the rolling device to be extended. If the thickness of the lubricant film is less than 0.05 μm there is a risk that the lubricity will be insufficient. To make it more difficult for this kind of disadvantage to occur, the thickness of the lubricant film is preferably not less than 0.1 μm, more preferably not less than 0.6 μm, and further preferably not less than 0.9 μm. If the lubricant film thickness exceeds 8 μm there is a risk that the strength of the lubricant film will be insufficient.

Further, dimples of a depth of not less than 0.1 μm and not more than 5 μm may be formed on at least the section on which the lubricant film is coated among the group consisting of the raceway surface of the inner member, the raceway surface of the outer member, and the rolling contact surface of the rolling element.

According to this configuration, since the solid lubricant is filled in the dimples to improve the adherence between the section on which the lubricant film was coated and the lubricant film, the rolling device will have a longer life in comparison to a case without dimples. Further, since the solid lubricant is trapped inside the dimples when the rolling device is driven, the effect of the lubricant film is maintained longer. In order to obtain this effect, it is necessary to make the depth of the dimples no less than 0.1 μm. Since no additional effect can be anticipated even if the depth of the dimples exceeds 5 μm, the depth of the dimples is preferably made no more than 5 μm. In order to make this effect even more reliable, the dimple depth is more preferably made no less than 0.2 μm and no more than 3 μm, and further preferably no less than 0.5 μm and no more than 3 μm. Dimples may also be formed on the surface of the lubricant film in the same manner as described above.

The center line average roughness Ra of the surface of the lubricant film is preferably no more than 1 μm. According to this configuration, as well as a long life, the acoustic characteristics of the rolling device are also favorable. If the center line average roughness Ra exceeds 1 μm, the lubrication conditions become severe and surface origin shot flaking may occur. To make it more difficult for this disadvantage to occur, the center line average roughness Ra is preferably no more than 0.5 μm. Although the lower limit value of the center line average roughness Ra is not particularly limited, a value of 0.1 μm or more is preferable. If the lower limit value is less than 0.1 μm there is a risk that the oil reservoir effect will be decreased by minute asperities. In this connection, the ability to form a lubricant film does not noticeably decrease even when the center line average roughness Ra is a value as described above.

The solid lubricant is preferably at least one kind of lubricant among the group consisting of molybdenum disulfide, tin and copper. In particular, tin is preferable when forming a lubricant film on a rolling section. In this case, the purity of tin is preferably 95% or more, and more preferably 98% or more. When the purity is 95% or more, it is easy to obtain an even lubricant film. According to this arrangement, an effect is obtained that improves at least one member of the group consisting of smearing, seizure, abrasion, peeling and the like at a rolling section in particular.

The present invention can be applied to a variety of rolling devices. Examples thereof include a rolling bearing, a ball screw, a linear guide device and a linear motion bearing. The term "inner member" used according to this invention refers to an inner ring when the rolling device is a rolling bearing, to a screw shaft when the rolling device is a ball screw, to a guide rail when the rolling device is a linear guide device, and to a shaft when the rolling device is a linear motion bearing. Further, the term "outer member" refers to an outer ring when the rolling device is a rolling bearing, to a nut when the rolling device is a ball screw, to a slider when the rolling device is a linear guide device, and to an outer cylinder when the rolling device is a linear motion bearing.

The present invention can also be applied to a cage of a rolling element that is used in a rolling device. For a resin cage that is fabricated by injection molding, by providing protrusions that correspond to the aforementioned dimples in the mold, a resin cage having dimples formed on the surface thereof can be fabricated by an injection molding method.

The present invention can also be applied to a seal that is used in a rolling device. More specifically, a lubricant film as described in the foregoing may be coated on a sliding-contact surface of a seal that contacts with a counterpart member. In this connection, a lubricant film may be coated on the counter part member that contacts the sliding-contact surface of the seal, or a lubricant film may be coated on both the counterpart member and the sliding-contact surface of the seal.

The present invention can also be applied to an inside edge of an inner ring of a rolling bearing, or an outside edge of an outer ring thereof. More specifically, when fitting a rolling bearing between a housing and a shaft, a lubricant film as described above may be coated on a section of the inside edge of the inner ring that contacts with the shaft, or a section of the outside edge of the outer ring that contacts with the housing.

The present invention can also be applied to a retaining piece that is provided between rolling elements in a ball screw, a linear guide device or the like. That is, a lubricant film as described above may be coated on a surface of the retaining piece that contacts the rolling element.

The present invention can also be applied to a clutch friction plate.

Further, the present invention can be applied to a worm of a worm wheel speed reducer that is used in an electric power steering device. More specifically, a lubricant film as described above may be coated on a gear tooth surface of the worm or wheel.

The present invention can also be applied to a telescopic steering shaft. More specifically, in a telescopic shaft for steering a vehicle in which a torque transfer groove that extends in the axial direction of a male shaft and a female shaft that fit together via a spline is formed on an outside edge of the male shaft and an inside edge of the female shaft and a torque transfer pin that engages with the torque transfer groove is disposed between the male shaft and the female shaft, a lubricant film as described above may be coated on at least one member of the group consisting of an outside edge of the torque transfer pin and a groove surface of the torque transfer groove.

Further, the present invention can be applied to a slide member having a sliding surface that makes a sliding contact with respect to a counterpart member. Specific examples of the slide member include a clutch component, a friction plate, a fuel injection device, a piston ring, a cam follower and a cam that comprise an automobile engine, a slide member that comprises a slide bearing, or a retainer for a rolling bearing or for a slide bearing.

BEST MODE FOR CARRYING OUT THE INVENTION

First Embodiment

Figure 1:
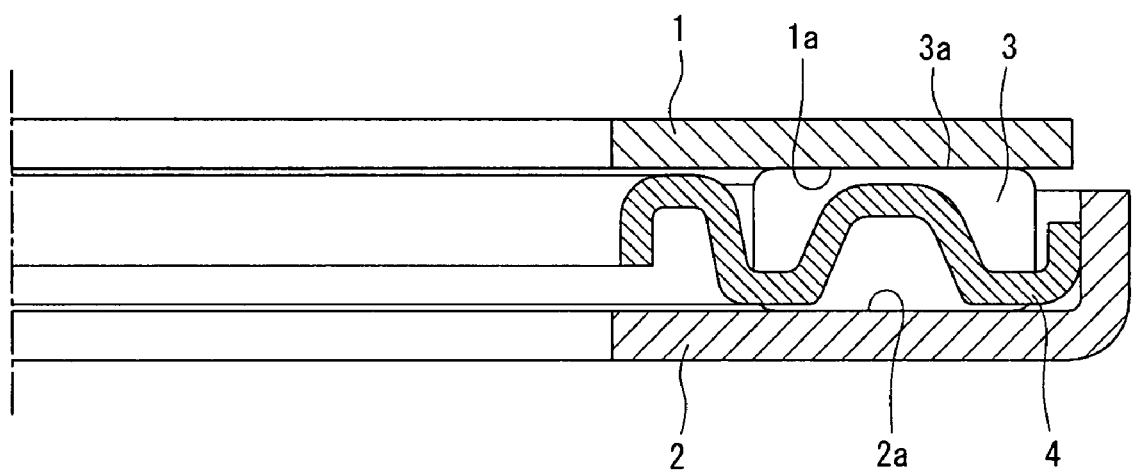
FIG. 1 is a partial longitudinal section showing the configuration of a thrust needle roller bearing as a first embodiment of a rolling device according to the present invention.

FIG. 1 is a partial longitudinal section showing the configuration of a thrust needle roller bearing as a first embodiment of a rolling device according to the present invention.

The thrust needle roller bearing shown in FIG. 1 comprises an inner ring 1 (inner member) that is fixed to an unshown shaft; an outer ring 2 (outer member) that is fixed to an unshown housing; a plurality of rolling elements 3 that are rollably disposed between a raceway surface 1a of the inner ring 1 and a raceway surface 2a of the outer ring 2; and a cage 4 that retains the plurality of rolling elements 3 between the two rings 1 and 2.

A lubricant film (not shown) comprising a solid lubricant is coated on a section that is equivalent to an area ratio of not less than 75% of at least one member of the group consisting of the raceway surface 1a of the inner ring, the raceway surface 2a of the outer ring 2, and a rolling contact surface 3a of the rolling element 3. Preferably, the thickness of this lubricant film is no less than 0.05 μm and no more than 8 μm. Dimples with a depth of no less than 0.1 μm and no more than 5 μm are preferably provided on the section of at least one member of the group consisting of the raceway surface 1a of the inner ring, the raceway surface 2a of the outer ring 2, and the rolling contact surface 3a of the rolling element 3 on which the lubricant film is coated. Further, the center line average roughness Ra of the surface of the lubricant film is preferably no less than 0.1 μm and no more than 1 μm.

Preferably, the ratio (Lr/PCD) between the effective length Lr of the rolling element 3 (needle roller) and the central raceway diameter PCD of the rolling element 3 (needle roller) is no less than 0.1, and a quantity equal to not less than 3 vol % of retained austenite is contained in surface layer portions of the raceway surfaces 1a and 2a.

Since metal-to-metal contact is inhibited by the lubricant film, even when this thrust needle roller bearing is used in a boundary lubrication environment where the oil film parameter Λ is 3 or less, the occurrence of failures such as smearing, seizure, abrasion, peeling and the like is reduced and the bearing has a long life.

Although a thrust needle roller bearing was described as an example of a rolling device according to this embodiment, the kind of rolling bearing is not limited to a thrust needle roller bearing and the present invention can be applied to various kinds of rolling bearings. Examples thereof include a radial rolling bearing such as a deep groove ball bearing, an angular ball bearing, a self-aligning ball bearing, a needle roller bearing, a cylindrical roller bearing, a tapered roller bearing and a self-aligning roller bearing, or a thrust rolling bearing such as a thrust ball bearing and a thrust roller bearing. The present invention is also not limited to a rolling bearing, and can be applied to various other types of rolling devices. Examples thereof include a ball screw, a linear guide device and a linear motion bearing. The present invention can also be applied to a toroidal continuously variable transmission.

EXAMPLES

The first embodiment will now be described specifically with reference to the following examples. Rotation tests were carried out using a variety of thrust needle roller bearings (internal diameter 40 mm, external diameter 70 mm, width 5.5 mm) as test bearings, to evaluate the life of the bearings. The configuration of the thrust needle roller bearings as the test bearings was the same as that of the thrust needle roller bearing shown in FIG. 1 as described above, with the exception that a lubricant film composed by a solid lubricant was coated on only the rolling contact surface of the rolling element among the group consisting of the raceway surface of the inner ring, the raceway surface of the outer ring, and the rolling contact surface of the rolling element.

The coverage ratio, lubricant film thickness and dimple depth for the lubricant film that was coated on the rolling contact surface of the rolling element as well as the center line average roughness Ra of the rolling contact surface of the rolling element are as described in Tables 1 and 2. The method of measuring the area ratio is described later. A dimple depth is not listed for bearings that were not subjected to pretreatment to be described later.

TABLE 1

|  | | Lubricant Film | | | Center | |
|---|---|---|---|---|---|---|
|  | Pretreatment Type[1] | Coverage Ratio[2] | Thickness[3] | Dimple Depth[3] | Line Average Roughness Ra[3] | Life |
| Example 1 | None | 75 | 1.0 | — | 0.10 | 6.0 |
| Example 2 | None | 80 | 0.1 | — | 0.20 | 6.2 |
| Example 3 | None | 85 | 2.0 | — | 0.15 | 6.5 |
| Example 4 | None | 90 | 0.5 | — | 0.20 | 6.3 |

TABLE 1-continued

|  | Pretreatment Type[1] | Lubricant Film | | Center | | Life |
|---|---|---|---|---|---|---|
|  |  | Coverage Ratio[2] | Thickness[3] | Dimple Depth[3] | Line Average Roughness Ra[3] |  |
| Example 5 | None | 92 | 8.0 | — | 0.15 | 6.2 |
| Example 6 | None | 95 | 3.0 | — | 0.30 | 6.1 |
| Example 7 | None | 96 | 0.4 | — | 0.20 | 6.0 |
| Example 8 | None | 100 | 6.0 | — | 0.25 | 5.9 |
| Example 9 | Shot | 75 | 2.0 | 3.0 | 0.20 | 9.0 |
| Example 10 | Shot | 80 | 0.6 | 0.3 | 0.40 | 9.5 |
| Example 11 | Shot | 85 | 0.6 | 0.2 | 0.40 | 10.0 |
| Example 12 | Shot | 90 | 4.0 | 1.0 | 0.20 | 10.0 |
| Example 13 | Shot | 92 | 2.0 | 3.0 | 0.15 | 9.5 |
| Example 14 | Shot | 95 | 1.5 | 2.0 | 0.22 | 9.5 |
| Example 15 | Shot | 95 | 0.2 | 5.0 | 0.25 | 9.3 |
| Example 16 | Shot | 100 | 8.0 | 0.2 | 0.50 | 8.9 |

[1]shot: shot peening process; barrel: barrel treatment
[2]numerical values represent area percentage units
[3]numerical values represent μm units

TABLE 2

|  | Pretreatment Type[1] | Lubricant Film | | Center | | Life |
|---|---|---|---|---|---|---|
|  |  | Coverage Ratio[2] | Thickness[3] | Dimple Depth[3] | Line Average Roughness Ra[3] |  |
| Example 17 | None | 85 | 0.05 | — | 0.20 | 5.4 |
| Example 18 | None | 85 | 10 | — | 0.15 | 5.5 |
| Example 19 | Shot | 85 | 0.05 | 0.2 | 0.30 | 11 |
| Example 20 | Shot | 80 | 10 | 0.3 | 0.25 | 10 |
| Example 21 | Shot | 85 | 0.6 | 0.05 | 0.20 | 11 |
| Example 22 | Shot | 90 | 4.0 | 6 | 0.25 | 12 |
| Comparative Example 1 | Barrel | 0 | — | 0.5 | 0.15 | 1.0 |
| Comparative Example 2 | Shot | 0 | — | 0.2 | 0.15 | 1.0 |
| Comparative Example 3 | None | 0 | — | — | 0.07 | 0.5 |
| Comparative Example 4 | None | 72 | 0.1 | 1.0 | 0.20 | 2.7 |
| Comparative Example 5 | None | 65 | 0.5 | 3.0 | 0.20 | 1.8 |
| Comparative Example 6 | Shot | 72 | 2.0 | 0.2 | 0.15 | 3.8 |
| Comparative Example 7 | Shot | 65 | 0.1 | 0.3 | 0.40 | 2.8 |

[1]shot: shot peening process; barrel: barrel treatment
[2]numerical values represent area percentage units
[3]numerical values represent μm units The method of producing the thrust needle roller bearings as the test bearings will now be described. SUJ2 was used as the raw material for the inner ring, outer ring and rolling element, and after carbonitriding treatment for 3 hours at 840° C. in an atmosphere including RX gas, enriched gas and ammonia gas, oil hardening and tempering was performed. Through this process the amount of retained austenite in the surface layer portion was adjusted to between 15 to 40 vol % and the surface hardness was adjusted to between HRC 62 to 67 (Hv 746 to 900). In this connection, bearings that were subjected to immersion hardening without performing carbonitriding treatment may be used. Further, bearings obtained by using steel such as SCM420 or SCr420 as the raw material, and performing carbonitriding treatment or carburizing treatment to harden the surface may be used.

The rolling contact surfaces of rolling elements obtained in this manner were subjected to pretreatment to form dimples thereon. Although the method of forming dimples is not particularly limited, a shot peening process and a barrel treatment were employed. A shot peening process is carried out using a shot peening apparatus. As the shot material, in addition to steel balls of a mean diameter of 45 μm as stipulated in Japanese Industrial Standard JIS R6001, materials that are harder than the treated surfaces such as SiC, SiO$_2$, Al$_2$O$_3$ and glass beads were used, and the shot material was blasted at the rolling contact surface of the rolling elements under conditions of a blasting pressure of 196 to 1470 kPa and a blasting time of 10 to 20 min. The amount of rolling elements treated at one time was 1 to 6 kg.

In the barrel treatment, a rough-grinding process that forms large asperities on the rolling contact surface of rolling elements and a finish-machining process that regularizes the roughness of a plateau portion are performed using a device in which various media or additives were mixed. In this connection, both a shot peening process and a barrel treatment may be performed for the rolling contact surface of the rolling elements.

Preferably, a material that is harder than the hardness of the treated surfaces is used as the shot material. For example, a ceramic material can be used. Regarding the shape, an object having some corners is more preferable than a spherical shape. By using a shot material that is hard and has corners, an anchor effect with respect to the subsequent lubricant film increases.

The method for measuring the depth of dimples is as follows. The rolling contact surface of the rolling elements was observed over 30 fields of view at a magnification of 100× using a three-dimensional, non-contact surface measurement system, and the obtained images were converted to cross-sectional profiles. The depth of dimples was then measured for five cross sections in the X direction and Y direction, respectively, and the results were averaged.

Next, a lubricant film composed of a solid lubricant was coated on the rolling contact surface of the rolling elements on which dimples were formed. Although a method of coating the lubricant film is not particularly limited, a shot peening process was employed. Tin (mean particle diameter 45 μm) of a purity of at least 98% was used for the solid lubricant as the shot material, and the tin was blasted at the rolling contact surface of the rolling elements under conditions of a blasting pressure of 196 to 1470 kPa and a blasting time of 10 to 20 min. The quantity of rolling elements treated at one time was 1 to 6 kg.

It is possible to form a favorable lubricant film by using the particle diameter of the shot material and the blasting pressure to control the collision energy of the shot material. The particle diameter of the shot material is preferably no less than 1 μm and no more than 20 μm in the case of molybdenum disulfide, and a particle diameter of no less than 1 μm and no more than 5 μm is more preferable. In the case of tin, preferably the particle diameter is no more than 100 μm, more preferably no less than 20 μm and no more than 100 μm, and further preferably no less than 20 μm and no more than 60 μm.

The blasting pressure is preferably no less than 196 kPa and no more than 1470 kPa, and more preferably no less than 392 kPa and no more than 980 kPa. Preferably, the blasting velocity is no less than 100 m/s. The blasting time is preferably 8 min or more or in excess of 8 min, and more preferably is 10 min or more and less than 20 min, or 10 min or more and 20 min or less. If the blasting time is 8 min or more, a lubricant film with a smooth surface (center line average roughness Ra of 0.1 μm or more and 0.5 μm or less) can be formed. To obtain a lubricant film in which the adherability of the solid lubricant is favorable, the center line average roughness Ra (roughness at the stage before coating of the lubricant film) of the surface on which the lubricant film is to be coated is preferably 1 μm or less, and more preferably 0.1 μm or more and 0.5 μm or less.

The method of measuring the area ratio of a lubricant film is as follows. The rolling contact surface of the rolling elements was observed over 30 fields of view at a magnification of 2000× using an electron probe microanalyzer. Square sections having sides of 200 μm each were magnified by 1000× to measure the characteristic X-ray intensity of the tin at five locations, and calculate a mean value for a total of 150 locations. It was thus determined that the lubricant film was coated in regions in which a characteristic X-ray intensity of one tenth of the mean value or more was detected. That result was subjected to image analysis with respect to the 30 fields of view, to calculate the mean value of the area ratio of the lubricant film.

The method of measuring the lubricant film thickness is as follows. Rolling elements were cut, and cross-sections thereof were mirror finished by buffing. The mirror finished cross-sections were observed over 30 fields of view at a magnification of 5000× using a scanning electron microscope (SEM). The lubricant film thickness was measured at five points in each field of view, and the mean value for the total of 150 points as taken as the lubricant film thickness.

Figure 2:
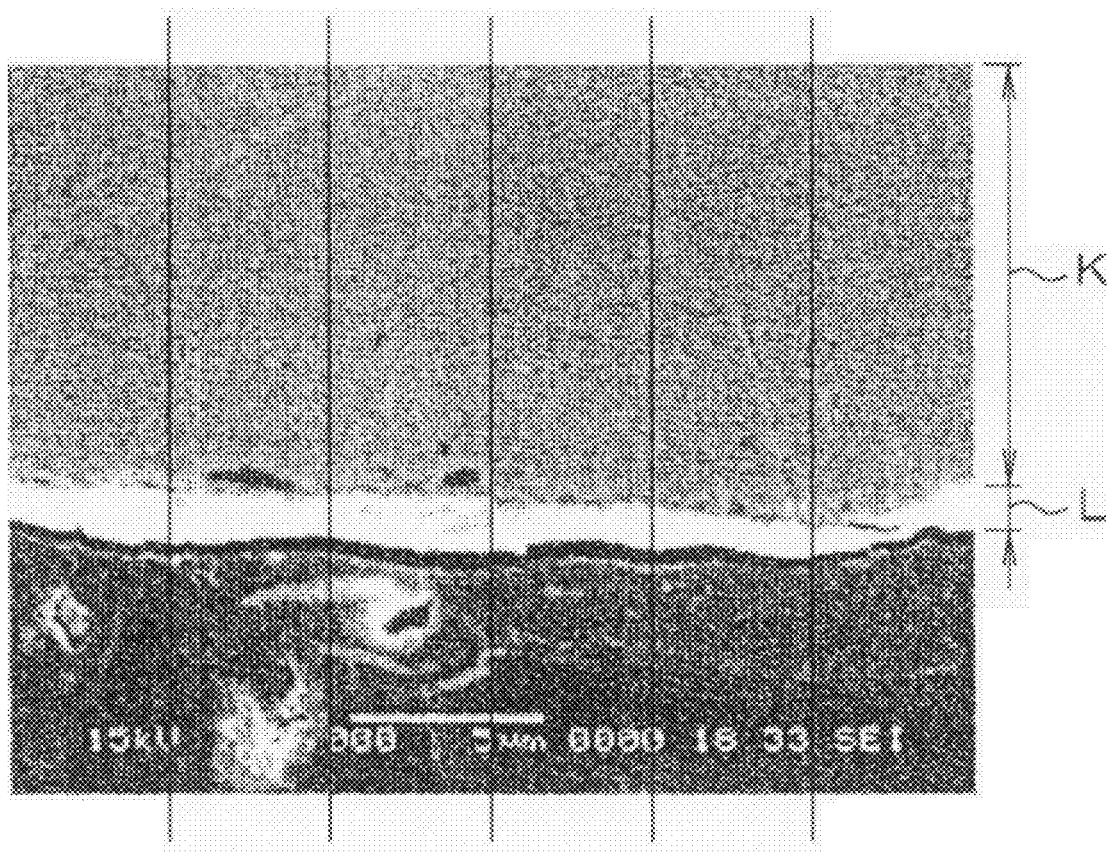
FIG. 2 is a cross section of a lubricant film.

FIG. 2 shows an SEM image of a cross-section of a lubricant film that was coated on the rolling contact surface of rolling elements. The reference character L denotes the lubricant film, and the reference character K denotes the rolling element. The thickness of this lubricant film L is around a maximum of 2.5 μm and a minimum of 0.5 μm.

In this connection, although tin is used as a solid lubricant in this embodiment, the kind of solid lubricant is not particularly limited. Any material may be used as long as it has the required strength when used as a surface film of a rolling component of a rolling device and has good adherence with steel as the raw material of the rolling component, and examples thereof include molybdenum disulfide, tungsten disulfide, boron nitride, metallic soap, fluorocarbon resin, nylon, polyacetal, polyolefin, polyester, polyethylene, PTFE (polytetrafluoroethylene), graphite, calcium fluoride, barium fluoride, fluorocarbide, tin, tin alloy, nickel, copper alloy, pure iron, pure copper, and pure chromium.

When blasting tin, the use of tin with a mean particle diameter of 2 to 6 μm is preferable. By using comparatively large particles, the collision energy is large and adherence is facilitated. Further, since the influence of frictional resistance is comparatively small on the rolling surface, tin that is relatively soft and that easily exerts an anchor effect is preferable.

When the surface hardness was measured using a microhardness meter after coating with the lubricant film, it was found that for the rolling contact surface that was coated with the lubricant film the hardness of a section from the uppermost surface to a depth position of 2 to 15 μm had a gradient. The hardness of the hardest portion was 710 to 1130 Hv, which was an improvement of 5 to 20% in comparison to the hardness of an untreated surface.

Next, the method of evaluating the life by means of a rotation test will be described. The life of the bearings was evaluated using a thrust-type bearing steel life tester as described on pages 10-21 of "Tokushuko Binran (Handbook of Specialty Steels), First Edition", edited by Electrosteelmaking Research Institute and published by Rikogakusha on May 25, 1969 (see FIG. 3). Regarding this tester, an upper fixed portion 22 having a concave in the bottom and a lower fixed portion 23 having a concave in the top are fitted through an O-ring 24 to form a test chamber 21, and the test chamber 21 is sealable. A spindle 25 is rotatably supported on the upper fixed portion 22, and the configuration is such that a test bearing 26 can be disposed between the top surface of the lower fixed part 23 and the underside of a rotating disk portion 25a fitted on the spindle 25.

Figure 3:
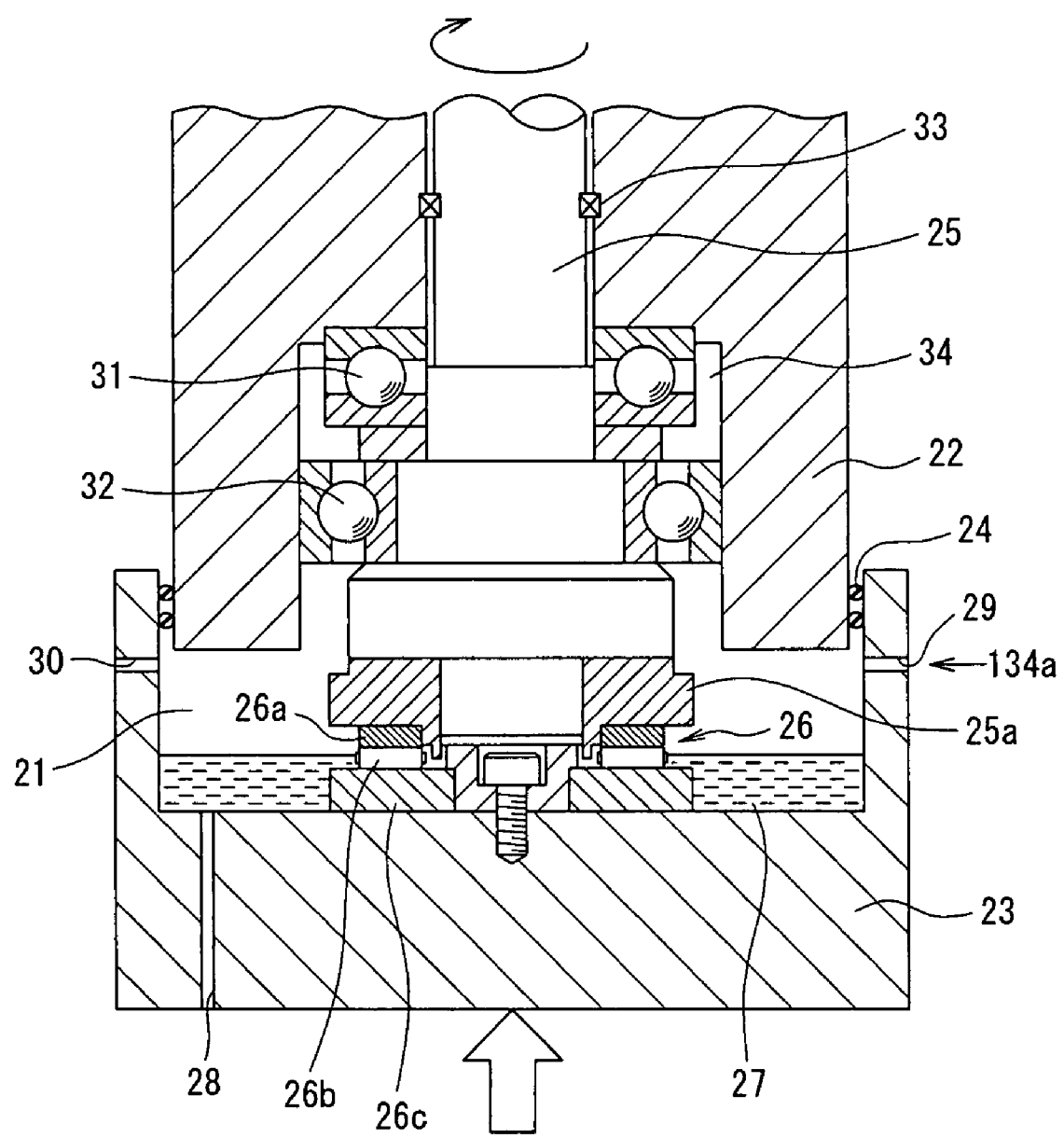
FIG. 3 is a cross section of a testing machine used in a bearing life test.

In FIG. 3, reference numeral 31 denotes a thrust bearing, reference numeral 32 denotes a radial bearing, reference numeral 33 denotes a seal, and reference numeral 34 denotes a spacer. Further, reference numeral 26a denotes an upper race of the bearing, reference numeral 26b denotes rollers and a cage of the bearing, and reference numeral 26c denotes a lower race of the bearing. Reference numeral 27 denotes lubricating oil, and this lubricating oil 27 is supplied into the test chamber 21 via a lubricating oil supply port (outlet) 28. Reference numerals 29 and 30 denote an inlet and outlet for an alternative fluorocarbon, respectively. An alternative fluorocarbon 134a is introduced via the inlet 29 and sucked in with a vacuum pump through the outlet 30, and after the test chamber 21 is filled with the alternative fluorocarbon 134a, the inlet 29 and outlet 30 are closed using valves.

Using the tester described above, thrust needle roller bearings underwent a rotation test under the conditions described hereunder. When the vibration value reached a value that was five times the initial value or when the lower race reached a temperature of 150° C., the rotation test was stopped. In cases where the vibration value reached a value five times the initial value, the presence/absence of damage was confirmed using a stereomicroscope, and when damage was confirmed the life of the sample was regarded as having come to an end, and when no damage was confirmed the rotation test was restarted. Further, in cases where the lower race reached a temperature of 150° C. it was determined that a seizure had occurred, and the life of the sample was regarded as having come to an end.

Rotational speed: 2000 min$^{-1}$

Load: 25% of dynamic load rating (P/C=0.25)

Lubricant: mineral oil for which the ISO viscosity grade is ISO VG10

Oil film parameter Λ: 0.1 to 1.0

Ambient temperature: room temperature (about 28° C.)

Bearing temperature: 100-110° C. at external diameter of lower race

Number of test samples: 10 samples for each bearing type

Figure 4:
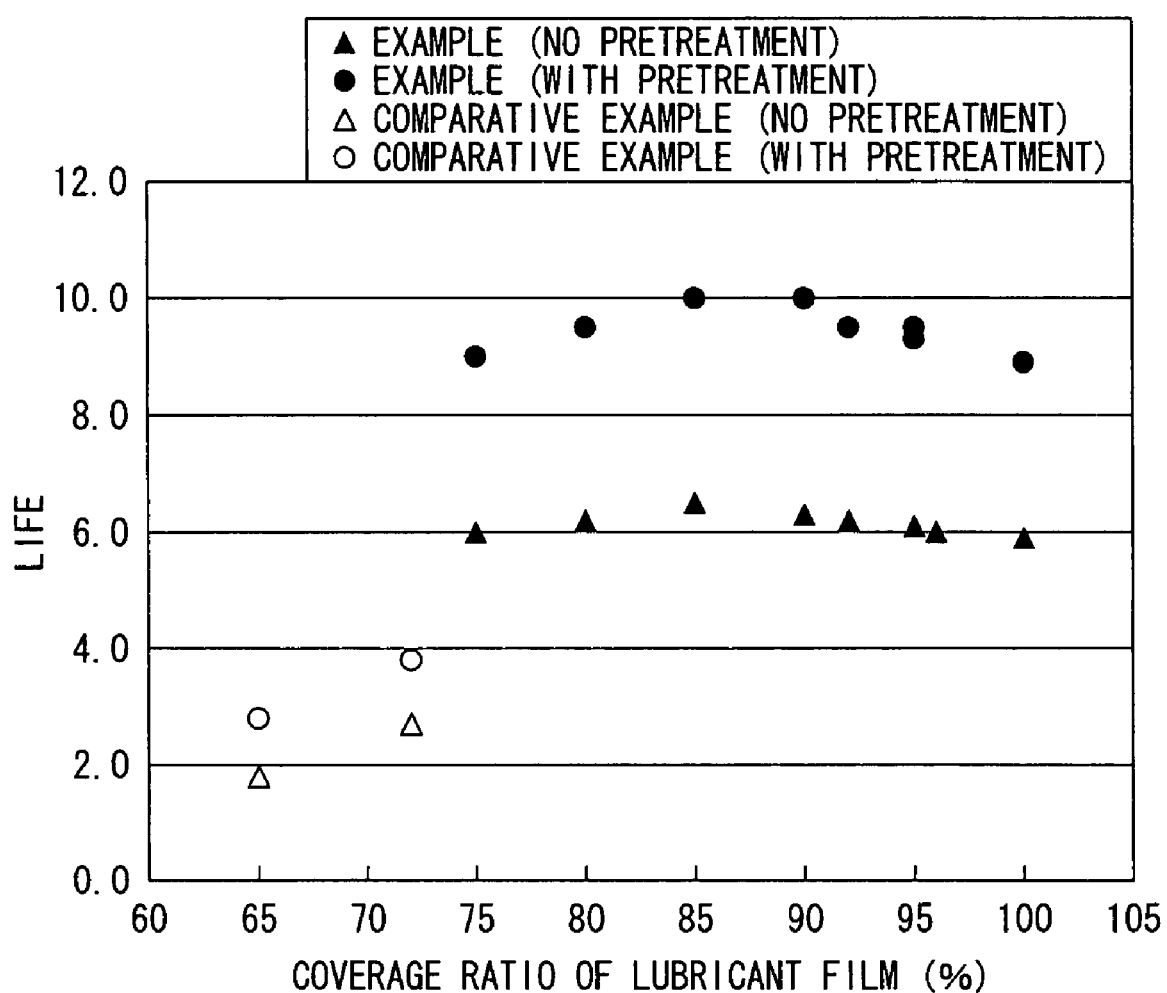
FIG. 4 is a graph illustrating a correlation between the lubricant film coverage ratio and the life of a bearing.

Tables 1 and 2 show the rotation test results (Life). The correlation between the lubricant film coverage ratio and the life of the bearings is illustrated in the graph shown in FIG. 4. The numerical value for the life in Tables 1 and 2 and the graph of FIG. 4 is represented as a relative value when the life of the bearing of Comparative Example 1 is taken as 1.

The samples of Comparative Example 1 are bearings to which the technology described in the aforementioned Patent Document 1 was applied, in which innumerable independent micro-dents were randomly provided on the sliding surface, and the surface roughness of the surface provided with the micro-dents is Rmax 1.0 μm, the parameter SK value of the surface roughness is −2.0, the mean surface area of the micro-dents is 80 μm$^2$, and the proportion of the area of the surface occupied by micro-dents is 25%.

As a pretreatment, the bearings of Comparative Example 1 were subjected to a two-stage barrel treatment, the bearings of Comparative Example 2 were subjected to a two-stage shot peening process, and the bearings of Comparative Example 3 were subjected to ordinary barrel treatment (one-stage barrel treatment).

In Examples 1-22, since the area ratio of the lubricant film coating is no less than 75%, these samples had a markedly longer life (5.9 or more) in comparison to those of Comparative Example 1. In Comparative Examples 4 to 7, although the lubricant film thickness is within the preferable range, the lubricant film coverage ratio is outside the preferable range and these samples had a shorter life than in Examples 1 to 22. It was thus found that stipulation of only the lubricant film thickness is insufficient, and that stipulation of the lubricant film area ratio is important.

Second Embodiment

Preferably, a lubricant film according to the present invention is formed by a shot peening method that accelerates a shot material using an inert gas or an active gas. As an inert gas, one kind or a combination of two or more kinds selected from the group consisting of $N_2$ gas, He gas, Ne gas, Ar gas, Xe gas and Kr gas can be used. Further, one kind or a combination of two or more kinds selected from the group consisting of $CF_4$ gas, $S_2F_6$ gas, $NH_3$ gas, $CH_4$ gas, $C_2H_6$ gas, $C_3H_6$ gas, $C_4H_{10}$ gas, $C_5H_{12}$ gas, RX gas, $O_2$ gas, $H_2$ gas and the like can also be used.

Since it is thus possible to activate the surface of a rolling component with which shot material collided, adherence between the surface and the lubricant film can be enhanced in comparison to the case of accelerating the shot material using atmospheric gas. In particular, by using $N_2$ gas or $NH_3$ gas that forms a nitrided layer on the surface of the rolling component, or $CH_4$ gas, $C_2H_6$ gas, $C_3H_6$ gas, $C_4H_{10}$ gas, $C_5H_{12}$ gas or RX gas that forms a carburized layer on the surface of the rolling component, since the coefficient of friction of the surface decreases the adherence between the surface and the lubricant film can be further enhanced. Further, since a strong adherence can be obtained by carburization, nitriding, or carbonitriding, preferably at least one member selected from the group consisting of $CH_4$ gas, $C_2H_6$ gas, $C_3H_6$ gas, $C_4H_{10}$ gas, $C_5H_{12}$ gas and RX gas is mixed with $NH_3$ gas and used.

In this connection, the inert gas or active gas is used not only for the blast atmosphere that accelerates the shot material at the time of shot peening, and the inside of a hermetically sealed container in which rolling components to be coated with a lubricant film are disposed within the shot peening apparatus is preferably filled with the same kind of gas as that used for the blast atmosphere. It is thereby possible to enhance the adherence between the surface and the lubricant film. Further, the treatment under the various gas environments of this embodiment can also be applied to the shot peening when forming dimple on the surface.

Preferably, the lubricant film thickness is no less than 0.05 μm and no more than 8.0 μm. It is thereby possible to obtain the necessary strength as a rolling component while retaining a favorable lubrication state. If the lubricant film thickness is less than 0.05 μm a favorable lubricity cannot be obtained, and in contrast, if the thickness exceeds 8.0 μm the necessary strength as a rolling component cannot be obtained.

Further, dimples (hereafter, sometimes referred to as "micro-dents") of a depth of no less than 0.10 μm and no more than 5.0 μm are preferably formed on the surface on which the lubricant film is formed. Thereby, lubricant film can be filled into the micro-dents formed on the surface to enable further enhancement of the adherence between the rolling component surface and the lubricant film. If the micro-dents are less than 0.10 μm favorable adherence cannot be obtained, and in contrast, if the micro-dents exceeds 5.0 μm the obtained effect is saturated.

The method for forming micro-dents on the surface of the rolling components is basically the same as in the first embodiment. In particular, in order to improve the hardness of the surface of the rolling components after formation of the micro-dents and to further extend the rolling fatigue life, preferably the micro-dents are formed by a shot peening method and have a surface hardness equivalent to HRC 58 or more.

Further, the surface on which the lubricant film was formed preferably has a center line average roughness (Ra) of no less than 0.10 μm and no more than 1 μm, and more preferably no less than 0.1 μm and no more than 0.5 μm. Thereby, the adherence between the rolling component surface and the lubricant film can be further enhanced. If the center line average roughness (Ra) of the surface is less than 0.10 μm the adherence between the surface and the lubricant film will be inadequate, and in contrast, if it exceeds 1 μm the lubrication conditions will become severe and surface origin flaking is liable to occur.

The metallic raw material for forming rolling components such as an inner member, outer member and rolling element is not particularly limited, and example thereof include a material obtained by performing carbonitriding, quenching and tempering on a bearing steel such as SUJ2, or a material obtained by performing quenching and tempering (immersion quenching) on a bearing steel such as SUJ2, or a material obtained by performing carbonitriding, carburization, quenching and tempering on a stainless steel such as SCM420 or SCr420.

Further, rolling component surfaces on which a lubricant film is to be formed are not particularly limited as long as they include surfaces on which damage due to a lubrication failure is liable to occur. Examples thereof include the raceway surfaces of an inner member and an outer member, the inside and outside edges of an inner member and an outer member, and a rolling contact surface of a rolling element.

A material to be used as the raw material of the lubricant film is not particularly limited, and any material may be used as long as it has the required strength when used as a surface film of a rolling component of a rolling device and has good adherence with steel as the raw material of the rolling component. For example, molybdenum disulfide, tungsten disulfide, boron nitride, metallic soap, fluorocarbon resin, nylon, polyacetal, polyolefin, polyester, polyethylene, PTFE (polytetrafluoroethylene), graphite, calcium fluoride, barium fluoride, fluorocarbide, tin, tin alloy, nickel, copper alloy, pure iron, pure copper, and pure chromium may be mentioned.

As formation methods that are applicable even under a gas environment for the lubricant film as described above, for example, coating, baking, thermal spraying, sputtering, ion plating, and shot peening may be mentioned. In particular, in consideration of enhancing the hardness of the rolling component surface after a lubricant film was formed, application of a shot peening method is preferable.

With this kind of rolling device, by forming a lubricant film of a specific area ratio on the surface of at least one member of the group consisting of an inner member, an outer member and a rolling element, it will be harder for surface damage to occur. Hence the rolling fatigue life of the rolling device can be extended even when the rolling device is used in an environment with a poor lubrication state in which the oil film parameter Λ is 3 or less. Further, since the adherence between the lubricant film and the surface of at least one member of the group consisting of the inner member, the outer member and the rolling element can be enhanced by further specifying the method of forming the lubricant film, the film thickness and the shape of the surface on which the lubricant film is formed, the rolling fatigue life can be further extended and acoustic faults or vibrational faults due to peeling of the lubricant film can be effectively suppressed.

Hereunder, the second embodiment is described while referring to the drawings. First, a bearing similar to the thrust needle roller bearing shown in FIG. 1 were manufactured as described below. The bearing dimensions of this thrust needle roller bearing were set as an internal diameter of 40 mm, an external diameter of 70 mm, and a width of 5.5 mm.

More specifically, first raw material comprising high-carbon chromium bearing steel type 2 (SUJ2) was processed into a predetermined shape, subjected to carbonitriding for 3 hr in a mixed gas atmosphere (RX gas+enriched gas+ammonia gas) of 840° C., and then subjected to oil hardening and tempering. The amount of retained austenite in the respective surface layer portions (portion from surface to depth of 250 μm) of the inner ring, outer ring and needle roller was then adjusted to 15 to 40 vol %, and the hardness of the surface layer portions was adjusted to HRC 62 to 67 (Hv 746 to 900).

Next, the treatment described below was carried out for needle rollers obtained in this manner, to complete needle rollers Nos. 1 to 31 shown in Table 3. First, the needle rollers for which "Yes" is described in the pretreatment column shown in Table 3 were subjected to pretreatment that forms micro-dents (dimples) on the surface thereof.

The term "shot A" in the pretreatment column shown in Table 3 denotes treatment that formed dimples on the surface of the needle rollers by blasting SiC having a mean particle diameter of 45 μm as defined by JIS R6001 as shot material by accelerating with $N_2$ gas under conditions of a blasting pressure of 196 to 1470 kPa and a blasting time of 10 to 20 min using a shot peening apparatus.

The term "shot B" in the pretreatment column shown in Table 3 denotes treatment that formed dimples on the surfaces of the needle rollers by blasting two kinds of shot material of different particle diameters (alumina having a mean particle diameter of 3 μm and steel balls having a mean particle diameter of 45 μm as defined by JIS R6001) by accelerating with atmospheric gas under conditions of a blasting pressure of 196 to 1470 kPa and a blasting time of 10 to 20 min using a shot peening apparatus.

Further, the term "barrel" in the pretreatment column shown in Table 3 denotes treatment that formed dimples on the surfaces of the needle rollers by mixing a variety of media and additives to perform a rough-grinding process that forms large dimples on the surfaces in atmosphere, and thereafter performing a finish-machining process that regularizes the roughness of a plateau portion (flat portion) in atmosphere.

Thereafter, the depth of dimples on the surface of the needle rollers after pretreatment was measured in the following manner. First, observation of 30 fields of view was conducted at a magnification of 100× using a three-dimensional, non-contact surface shape measuring system. Next the obtained images were converted to cross-sectional profiles, and the mean value of results obtained by measuring five cross sections in the X and Y directions, respectively, were calculated. These results are also shown in Table 3.

The center line average roughness (Ra) on the surfaces of the needle rollers after pretreatment and the needle rollers that did not undergo pretreatment were respectively adjusted so as to be no less than 0.10 μm and no more than 5.0 μm. Next, a lubricant film was formed on the surface of the needle rollers. More specifically, a lubricant film was formed on the surfaces of the needle rollers by blasting tin (purity of at least 98%, mean particle diameter of 45 μm) as a shot material by accelerating with $N_2$ gas under conditions of a blasting pressure of 196 to 1470 kPa and a blasting time of 10 to 20 min using a known shot peening apparatus.

Thereafter, the area ratio and film thickness of the thus formed lubricant film was measured in the same manner as the first embodiment. Further, the hardness of needle rollers after formation of the lubricant film was measured in the same manner as in the first embodiment, and an improvement of 5 to 20% in the hardness was confirmed.

Although the needle rollers denoted by No. 25 and No. 26 shown as comparative examples in Table 3 were subjected to pretreatment (shot peening or barrel) to form dimples, a lubricant film was not formed thereon. The needle rollers denoted by No. 27 shown as a comparative example in Table 3 was not subjected to pretreatment and formation of a lubricant film. Further, a lubricant film having an area ratio outside the range of the present invention was formed on the needle rollers denoted by Nos. 28 to 31 shown as comparative examples in Table 3.

Next, thrust needle roller bearings were assembled using inner rings, outer rings and needle rollers obtained in this manner, and cages made of SPCC. A life test was then performed for these thrust needle roller bearings under the conditions shown below that assumed the use thereof in an environment of a poor lubrication state in which the oil film parameter Λ was 3 or less.

This life test was carried out using the thrust-type life tester shown in FIG. 3 that was used in the test of the first embodiment. The life test was performed by rotating the thrust needle roller bearing until the vibration value reached five times the initial vibration value or until the temperature of the external diameter of the outer ring reached 150° C., and the time from the start of the test to the end was taken as the life of the bearing.

This life test was performed 10 times in each example to calculate the average life of the respective samples. The results are shown in Table 3 as ratios with respect to a case in which the life of a thrust needle roller bearing using a needle roller denoted by No. 25 as a comparative example is taken as 1.

dimples is 1.0 μm, the parameter (SK value) of the surface roughness is −2.0, the mean surface area of the dimples is 80 μm$^2$, and area ratio of the dimples is 25%.

In this case, for thrust needle roller bearings for which the test was stopped when the vibration value reached five times the initial vibration value, the presence or absence of damage was confirmed with a stereomicroscope and if damage was observed the test was ended and the time from the start of the test until the vibration value reached five times the initial vibration value was regarded as the life of the bearing, and if damage was not observed the test was restarted.

Further, for thrust needle roller bearings for which the test was stopped when the external diameter temperature of the outer ring reached 150° C., it was considered that damage had occurred due to seizure and the test was ended, and the time from the start of the test until the external diameter temperature of the outer ring reached 150° C. was regarded as the life of the bearing.

<Life Test Conditions>
Load: 12% of dynamic load rating (P/C=0.12)
Rotational speed: 8000 min$^{-1}$
Lubricating oil: mineral oil VG10
Ambient temperature: room temperature (about 28° C.)
Bearing temperature: 100-110° C. at external diameter of outer ring
Oil film parameter Λ: 0.2 to 1.0

TABLE 3

| | | Composition of Needle Rollers | | | | |
|---|---|---|---|---|---|---|
| No. | Pretreatment | Film Area Ratio (%) | Mean Film Thickness (μm) | Atmosphere at Film Formation Time | Dimple Depth (μm) | Life Test Result (ratio) | Remarks |
| 1 | None | 75 | 1.00 | argon gas | — | 5.4 | Example |
| 2 | None | 80 | 0.10 | nitrogen gas | — | 5.6 | |
| 3 | None | 85 | 2.00 | methane gas | — | 6.9 | |
| 4 | None | 90 | 0.40 | propane gas | — | 6.6 | |
| 5 | None | 92 | 6.00 | ammonia gas | — | 5.9 | |
| 6 | None | 95 | 2.80 | CF$_4$ gas | — | 5.4 | |
| 7 | None | 96 | 0.50 | methane gas | — | 5.1 | |
| 8 | None | 100 | 8.00 | pentane gas | — | 5.0 | |
| 9 | Yes (shot A) | 75 | 2.50 | RX gas | 3.1 | 8.3 | |
| 10 | Yes (shot A) | 80 | 0.80 | oxygen gas | 0.4 | 10.1 | |
| 11 | Yes (shot A) | 85 | 0.50 | methane gas | 0.3 | 10.9 | |
| 12 | Yes (shot A) | 90 | 3.50 | propane gas | 1.5 | 10.1 | |
| 13 | Yes (shot A) | 92 | 2.40 | nitrogen gas | 2.4 | 9.4 | |
| 14 | Yes (shot A) | 95 | 1.50 | CF$_4$ gas | 2.5 | 8.8 | |
| 15 | Yes (shot A) | 95 | 8.00 | S$_2$F$_6$ gas | 4.9 | 8.6 | |
| 16 | Yes (shot A) | 100 | 1.50 | methane gas | 2.5 | 7.9 | |
| 17 | None | 85 | 0.05 | methane gas | — | 5.9 | |
| 18 | None | 85 | 10.00 | methane gas | — | 5.8 | |
| 19 | Yes (shot A) | 85 | 0.05 | methane gas | 0.3 | 9.1 | |
| 20 | Yes (shot A) | 80 | 10.00 | oxygen gas | 0.4 | 9.3 | |
| 21 | None | 90 | 0.40 | in atmosphere | — | 5.2 | |
| 22 | Yes (shot A) | 90 | 3.50 | in atmosphere | 1.5 | 6.5 | |
| 23 | Yes (shot A) | 85 | 0.50 | methane gas | 0.05 | 8.4 | |
| 24 | Yes (shot A) | 90 | 3.50 | propane gas | 6.0 | 8.3 | |
| 25 | Yes (barrel) | — | — | — | 0.3 | 1 | Comparative Example |
| 26 | Yes (shot B) | — | — | — | 0.4 | 1.0 | |
| 27 | None | — | — | — | — | 0.4 | |
| 28 | None | 72 | 0.20 | nitrogen gas | — | 2.1 | |
| 29 | None | 65 | 2.30 | nitrogen gas | — | 2.3 | |
| 30 | Yes (shot A) | 72 | 6.20 | nitrogen gas | 1.0 | 2.9 | |
| 31 | Yes (shot A) | 65 | 0.50 | nitrogen gas | 0.5 | 2.4 | |

The needle roller denoted by No. 25 is a comparative example in which the dimples described in the aforementioned Patent Document 1 are formed on the surface thereof. The maximum surface roughness (Ra) provided on these As shown in Table 3, for thrust needle roller bearings that used needle rollers Nos. 1 to 24 that had a lubricant film formed on the surfaces thereof at an area ratio of no less than 75%, the rolling fatigue life was longer in comparison to the needle rollers of Nos. 25 to 27 that did not have a lubricant film formed on their surfaces and the needle rollers of Nos. 28 to 31 that had a lubricant film formed on their surfaces at an area ratio of less than 75%, and the length of the rolling fatigue life for the needle rollers of Nos. 1 to 24 was greater by a multiple of 5.1 or more in comparison to those of No. 25.

In particular, based on the results of Nos. 1 to 6, and Nos. 7 and 8, as well as Nos. 9 to 15 and No. 16, it was found that the rolling fatigue life is further extended by making the area ratio of the lubricant film 75% or more.

Further, based on the results of Nos. 3, 17 and 18, Nos. 11 and 19, and Nos. 10 and 20, it was found that the rolling fatigue life is further extended by making the lubricant film thickness no less than 0.10 µm and no more than 8.0 µm.

Furthermore, based on the results of Nos. 4 and 21, and Nos. 12 and 22, it was found that in comparison to a case of accelerating shot material using atmospheric gas, the rolling fatigue life is further extended by forming the lubricant film by accelerating the shot material with inert gas or active gas to cause it to collide with the needle roller.

In addition, based on the results of Nos. 1 to 8, Nos. 9 to 16, Nos. 11 and 23 and Nos. 12 and 24, it was found that the rolling fatigue life is further extended by making the depth of dimples no less than 0.10 µm and no more than 5.0 µm using a shot peening method. The reason for this is considered to be that the lubricant film is formed with greater adherence on the surface of the needle roller by setting the dimple depth within the aforementioned range, and that the surface hardness of the needle roller is enhanced by the shot peening method.

Figure 5:
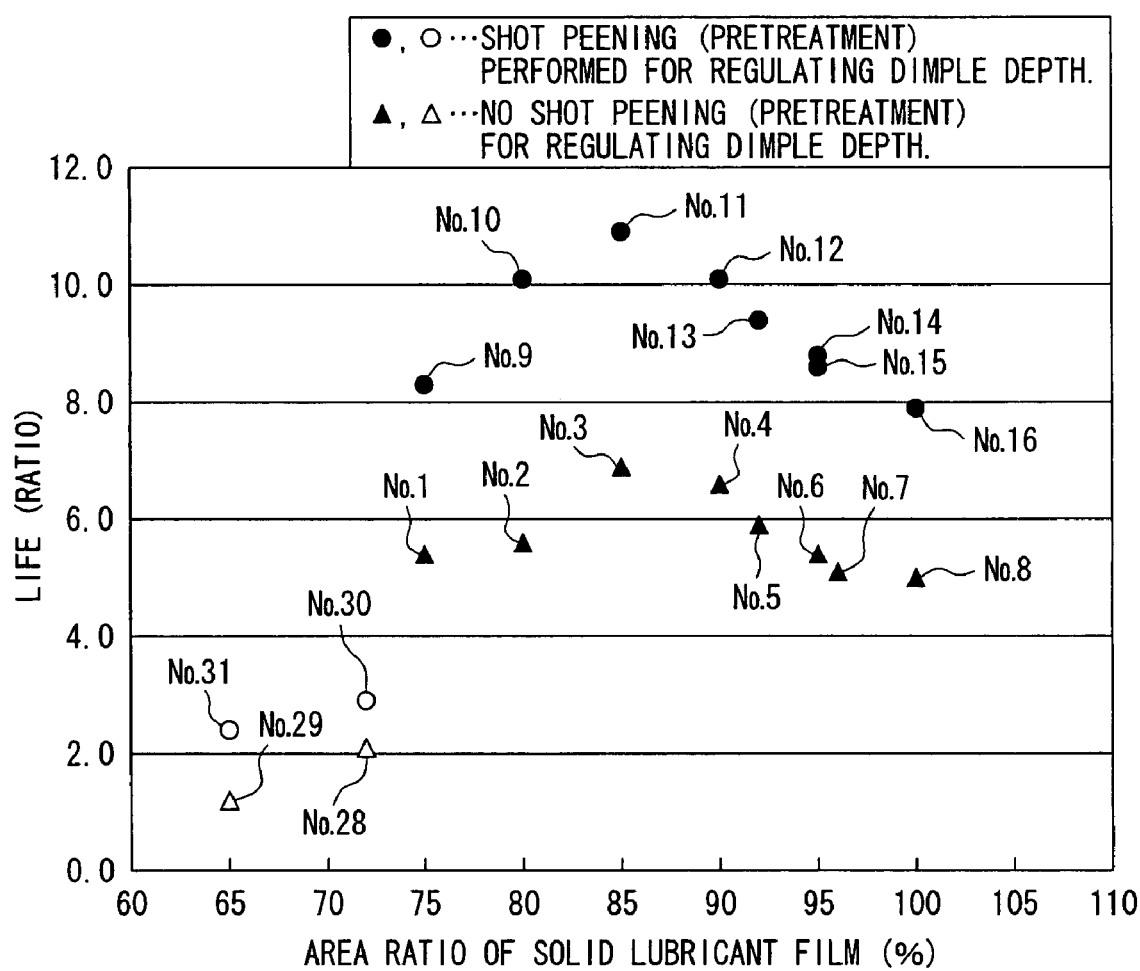
FIG. 5 is a graph illustrating the relation between the area ratio of a lubricant film that is formed on the surface of a needle roller and life according to the second embodiment.

The graph shown in FIG. 5 that illustrates the relationship between the lubricant film area ratio and the life was created using the results of Nos. 1 to 16 and Nos. 28 to 31. As shown in FIG. 5, for thrust needle roller bearings that used needle rollers on which a lubricant film was formed after the depth of dimples was regulated by a shot peening method, it was found that the life was longer than thrust needle roller bearings that used needle rollers on which a lubricant film was formed without performing pretreatment.

Based on these results, it was found that by using a needle roller having a lubricant film formed at a specific area ratio on the surface thereof, the rolling fatigue life of the thrust needle roller bearing can be increased even when used in an environment of a poor lubrication state in which the oil film parameter Λ is 3 or less. It was also found that the rolling fatigue life of the thrust needle roller bearing can be further increased by specifying the depth of dimples or thickness of the lubricant film formed on the surface of the needle roller. Further, it was found that the rolling fatigue life of the thrust needle roller bearing can be extended further by forming the lubricant film by a shot peening method that accelerates the shot material with an inert gas or active gas to cause it to collide with the needle roller.

Although the case of a thrust needle roller bearing was described as an example of a rolling device according to this embodiment, this invention is not limited thereto, and the invention can also be applied to other rolling devices that are used in an environment in which the lubrication state is poor. Examples of these rolling devices include ball bearings such as a deep groove ball bearing, an angular ball bearing, a self-aligning ball bearing and a thrust ball bearing; roller bearings such as a cylindrical roller bearing, a self-aligning roller bearing and a thrust roller bearing; a linear motion device such as a ball screw, a linear guide and a linear motion bearing; and a rolling bearing unit such as a toroidal continuously variable transmission.

Third Embodiment

This embodiment relates to a rolling bearing, and more specifically to a rolling bearing capable of maintaining the bearing life over a long period even in circumstances in which the lubrication conditions are bad and the oxygen concentration in the system is low, such as in a compressor that is used in air conditioning equipment of an air conditioner or an automatic transmission of a vehicle.

An adjustable capacity compressor is described below as an example of one type of compressor. In an adjustable capacity compressor, a drive shaft is fitted in a rotatable manner with respect to a housing, a swash plate is joined to the drive shaft in a manner whereby the inclining angle is adjustable, and a wobble plate is slidably attached to the swash plate. A thrust bearing is arranged between the swash plate and the wobble plate. A plurality of piston rods are coupled at one end to the wobble plate at regular intervals in the circumferential direction, and the other ends of the piston rods are coupled to a piston. The piston is provided so as to move in an oscillating manner inside a cylinder provided inside the housing, and it compresses and discharges refrigerant gas that flows into the cylinder bore. That is, when the swash plate rotates, the wobble plate makes a so-called soybean-paste grinding motion, causing the piston to make a reciprocating motion in the axial line direction via the piston rod, to thereby compress and discharge the refrigerant gas.

Since the drive shaft receives a force via the swash plate at the time of compressor operation, a thrust bearing is required that supports the drive shaft in the thrust direction with respect to the housing. However, since the thrust bearing is disposed on the side of a pulley unit that is connected to the drive shaft and receives a rotational amount from a belt, it is at a position that is far from the supply source of lubricating oil that is supplied in a mist form, and there is thus a problem that oil film formation between a rolling element and the raceway surface is liable to be poor.

Not only is there a problem of a poor lubrication condition as described above, but as a characteristic problem of compressors there may be mentioned the problem that the concentration of oxygen for discharging atmospheric air in the system when filling refrigerant is low. In general, when oil film formation in atmosphere is insufficient, although metal-to-metal contact is caused by an oil film rupture at a contact portion such as the raceway surface of a bearing ring and/or the surface of a rolling element of the rolling bearing that is used, there is a self-healing effect whereby a surface oxide film is quickly formed by the atmospheric oxygen and further metal-to-metal contact is prevented and adhesive wear is suppressed. However, since surface oxidation does not occur when the oil film formation is insufficient and the oxygen concentration is low, when the surface of a rolling element and/or the raceway surface of a bearing ring or the like give rise to contact one time, any contact thereafter normally repeats metal-to-metal contact and adhesive wear progresses without stopping.

In order to maintain the bearing life over a long period even in circumstances of poor lubrication conditions in which the oxygen concentration in the system is low as described above, a technique is known in which innumerable minute dents are randomly provided on the surface of a rolling element or the rolling contact surface of inner and outer rings and a skewness Rsk value as a parameter of surface roughness is made −1.6 or less, to thereby raise the rate of oil film formation using oil reservoirs to increase the bearing life (for example, see Japanese Patent No. 2724219).

However, in the rolling bearing described in Japanese Patent No. 2724219, the shape of a rolling element surface or a rolling contact surface of an inner or outer ring is devised to extend the life of the bearing, and while it is an effective measure for decreasing surface damage it has been found that there is a limit to the extent to which the bearing life can be extended by only executing surface processing that provides oil reservoirs with a skewness Rsk value of −1.6 or less on the rolling surface.

The present invention was made in consideration of the above described technological background, and an object of this invention is to provide a rolling bearing that can extend the life even in usage conditions in which the lubrication conditions are bad such as a condition of trace amounts of oil or exhausted lubrication.

To solve the above described problem, the present invention coats the rolling surface with a lubricant film (hereafter, sometimes referred to as a "solid lubricant film"). More specifically, as the result of concentrated studies the present inventors discovered that premature wear of a raceway surface on a bearing ring and/or a rolling element can be avoided by forming a solid lubricant film on the rolling surface.

This invention was made based on this finding, and provides a rolling bearing comprising a plurality of rolling elements, a cage that rollably retains the rolling elements, and a pair of bearing rings that dispose the rolling elements and the cage in a prescribed location, in which a solid lubricant film comprising at least one member selected from the group consisting of molybdenum disulfide, tungsten disulfide, boron nitride, metallic soap, fluorocarbon resin, nylon, polyacetal, polyolefin, polyester, polyethylene, PTFE (polytetrafluoroethylene), graphite, calcium fluoride, barium fluoride, fluorocarbide, tin, tin alloy, nickel, copper alloy, pure iron, pure copper and pure chromium is formed on the surface of the rolling element and/or the raceway surface of the bearing ring, and an area occupied by the solid lubricant film is no less than a ratio of 75% with respect to the surface of the rolling elements and/or the raceway surface of the bearing ring. Among the above described group, molybdenum disulfide ($MoS_2$), tungsten disulfide ($WS_2$), tin (Sn) and boron nitride (BN) are preferable.

According to the studies of the present inventors, it was found that only an ordinary quench-and-temper process is performed for a conventional rolling element and bearing ring. There is thus a tendency for wear of the raceway surface of the bearing ring or the rolling element to increase prematurely. As described above, this is because adhesive wear progresses while repeating metal-to-metal contact. In contrast, according to the above described configuration of the present invention, by forming a solid lubricant film on the surface of the rolling element and/or the raceway surface of the bearing ring, metal-to-metal contact on the surface of the rolling element and/or the raceway surface of the bearing ring is inhibited, and surface damage such as wear and peeling is noticeably reduced.

Preferably, the area occupied by the solid lubricant film is no less than 75% of the surface of the rolling element and/or the raceway surface of the bearing ring. By coating the relevant area with a solid lubricant film it is possible to effectively suppress metal-to-metal contact and noticeably reduce surface damage such as wear and peeling.

Preferably the thickness of the solid lubricant film is from 0.05 to 8.0 µm. It is thereby possible to further enhance wear resistance.

Preferably, dimple-shaped dents (hereafter, sometimes referred to as "dimples") are formed on the surface of the rolling element and/or the raceway surface of the bearing ring. The depth of the dents is preferably from 0.1 to 5 µm. It is thereby possible to further enhance wear resistance.

The center line average roughness Ra of the surface of the solid lubricant film is preferably no more than 1 µm. More preferably the center line average roughness Ra is no less than 0.1 µm and no more than 0.5 µm, and further preferably no less than 0.15 µm and no more than 0.45 µm. Thereby, it is possible to inhibit wear more effectively.

Preferably, the surface layer of the rolling element and/or the bearing ring includes 2-30 vol % of retained austenite (γR). By making the amount of retained austenite (γR) the above described amount, protrusions in the surface shape after a shot peening process can be reduced to achieve a further increase in the service life.

According to the rolling bearing of this invention, the life of rolling bearings can be extended even in usage situations with bad lubrication conditions, such as conditions of trace amounts of oil or exhausted lubrication.

Hereunder, the third embodiment will be described in detail referring to the drawings.

A of Third Embodiment

Figure 6:
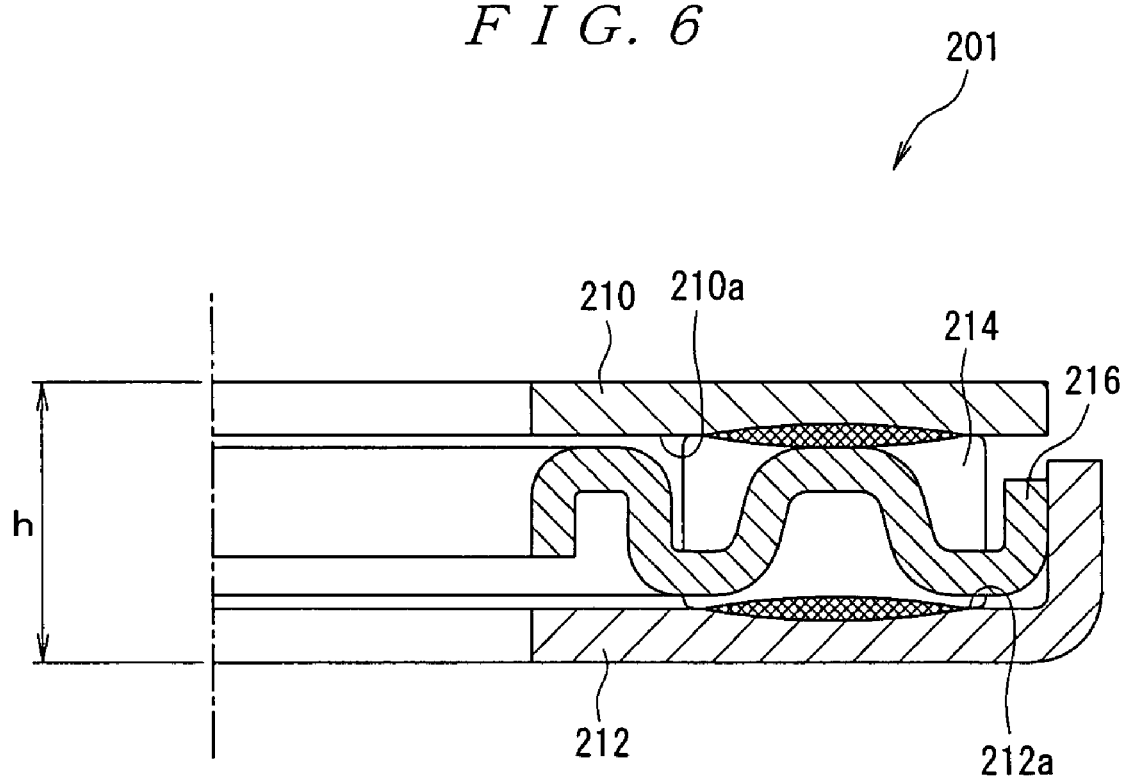
FIG. 6 is a partial cross section that shows the configuration of a thrust needle roller bearing according to A of the third embodiment.

FIG. 6 is a partial cross section that illustrates the configuration of a thrust needle roller bearing 201 according to A of the third embodiment. This thrust needle roller bearing 201 comprises an inner ring 210 that is fixed to an unshown shaft, and an outer ring 212 that is fixed to an unshown housing. A plurality of needle rollers 214 are supported by a cage 216 as rolling elements that are rollably provided between opposed raceway surfaces 210a and 212a of the two rings 210 and 212.

The thrust needle roller bearing 201 includes needle rollers 214 having a roller diameter of 3.5 mm and a length of 5.8 mm. The number of the needle rollers 214 provided therein is 28, and they are retained at equal distances in the circumferential direction by the cage 216. The external diameter of the thrust needle roller bearing 201 is 67 mm, and the internal diameter thereof is 42 mm. As the raw material for the bearings, SUJ2 is used for the inner and outer rings 210 and 212 and the needle rollers 214 and SPCC is used for the cage 216, and carburization or carbonitriding is performed as necessary. The inner and outer rings 210 and 212 are finished by undergoing a barrel process after heat treatment for the purpose of deburring and polishing, and the needle rollers 214 are finished by undergoing a barrel process for the purpose of polishing after grinding.

A film is formed on the surface of the rolling element and/or raceway surface of the bearing ring by a solid lubricant that comprises at least one kind of substance selected from the group consisting of $MoS_2$, Sn, BN and $WS_2$. The solid lubricant used herein is not limited to the aforementioned solid lubricant, and another solid lubricant can also be used as long as a similar effect can be obtained. Specific examples of other solid lubricants include polyethylene, fluorocarbon resin, nylon, polyacetal, polyolefin, polyester, polytetrafluoroethylene, metallic soap, graphite, calcium fluoride, barium fluoride, tin alloy and copper alloy.

The mean particle diameter of the solid lubricant is preferably from 1 to 100 µm, more preferably from 1 to 60 µm, and further preferably from 2 to 60 µm.

Formation of the solid lubricant film can be performed by a shot peening process. Preferable conditions for the shot peening process are a blasting pressure of 196 to 1470 kPa (more preferably, 392 to 1470 kPa), a blasting time of 10 to 20 min, and a weight of material to be shot of 1 to 6 kg.

Further, in the thrust needle roller bearing 201 according to this Embodiment, the slid lubricant film is formed on the needle rollers 214 and/or raceway surfaces 210a and 212a of the inner and outer rings 210 and 212 after providing asperities of a center line average roughness Ra of 0.15 to 0.45 µm thereon as pretreatment.

A barrel treatment or shot peening process or the like can be employed as the pretreatment using a similar method as in the first embodiment.

The thickness of the solid lubricant film is preferably 0.05 to 8 μm, more preferably 0.5 to 5 μm, and further preferably 0.5 to 3 μm.

Regarding the thrust needle roller bearing 201 according to this embodiment, when the hardness was measured in a similar manner as the first embodiment after blasting the solid lubricant shot, it was found that the hardness had increased by 5 to 20%.

These values for the thickness and area ratio of the solid lubricant film and the hardness gradient from the uppermost surface of the parent material are values that characterize the thrust needle roller bearing according to the present invention, and it is considered that they are related to the effect obtained by the thrust needle roller bearings of the examples.

Further, the amount of retained austenite (γR) of the needle rollers 214 and/or raceway surfaces 210a and 212a of the inner and outer rings 210 and 214 is preferably 2 to 30 vol %, more preferably 10 to 30 vol %, and further preferably 20 to 30 vol %. By making the γR amount within the above described range, the surface shape after the shot peening process is optimized and an even longer life can be attained.

B of Third Embodiment

Figure 7:
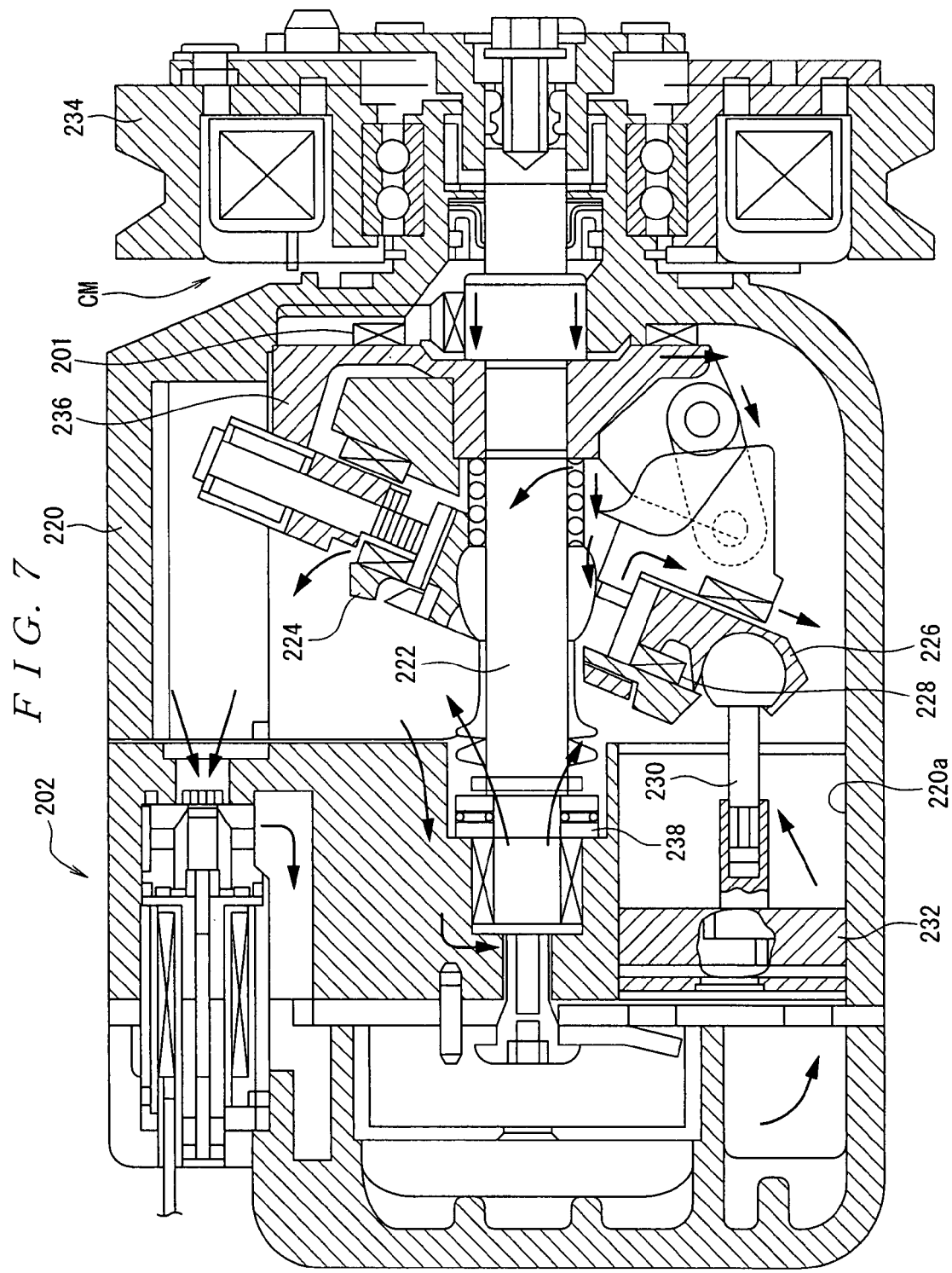
FIG. 7 is a cross section of a car air-conditioner compressor that applies a thrust needle roller bearing according to A of the third embodiment.

FIG. 7 is a cross section of a car air-conditioner compressor 202 to which a thrust needle roller bearing 210 according to B of the third embodiment was applied. In FIG. 7, in an adjustable capacity compressor that is the car air-conditioner compressor 202, a drive shaft 222 is fitted in a rotatable condition in a housing 220, a swash plate 224 is coupled with the drive shaft 222 in a manner whereby the inclining angle is adjustable, and a wobble plate 226 is slidably attached to the swash plate 224.

A thrust bearing 228 is disposed between the swash plate 224 and the wobble plate 226. A plurality of piston rods 230 are coupled at one end to the wobble plate 226 at regular intervals in the circumferential direction, and the other ends of the piston rods 230 are coupled to a piston 232. The piston 232 is provided so as to move in an oscillating manner inside a cylinder 220a provided inside the housing 220, and it compresses and discharges refrigerant gas that flows into the bore of the cylinder 220a.

The right end of the drive shaft 222 as shown in the figure is connected to a pulley 234 via a clutch mechanism CM, and at the outer circumference on the pulley 234 side of the drive shaft 222, a thrust plate 236 is press fitted so as to rotate integrally therewith, and the thrust needle roller bearing 201 is disposed between the thrust plate 236 and the housing 220. After evacuation of the inside of this compressor system, refrigerant and lubricating oil is sealed therein.

When the clutch mechanism CM is switched ON, operation of the car air-conditioner compressor 202 commences. In this case, when the pulley 234 is driven by an unshown belt, the drive shaft 222 is rotationally driven, and when the swash plate 224 rotates as a result thereof the wobble plate 226 makes a so-called soybean-paste grinding motion, causing the piston 230 to make a reciprocating motion in the axial line direction via the piston rods 232, to thereby compress and discharge refrigerant gas.

At this time, at the drive shaft 222, the compressive force of the refrigerant gas is conveyed as a thrust force, and the thrust needle roller bearing 201 supports this thrust force between the thrust plate 236 and the housing 220.

In this connection, a refrigerant blow-by gas that is generated accompanying the operation of the piston 232 flows in the direction of the arrows shown in FIG. 7 to perform lubrication of each part using a mist-like lubricating oil that is included in the refrigerant blow-by gas. At this time, since the thrust needle roller bearing 201 is disposed at a position that is separated from the piston 232, sufficient lubricating oil does not spread to the thrust needle roller bearing 201, and the lubrication conditions become severe.

Consequently, in a conventional thrust needle roller bearing in which a solid lubricant film comprising at least one kind of substance selected from the group consisting of $MoS_2$, Sn, BN and $WS_2$ is not formed on the rolling element surface and/or raceway surface of the bearing ring, once an oil film rupture occurs, metal-to-metal contact is produced and adhesive wear progresses.

In contrast, in the thrust needle roller bearing 201 according to B of the third embodiment, since a solid lubricant film comprising at least one kind of substance selected from the group consisting of $MoS_2$, Sn, BN and $WS_2$ is formed on the rolling element surface and/or raceway surface of the bearing ring, wear can be suppressed in a region R (shown by double hatching in FIG. 6) in which contact pressure is considered to be particularly high.

Further, the solid lubricant film is adhered to a section that is equivalent, in terms of the area ratio, to 75% or more of the surface of the needle roller 214 and/or the raceway surfaces 210a and 212a of the inner and outer rings. When the area ratio of the film is less than 75%, wear increases and a satisfactory service life can not be obtained.

C of Third Embodiment

Figure 8:
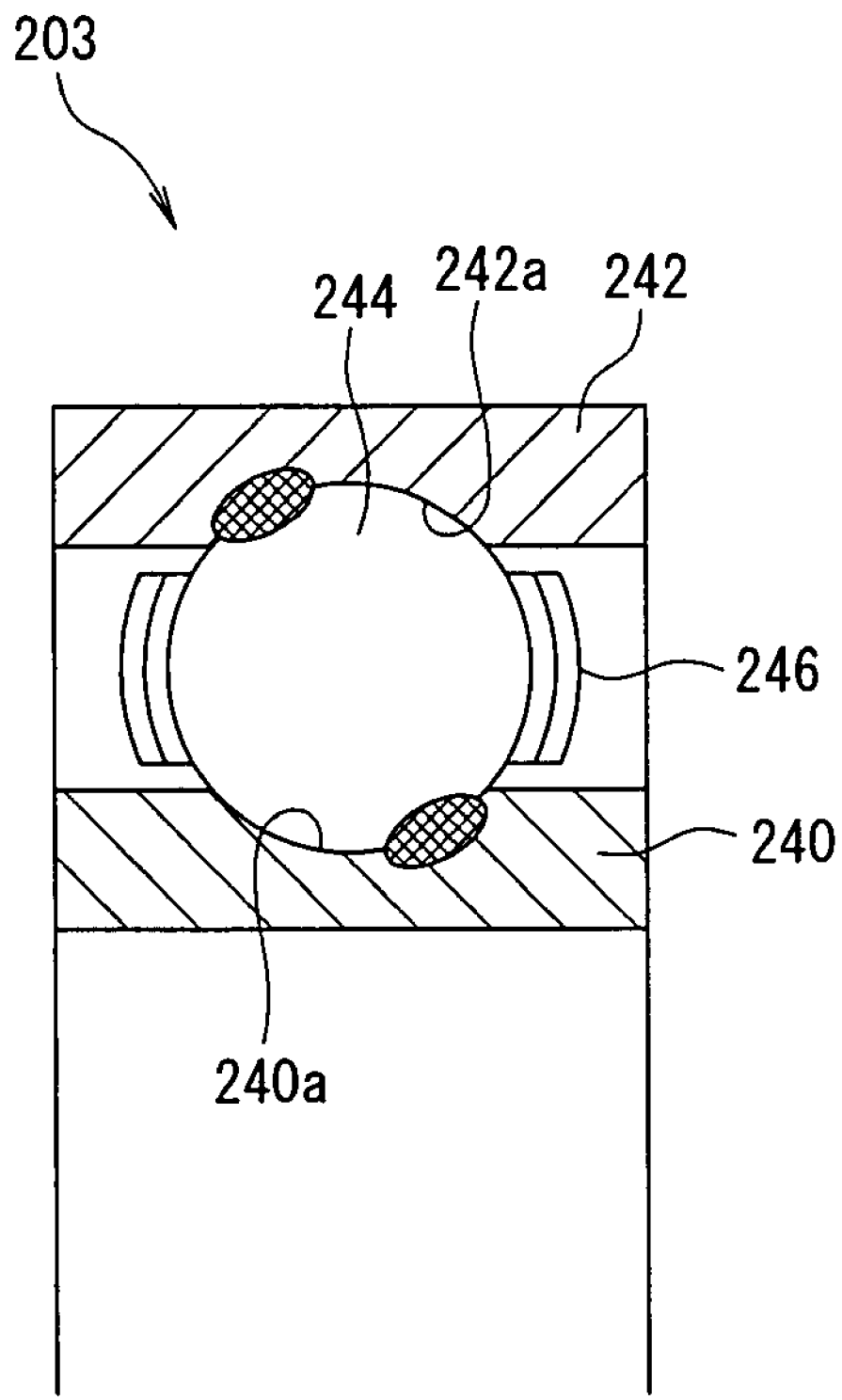
FIG. 8 is a cross section of a deep groove ball bearing according to B of the third embodiment.

FIG. 8 is a cross section of a deep groove ball bearing 203 according to C of the third embodiment. This deep groove ball bearing 203 can be used, for example, in place of the thrust bearing 238 that is provided on the left side of the drive shaft 222 in FIG. 7.

As shown in FIG. 8, the deep groove ball bearing 203 according to this embodiment comprises an inner ring 240 that is attachable to the drive shaft 222 shown in FIG. 7, an outer ring 42 that is attachable to the housing 220 shown in FIG. 7, a ball 244 as a rolling element that is rollably disposed between these inner and outer rings 240 and 242 as driving wheels, and a cage 246 that retains a plurality of the balls 244 in a manner whereby they are spaced at regular intervals in the circumferential direction.

Although the cage 246 is formed by bending and combining two steel plates, the same effect can be obtained by forming the cage with a resin.

The same treatment as that of the thrust needle roller bearing 201 according to A of the third embodiment is effective for the deep groove bearing 203 according to this embodiment.

Examples

As shown in Table 4, various kinds of thrust needle roller bearings were manufactured using tin having a mean particle diameter of 45 μm by appropriately changing presence or absence of pretreatment, the film location, film thickness, film area ratio, retained austenite (γR) amount, and center line average roughness. The method of manufacture was the same as in the first embodiment.

Measurement of the retained austenite amount (surface γR amount) was performed using an X-ray diffractometer. In this connection, the term "surface" in the phrase "surface γR amount" according to this embodiment refers to a portion from the uppermost surface of the rolling contact surface to a depth of 20 μm.

TABLE 4

| | Pretreatment | Film Site | Film Thickness (μm) | Film Area Ratio (%) | Surface γR Amount (vol %) | Center Line Average Roughness (μm) |
|---|---|---|---|---|---|---|
| Example 1 | None | Roller | 0.05 | 75 | 1 | 0.09 |
| Example 2 | None | Roller | 1 | 85 | 0 | 0.13 |
| Example 3 | None | Roller | 2 | 88 | 0 | 0.11 |
| Example 4 | None | Roller | 2 | 80 | 1 | 0.12 |
| Example 5 | None | raceway surface | 1 | 95 | 0 | 0.12 |
| Example 6 | None | raceway surface | 2 | 92 | 1 | 0.11 |
| Example 7 | None | raceway surface | 0.5 | 90 | 1 | 0.13 |
| Example 8 | None | raceway surface | 1.5 | 85 | 0 | 0.13 |
| Example 9 | Yes (shot) | Roller | 2 | 85 | 0 | 0.20 |
| Example 10 | Yes (shot) | Roller | 4 | 95 | 0 | 0.40 |
| Example 11 | Yes (shot) | Roller | 2 | 80 | 1 | 0.35 |
| Example 12 | Yes (shot) | Roller | 3 | 95 | 0 | 0.45 |
| Example 13 | Yes (shot) | raceway surface | 3 | 95 | 0 | 0.15 |
| Example 14 | Yes (shot) | raceway surface | 1 | 90 | 0 | 0.25 |
| Example 15 | Yes (shot) | raceway surface | 8 | 95 | 1 | 0.32 |
| Example 16 | Yes (shot) | raceway surface | 5 | 95 | 0 | 0.42 |
| Example 17 | Yes (shot) | Roller | 2 | 80 | 15 | 0.18 |
| Example 18 | Yes (shot) | Roller | 4 | 95 | 2 | 0.35 |
| Example 19 | Yes (shot) | Roller | 3 | 90 | 5 | 0.38 |
| Example 20 | Yes (shot) | Roller | 2 | 90 | 10 | 0.30 |
| Example 21 | Yes (shot) | raceway surface | 4 | 95 | 30 | 0.16 |
| Example 22 | Yes (shot) | raceway surface | 3 | 90 | 20 | 0.32 |
| Example 23 | Yes (shot) | raceway surface | 3 | 88 | 8 | 0.38 |
| Example 24 | Yes (shot) | raceway surface | 2 | 95 | 15 | 0.40 |
| Example 25 | Yes (shot) | Roller | 2 | 90 | 32 | 0.15 |
| Example 26 | Yes (shot) | Roller | 5 | 95 | 35 | 0.16 |
| Example 27 | Yes (shot) | raceway surface | 2 | 85 | 37 | 0.15 |
| Example 28 | Yes (barrel) | raceway surface | 2 | 90 | 7 | 0.20 |
| Example 29 | Yes (barrel) | Roller | 3 | 95 | 6 | 0.22 |
| Example 30 | Yes (barrel) | raceway surface | 5 | 90 | 5 | 0.32 |
| Example 31 | Yes (barrel) | Roller | 3 | 95 | 5 | 0.32 |
| Example 32 | Yes (barrel + shot) | raceway surface | 2 | 90 | 4 | 0.22 |
| Example 33 | Yes (barrel + shot) | Roller | 1 | 95 | 2 | 0.25 |
| Example 34 | Yes (barrel + shot) | raceway surface | 5 | 80 | 2 | 0.40 |
| Example 35 | Yes (barrel + shot) | Roller | 4 | 95 | 2 | 0.45 |
| Example 36 | None | Roller | 2 | 95 | 1 | 0.31 |
| Comparative Example 1 | None | Roller | 0.02 | 78 | 4 | 0.07 |
| Comparative Example 2 | Yes (barrel + shot) | Roller | 12 | 95 | 1 | 0.42 |
| Comparative Example 3 | None | Roller | 0.05 | 60 | 5 | 0.10 |
| Comparative Example 4 | None | Roller | 1 | 72 | 4 | 0.13 |
| Comparative Example 5 | Yes (shot) | Roller | — | — | 2 | 0.20 |
| Comparative Example 6 | Yes (shot) | raceway surface | — | — | 6 | 0.28 |
| Comparative Example 7 | None | Roller | — | — | 3 | 0.21 |
| Comparative Example 8 | Yes (barrel) | Roller | — | — | 6 | 0.07 |
| Comparative Example 9 | Yes (barrel) | Roller | — | — | 2 | 0.20 |

Test Example 1

Abrasion Test

Measurement of Assembly Height Reduction Amount

Using the thrust needle roller bearings of the above examples and comparative examples, an abrasion test (measurement of amount of reduction in assembly height) was carried out according to the procedures described below. The rolling elements and bearing rings were made of bearing steel (SUJ2), and quenching (0.5 to 1 hr at 820 to 830° C.) and tempering (1 to 2 hr at 160 to 200° C.) were performed. Carburization and carbonitriding were also performed as necessary. Further, after the above described heat treatment (quenching and tempering), the inner and outer rings were subjected to a barrel process for the purpose of deburring and polishing, and the rollers underwent a barrel process for the purpose of polishing after grinding.

Test Conditions:

Size (internal diameter×external diameter×height) of sample bearings: 40×60×5 (mm)

Axial load (thrust force): 1500 N

Rotational speed: 4000 min$^{-1}$

Cage form: cage formed of one steel plate as shown in FIG. 6

Time under test: 500 h

Atmosphere: HCFC-134a (including polyalkylene glycol)

Measurement of the reduction amount in the assembly height was performed by measuring the assembly height h (see FIG. 6) of the thrust needle roller bearing before and after testing, and deducting the height after testing from the height before testing. The results are shown in Table 5.

Test Example 2

Assessment of Life

Using the thrust needle roller bearings of the above described examples and comparative examples, life assessment was performed according to the following procedures. The bearing life testing machine used in this test was the same as that used in the first embodiment. Tests were conducted under the following conditions.

Test Conditions:
Pmax: 11000 MPa
Rotational speed: 3000 min$^{-1}$
Lubricating oil: VG10 equivalent The test was suspended when the vibration value of the test piece (bearing) reached double the initial value, and the life of the sample was regarded as having come to an end at a point in time when the occurrence of peeling was confirmed upon observing the test piece (bearing). Tests were conducted 3 to 5 times for the respective examples and comparative examples, and a Weibull plot was created based on the results to determine the L10 life (rating life). Then, taking the life value of Comparative Example 9 as 1, the life ratios of the other examples and comparative examples were determined. Table 5 shows the results.

TABLE 5

| | Assembly Height Reduction Amount (μm) | Life Ratio |
|---|---|---|
| Example 1 | 0.7 | 1.5 |
| Example 2 | 0.6 | 2.2 |
| Example 3 | 0.7 | 1.7 |
| Example 4 | 0.7 | 1.5 |
| Example 5 | 0.6 | 1.8 |
| Example 6 | 0.6 | 2.0 |
| Example 7 | 0.7 | 1.5 |
| Example 8 | 0.7 | 1.6 |
| Example 9 | 0.5 | 3.0 |
| Example 10 | 0.4 | 4.0 |
| Example 11 | 0.5 | 2.5 |
| Example 12 | 0.5 | 2.7 |
| Example 13 | 0.5 | 3.2 |
| Example 14 | 0.4 | 3.8 |
| Example 15 | 0.5 | 2.8 |
| Example 16 | 0.5 | 2.6 |
| Example 17 | 0.2 | 6.0 |
| Example 18 | 0.1 | 8.8 |
| Example 19 | 0.3 | 5.0 |
| Example 20 | 0.3 | 5.2 |
| Example 21 | 0.2 | 6.6 |
| Example 22 | 0.1 | 8.5 |
| Example 23 | 0.3 | 5.2 |
| Example 24 | 0.2 | 6.0 |
| Example 25 | 0.5 | 3.0 |
| Example 26 | 0.4 | 3.8 |
| Example 27 | 0.5 | 2.8 |
| Example 28 | 0.5 | 2.8 |
| Example 29 | 0.5 | 2.5 |
| Example 30 | 0.4 | 3.0 |
| Example 31 | 0.4 | 3.5 |
| Example 32 | 0.4 | 3.5 |
| Example 33 | 0.4 | 3.3 |
| Example 34 | 0.4 | 4.0 |
| Example 35 | 0.4 | 3.8 |
| Example 36 | 0.7 | 1.5 |
| Comparative Example 1 | 8.0 | 0.5 |

TABLE 5-continued

| | Assembly Height Reduction Amount (μm) | Life Ratio |
|---|---|---|
| Comparative Example 2 | 4.0 | 1.0 |
| Comparative Example 3 | 6.0 | 0.7 |
| Comparative Example 4 | 6.0 | 0.7 |
| Comparative Example 5 | 6.0 | 0.7 |
| Comparative Example 6 | 6.0 | 0.7 |
| Comparative Example 7 | 10.0 | 0.3 |
| Comparative Example 8 | 8.0 | 0.5 |
| Comparative Example 9 | 3.0 | 1.0 |

It was found that with respect to the assembly height reduction amount, the thrust needle roller bearings of Examples 1 to 36 exhibited wear resistance that was 10 times or more greater than that of the conventional thrust needle roller bearings (Comparative Examples 5 and 6). It was also found that with respect to the life, the bearings of Examples 1 to 36 achieved an increased life that was 1.5 times or more greater than the conventional bearings. It is thought that this is because the fact that the hardness of the uppermost surface portion of the parent material increased and the fact that metal-to-metal contact and the tangential force was effectively suppressed by formation of a solid lubricant film of a film area ratio of 75% or more and a film thickness of 0.05 to 8 μm by a shot peening process acted in a compound manner.

Regarding the thrust needle roller bearings of Examples 9 to 35, it was found that with respect to the assembly height reduction amount, the samples that underwent pretreatment by a shot peening process or barrel process prior to adhesion of the solid lubricant by a shot peening process had a roughness Ra that was 0.15 to 0.45 μm greater than the samples for which pretreatment was not performed, and they exhibited a wear resistance that was 10 times or more greater than that of the conventional bearings. With respect to the life, it was found that the bearings achieved a further extension in life that was 2.5 times or more longer than the Comparative Examples. It is considered that this is because, by roughening the surface to be coated with a film to within a roughness Ra range of 0.15 to 4.0 μm, the trap effect of the solid lubricant is increased and the effect of the solid lubricant can be maintained.

Further, regarding the thrust needle roller bearings of Examples 17 to 24, it was found that with respect to the assembly height reduction amount, the wear amount was particularly small in samples with a γR amount of 8 to 25%, and equaled 1/60 the wear amount of the Comparative Examples. With respect to the life, it was found that the life ratio of these samples was 5.0 or more, representing a further extension of the life. Upon conducting an investigation using a light interference, three-dimensional measuring machine to clarify the reasons, it was found that if soft γR was present within the range of 8 to 25% in the parent material, surface protrusions after the shot are reduced, and it is considered that an effect that suppresses metal-to-metal contact can be exerted more adequately as a result.

However, as shown in Examples 25 to 27, since the hardness of the parent material declines when the γR amount is greater than 25%, it was found that the wear resistance enters a downward trend and the life ratio is less than 5.

In contrast, in Comparative Example 1, since the film thickness was less than 0.05 μm and a sufficient film thickness could thus not be obtained, a wear-resistance capability was not obtained and the life ratio was also low.

Although wear was also low in Comparative Example 2, this was because the film thickness was greater than 8 μm and locally agglomerated portions existed, and thus during operation the film peeled off and wear increased, resulting in a short life.

In Comparative Examples 3 and 4, the area ratio of the film was insufficient at less than 75% in both cases, and thus there was a large amount of wear and the life ratio was low.

Comparative Examples 5 and 6 are examples of the conventional bearings in which only a shot peening process was performed as a pretreatment, and since they did not undergo a shot peening process using a solid lubricant a sufficient wear resistance could not be obtained and they had a short life.

In Comparative Example 7, the samples were finished by grinding without performing barrel process finishing, and in Comparative Example 8 the samples were finished using a barrel process finishing. In both cases, a shot peening process was not performed using a solid lubricant and thus there was a large amount of wear and the life ratio was low.

As described above, according to this invention, by coating a solid lubricant on a rolling element surface and/or on the raceway surface of a bearing ring, and making the area ratio of the film 75% or more, it is possible to reduce wear and extend the life. A still further extension of the life can be achieved by employing a film thickness between 0.05 and 8 μm, performing a barrel process or a shot peening process as a pretreatment for a shot peening process using a solid lubricant, employing a center line average roughness Ra between 0.15 and 0.45 μm and a retained austenite (γR) amount between 8 and 25%.

A rolling bearing according to this invention can be favorably utilized in the above described car air-conditioner compressor as well as in a compressor or the like that compresses refrigerant irrespective of whether the compressor is for industrial use or home use. In particular, in the case of a natural-refrigerant compressor, since the partial pressure of oxygen in the refrigerant is low, the effect is clearer.

Fourth Embodiment

The rolling members (inner member, outer member and rolling elements) to be used in a rolling device according to this invention can be manufactured in the following manner.

More specifically, the method of manufacturing rolling members of the rolling device is characterized in that the method has a step of processing a raw material comprising metal into a predetermined shape, a step of applying a heat treatment, and a step of forming a lubricant film (hereafter, sometimes referred to as a "solid lubricant film") having an area ratio of 75% or more on at least one part of a surface that forms a rolling surface by performing a shot peening process under a condition of a temperature of no less than 100° C. and no more than 300° C.

According to this invention, by subjecting rolling members to a shot peening process under specified conditions, the parent phase of the rolling members causes plastic deformation and the shot material that forms the solid lubricant film can thus undergo diffusive coupling more easily with the parent phase, and a deep-rooted solid lubricant film including a diffusion layer can thereby be adhesively formed on the surface of the rolling members. Further, by specifying the area ratio of the solid lubricant film to be formed on the surface of the rolling member, the solid lubricant film can be adhesively formed on the rolling member surface, and the necessary lubricity can be imparted to the rolling member.

Accordingly, it becomes difficult for surface damage such as smearing, seizure, abrasion or peeling to occur on the rolling members, and vibrational faults or acoustic faults generated by peeling of the solid lubricant film can be suppressed.

In this connection, the conditions of the shot peening process are not particularly limited as long as the solid lubricant film is formed on the surface of the rolling members under a condition of a temperature of no less than 100° C. and no more than 300° C. More specifically, the solid lubricant film may be formed in a state in which the rolling member itself was heated to a temperature of no less than 100° C. and no more than 300° C., or the shot material itself that forms the solid lubricant film may be heated to a temperature of no less than 100° C. and no more than 300° C. and collided against the rolling member surface to be adhered thereto in that state, or the entire atmosphere in which the shot peening process is performed may be heated to a temperature of no less than 100° C. and no more than 300° C.

When the shot peening process is performed at a temperature of no less than 100° C., plastic deformation of the parent phase that forms the rolling member is liable to occur, and the shot material for forming the solid lubricant film is easily diffused on the parent phase. Further, when the shot peening process is performed at a temperature of no more than 300° C., changes in the shape of the parent phase that forms the rolling member are few.

The method of manufacturing rolling members of the rolling device according to the present invention is preferably performed in a similar manner to the first embodiment with the exception of the process temperature condition.

According to the method of manufacturing rolling members of the rolling device according to the present invention, by performing a shot peening process for the rolling members under a specified temperature condition to form a solid lubricant film of a specific area ratio on at least one part of the surface that constitutes a rolling surface, the solid lubricant film can be adhesively formed on the surface of a rolling member. As a result, rolling members for which it is difficult for surface damage to occur can be manufactured.

Further, according to the method of manufacturing a rolling device according to the present invention by further specifying the film thickness of the solid lubricant film or the shape of the surface on which to form the solid lubricant film, the solid lubricant film can be formed on the surface of a rolling member with even greater adhesion. As a result, rolling members for which it is even more difficult for surface damage to occur can be manufactured.

Hence, by using a rolling member that was fabricated according to the manufacturing method of this invention, a rolling device can be provided that has a long rolling fatigue life even when used, for example, in an environment of a poor lubrication state with an oil film parameter Λ of no more than 3.

The fourth embodiment is described hereunder. The structure of the thrust needle roller bearing according to the fourth embodiment is the same as in the first embodiment as shown in FIG. 1. The bearing dimensions of the thrust needle roller bearing are an internal diameter of 45 mm, an external diameter of 82 mm, and a width of 5.5 mm.

In this embodiment, the inner ring (inner member), outer ring (outer member), and needle roller (rolling element) of the thrust needle roller bearing were fabricated in the following manner. First, raw material comprising high-carbon chromium bearing steel type 2 (SUJ2) was processed into the respective shapes of an inner ring, an outer ring and a needle roller, subjected to carbonitriding for 3 hr in a mixed gas atmosphere (RX gas+enriched gas+ammonia gas) at 840° C., and then subjected to oil hardening and tempering. The amount of retained austenite in the respective surface layer portions (portion from surface to depth of 250 μm) of the inner ring, outer ring and needle roller was then adjusted to 15 to 40 vol %, and the hardness of the surface layer portions was adjusted to HRC 58 to 67 (Hv 653 to 900).

Next, the same treatment as described in the first embodiment was carried out for the needle rollers obtained in this manner, and the surfaces of the needle rollers were coated with tin to complete the needle rollers denoted by Nos. 1 to 37 shown in Table 6.

Further, the hardness of the needle rollers after formation of the solid lubricant film was measured in the same manner as in the first embodiment, and an improvement of 5 to 20% in the hardness was observed.

Although the surface of the needle roller denoted by No. 27 that is shown as a comparative example in Table 6 was subjected to pretreatment (barrel A) to form dimples as described in the aforementioned Patent Document 1 (maximum surface roughness Ra: 1.0 μm; parameter SK value of surface roughness: −2.0; mean surface area of dimple: 80 μm$^2$; dimple area ratio: 25%) thereon, a solid lubricant film was not formed on the surface.

Subsequently, thrust needle roller bearings were assembled using inner rings, outer rings and needle rollers obtained in this manner and cages made of SPCC. A life test was then performed for these thrust needle roller bearings under the conditions shown below that assumed the use thereof in an environment of a poor lubrication state in which the oil film parameter Λ was 3 or less. This life test was carried out using the thrust-type bearing life tester shown in FIG. 3. Since the structure of this thrust-type bearing life tester is the same as that used in the first embodiment, a description thereof is omitted here.

The life test was performed by rotating the thrust needle roller bearing until the vibration value reached five times the initial vibration value or until the temperature of the external diameter of the outer ring reached 150° C., and the time from the start of the test to the end was considered to be the life of the bearing.

This life test was performed 10 times for each example to calculate the average life of the respective samples. The results are shown in Table 6 as ratios with respect to a case in which the life of a thrust needle roller bearing using a needle roller denoted by No. 27 as a comparative example is taken as 1.

In this case, for thrust needle roller bearings for which the test was stopped when the vibration value reached five times the initial vibration value, the presence or absence of damage was confirmed with a stereomicroscope and if damage was observed the test was ended and the time from the start of the test until the vibration value reached five times the initial vibration value was regarded as the life of the bearing, and if damage was not observed the test was restarted. Further, for thrust needle roller bearings for which the test was stopped when the external diameter temperature of the outer ring reached 150° C., it was considered that damage had occurred due to seizure and testing was ended, and the time from the start of the test until the external diameter temperature of the outer ring reached 150° C. was regarded as the life of the bearing.

<Life Test Conditions>

Load: 12% of dynamic load rating (P/C=0.12)

Rotational speed: 6500 min$^{-1}$

Lubricating oil: VG32

Ambient temperature: room temperature (about 28° C.)

Bearing temperature: 100-110° C. at external diameter of outer ring

Oil film parameter Λ: 0.2 to 0.3

TABLE 6

| | | Composition of Needle Rollers | | | | | |
| --- | --- | --- | --- | --- | --- | --- | --- |
| No. | Pretreatment | Temperature of Needle Roller at Film Formation (° C.) | Film Area Ratio (%) | Mean Film Thickness (μm) | Surface Roughness Ra (μm) | Dimple Depth (μm) | Life Test Result (ratio) | Remarks |
| 1 | None | 100 | 75 | 1.00 | 0.50 | — | 8.1 | Example |
| 2 | None | 150 | 80 | 0.10 | 0.50 | — | 8.6 | |
| 3 | None | 180 | 85 | 1.50 | 0.20 | — | 8.9 | |
| 4 | None | 120 | 90 | 0.50 | 0.25 | — | 9.6 | |
| 5 | None | 120 | 92 | 6.00 | 0.30 | — | 8.9 | |
| 6 | None | 300 | 95 | 2.80 | 0.10 | — | 8.4 | |
| 7 | None | 240 | 96 | 0.40 | 0.20 | — | 8.0 | |
| 8 | None | 100.0 | 100 | 8.00 | 0.40 | — | 8.0 | |
| 9 | Yes (shot A) | 100.0 | 75 | 2.50 | 0.30 | 4.9 | 11.3 | |
| 10 | Yes (shot A) | 120 | 80 | 0.80 | 0.10 | 0.4 | 13.1 | |
| 11 | Yes (shot A) | 180 | 85 | 0.50 | 0.20 | 0.3 | 13.9 | |
| 12 | Yes (shot A) | 120 | 90 | 3.50 | 0.15 | 1.5 | 13.1 | |
| 13 | Yes (shot A) | 150 | 92 | 2.40 | 0.20 | 2.3 | 12.4 | |
| 14 | Yes (shot A) | 120 | 95 | 1.50 | 0.30 | 2.6 | 11.8 | |
| 15 | Yes (shot A) | 240 | 95 | 8.00 | 0.25 | 4.6 | 11.6 | |
| 16 | Yes (shot A) | 300 | 100 | 2.40 | 0.40 | 0.2 | 11.0 | |
| 17 | None | 180 | 85 | 0.05 | 0.20 | — | 6.8 | |
| 18 | None | 180 | 85 | 10.00 | 0.20 | — | 5.6 | |
| 19 | Yes (shot A) | 180 | 85 | 0.05 | 0.20 | 0.3 | 10.8 | |
| 20 | Yes (shot A) | 180 | 85 | 10.00 | 0.20 | 0.3 | 10.7 | |
| 21 | Yes (shot A) | 180 | 85 | 0.60 | 0.20 | 0.05 | 10.1 | |
| 22 | Yes (shot A) | 180 | 85 | 0.60 | 0.20 | 6 | 10.7 | |
| 23 | None | 120 | 85 | 1.50 | 0.09 | — | 8.4 | |
| 24 | None | 140 | 85 | 1.50 | 0.51 | — | 7.2 | |
| 25 | Yes (shot A) | 180 | 85 | 0.50 | 0.09 | 0.3 | 7.5 | |

TABLE 6-continued

Composition of Needle Rollers

| No. | Pretreatment | Temperature of Needle Roller at Film Formation (° C.) | Film Area Ratio (%) | Mean Film Thickness (µm) | Surface Roughness Ra (µm) | Dimple Depth (µm) | Life Test Result (ratio) | Remarks |
|---|---|---|---|---|---|---|---|---|
| 26 | Yes (shot A) | 150 | 85 | 0.50 | 0.51 | 0.3 | 6.8 | |
| 27 | Yes (barrel A) | 100 | — | — | 0.20 | 0.2 | 1 | Comparative |
| 28 | Yes (shot B) | 30 | — | — | 0.25 | 0.2 | 1.0 | Example |
| 29 | Yes (barrel B) | 100 | — | — | 0.30 | — | 0.4 | |
| 30 | None | 90 | 90 | 0.50 | 0.30 | — | 4.5 | |
| 31 | None | 320 | 90 | 0.50 | 0.20 | — | 3.8 | |
| 32 | Yes (shot A) | 90 | 90 | 3.50 | 0.40 | 1.5 | 3.9 | |
| 33 | Yes (shot A) | 320 | 90 | 3.50 | 0.20 | 1.5 | 4.1 | |
| 34 | None | 150 | 72 | 0.10 | 0.30 | — | 2.1 | |
| 35 | None | 120 | 65 | 6.00 | 0.40 | — | 1.2 | |
| 36 | Yes (shot A) | 150 | 72 | 2.40 | 0.15 | 2.3 | 2.9 | |
| 37 | Yes (shot A) | 120 | 65 | 0.80 | 0.30 | 0.4 | 2.4 | |

As shown in Table 6, for the thrust needle roller bearings that used the needle rollers denoted by Nos. 1 to 26 which underwent a shot peening process under a temperature condition of no less than 100° C. and no more than 300° C. and that had a solid lubricant film having an area ratio of no less than 75% formed on the surfaces thereof, the rolling fatigue life was longer in comparison to the needle rollers denoted by Nos. 27 to 29 that did not have a solid lubricant film formed on their surfaces, the needle rollers denoted by Nos. 30 to 33 on which a solid lubricant film was formed in a state of heating to a temperature outside the above described range, and the needle rollers denoted by Nos. 34 to 37 that had a solid lubricant film having an area ratio outside the above described range formed on their surfaces, and the length of the rolling fatigue life was greater by a multiple of 5.6 or more in comparison to No. 27.

In particular, based on the results of Nos. 1 to 6, and Nos. 7 and 8, as well as Nos. 9 to 15 and No. 16, it was found that the rolling fatigue life is further extended by making the area ratio of the solid lubricant film no less than 75%.

Further, based on the results of Nos. 3, 17 and 18, Nos. 11 and 19, and No. 20, it was found that the rolling fatigue life is further extended by making the solid lubricant film thickness no less than 0.10 µm and no more than 8.0 µm.

In addition, based on the results of Nos. 11 and 21, and No. 22, it was found that the rolling fatigue life is further extended by regulating the depth of dimples on the surface on which the solid lubricant film is to be formed to a depth of no less than 0.10 µm and no more than 5.0 µm.

The reason for this is considered to be that by making the dimple depth within the aforementioned range by a shot peening process, the solid lubricant film is formed with greater adherence on the surface of the needle roller, and the surface hardness of the needle roller is also enhanced.

Further, based on the results of No. 3 and Nos. 23 and 24, and the results of No. 11 and Nos. 25 and 26, it was found that the rolling fatigue life is further extended by making the center line average roughness (Ra) of the surface no less than 0.10 µm and no more than 0.50 µm.

Figure 9:
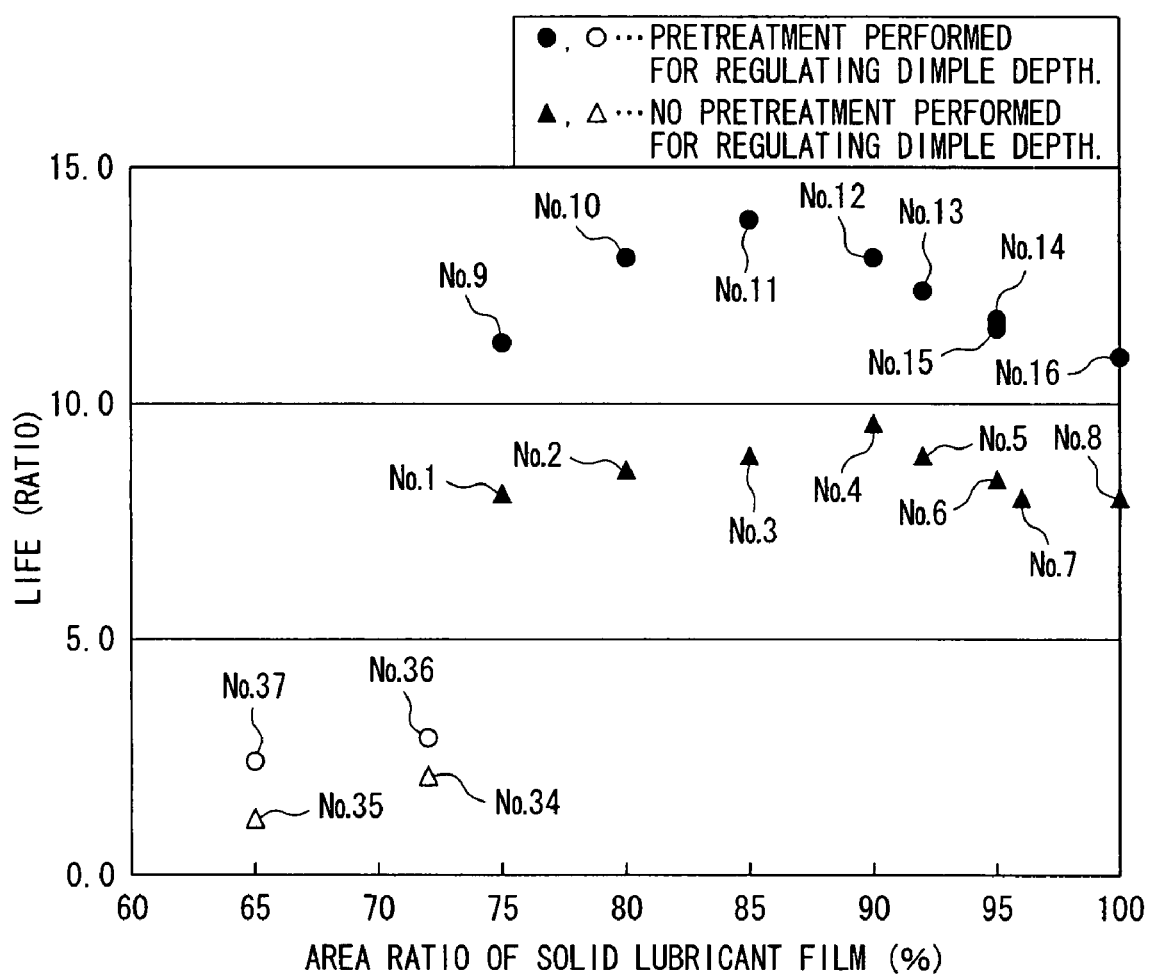
FIG. 9 is a graph illustrating the relation between the area ratio of a solid lubricant film that is formed on the surface of a needle roller and life according to the fourth embodiment.

The graph shown in FIG. 9 that illustrates the relationship between the area ratio of the solid lubricant film and the life was created using the results of Nos. 1 to 16 and Nos. 34 to 37 among the results shown in Table 6. As shown in FIG. 9, it was found that thrust needle roller bearings that used needle rollers on which a solid lubricant film having an area ratio of no less than 75% was formed had a longer life than the case of using needle rollers on which a solid lubricant film having an area ratio of less than 75% was formed.

Further, it was found that thrust needle roller bearings that used needle rollers on which a solid lubricant film was formed after the depth of dimples was regulated by a shot peening process had a longer life than thrust needle roller bearings that used needle rollers on which a solid lubricant film was formed without performing pretreatment.

Based on these results, it was found that by using a needle roller that underwent a shot peening process at a specific temperature condition and that had a solid lubricant film formed at a specific area ratio on the surface thereof, the rolling fatigue life of the thrust needle roller bearing can be increased even when used under an environment of a poor lubrication state in which the oil film parameter Λ is 3 or less.

It was also found that the rolling fatigue life of the thrust needle roller bearing can be further increased by also specifying the thickness of the solid lubricant film to be formed on the needle roller surface, the depth of dimples on the surface, and the center line average roughness.

Although the case of a thrust needle roller bearing was described as an example of a rolling device according to this embodiment, the present invention is not limited thereto, and this invention can be favorably used with a rolling device to be used in an environment in which the lubrication state is poor. Examples of such rolling devices include ball bearings such as a deep groove ball bearing, an angular ball bearing, a self-aligning ball bearing and a thrust ball bearing; and roller bearings such as a cylindrical roller bearing, a self-aligning roller bearing and a thrust roller bearing. As further examples, a linear motion device such as a ball screw, a linear guide and a linear motion bearing, and a rolling bearing unit such as a toroidal continuously variable transmission may be mentioned.

Further, although a case of applying the manufacturing method of this invention to only a needle roller of a thrust needle roller bearing was described according to this embodiment, the present invention is not limited thereto, and the present invention may be applied to manufacture of only an inner ring or only an outer ring, or may be applied to manufacture of two or more members of the group consisting of an inner ring, an outer ring and a needle roller.

Fifth Embodiment

This invention can be applied to a roller bearing such as a tapered roller bearing, a cylindrical roller bearing, or a self-aligning roller bearing.

A rolling bearing receives repeated shear stress during use. Hence the rolling members (inner ring, outer ring, and rolling elements) that constitute a rolling bearing are required to have a high degree of hardness, heavy load resistance, and wear resistance so as to enable lengthening of the rolling fatigue life even when receiving repeated shear stress.

As these rolling members, normally a member is used that has a hardness of HRC 58 to 64 on a surface layer portion that forms a rolling surface that is obtained by performing a quenching and tempering process, or carburization or carbonitriding treatment and a quenching and tempering process on bearing steel such as SUJ2 or case hardening steel such as SCR420.

In particular, a roller bearing that uses a tapered roller, a cylindrical roller, a spherical roller or the like as a rolling element is used when supporting a rotating part on which a large load is applied.

Although this kind of roller bearing has higher rigidity and can be used under heavier load conditions than a ball bearing, because of the large torque there is a problem that the rotational speed at the time of use is limited. For this reason, technology for lowering the torque of roller bearings by adding some contrivance to the design of the roller bearing or by adding some contrivance to the method of supplying lubricating oil has been proposed.

In JP-A-2001-12461, technology is proposed that attempts to reduce the torque while ensuring the rolling fatigue life and bearing rigidity by making a rollers number coefficient k that is represented by $k=(dm/Da) \cdot \sin(180°/z)$ between 1.16 and 1.32 in a case where a contact angle (angle at which the raceway surface of the outer ring inclines with respect to central axis of the outer ring) $\alpha$ is 22 to 28 degrees, a ratio Da/L of a diameter Da of a large diameter side end of a tapered roller and a length L of the tapered roller is 0.51 to 1.0, a pitch diameter of a plurality of tapered rollers is dm, and the number of the tapered rollers is z.

In JP-UM-A-6-40460, technology is proposed that attempts to reduce the torque for a roller bearing that is provided with a through hole along the axis of rotation in the central part of the roller in order to alleviate a concentrated load that is applied to the roller. More specifically, this technology attempts to reduce the torque of the roller bearing by forming a helical groove at the inner circumference of the through hole of the roller to facilitate discharge of foreign substances that were accumulated inside the through hole and enhance the cooling power of the roller itself.

However, both of the technologies described above were devised in consideration of roller bearings to be used in an environment with a favorable lubrication state. Hence, when either of the technologies described above are applied to roller bearings to be used in an environment in which the lubrication state is unfavorable, there is a problem that wear due to metallic contact occurs at the rolling surface between a bearing ring and the roller or at the contact surface between the bearing ring or roller and the cage, and it is thus difficult to reduce the torque of the roller bearing.

Therefore, technology has been proposed for reducing the torque of a roller bearing by suppressing the occurrence of wear due to metallic contact even when the roller bearing is used in an environment in which the lubrication state is unfavorable. Japanese Patent No. 3567942 proposes forming a solid lubricant film that includes at least molybdenum disulfide and tetrafluoroethylene via a binding agent on at least one member of the group consisting of a raceway surface of an inner ring, a raceway surface of an outer ring, a rolling contact surface of a rolling element and a cage riding land.

However, according to the technology disclosed in Japanese Patent No. 3567942, since the solid lubricant film is formed via a binding agent, there is a problem that the performance of the solid lubricant itself that constitutes the solid lubricant film can not be obtained to good effect, and the solid lubricant film is liable to peel off.

The present invention was made in view of the above described circumstances, and an object of this invention is to provide a roller bearing that enables a reduction in torque even when used in an environment in which the lubrication state is not favorable.

To solve the above described problem, the present invention provides a roller bearing comprising an inner ring, an outer ring and a roller that is rollably disposed between the inner ring and the outer ring, characterized in that a solid lubricant film is formed on the surface of at least one member of the group consisting of the inner ring, the outer ring and the roller, at an area ratio of no less than 75% including the rolling surface thereof.

According to this configuration, with respect to at least one constituent member of the group consisting of an inner ring, an outer ring and a roller, since a solid lubricant film is adhesively formed on the surface of the constituent member by forming a solid lubricant film on the surface at a specific area ratio that includes the rolling surface thereof, it is difficult for wear due to metallic contact to occur on the constituent member on which the solid lubricant film was formed. Thus, the torque of the roller bearing can be reduced even when used in an environment in which the lubrication state is unfavorable.

According to the roller bearing of this invention, the solid lubricant film is preferably formed at a thickness of no less than 0.05 μm and no more than 8.0 μm. Thereby, with respect to the constituent member on which the solid lubricant film was formed, it is possible to maintain the necessary strength as a constituent member of the roller bearing while effectively suppressing the occurrence of wear due to metallic contact. Hence, a further reduction in the torque of the roller bearing can be realized even when the roller bearing is used in an environment in which the lubrication state is unfavorable.

In this case, if the solid lubricant film thickness is less than 0.05 μm, the occurrence of wear due to metallic contact on the constituent member cannot be effectively suppressed. In contrast, if the thickness exceeds 8.0 μm the bond strength of the film with respect to the constituent member will not be obtained.

For the roller bearing of this invention, the center line average roughness (Ra) on the surface of the solid lubricant film is preferably no less than 0.10 μm and no more than 0.50 μm.

Further, as common among each of the embodiments, in order to form a solid lubricant film more adhesively on the surface of the constituent member, the center line average roughness (Ra) of the surface of the constituent member before formation of dimples or before formation of the solid lubricant film is preferably no more than 1 μm, and more preferably no less than 0.1 μm and no more than 0.5 μm.

Further, for the roller bearing of this invention, the solid lubricant film is preferably formed on a surface having microdents (dimples) of a depth of no less than 0.10 μm and no more than 5.0 μm.

Thereby, the solid lubricant film is filled into the microdents that were formed on the surface (furthermore, in minute recesses that form the surface roughness), so that the solid lubricant film can be formed further adhesively on the surface of the constituent member. Hence, even when used in an environment in which the lubrication state is unfavorable, the torque of the roller bearing can be reduced even further and superior acoustic characteristics can be realized.

In this case, if the surface micro-dents are less than 0.10 μm, the adherence between the solid lubricant film and the surface of the constituent member is inadequate. In contrast, if the micro-dents exceed 5.0 μm, the effect obtained by the micro-dents is saturated.

The kind of roller bearings according to this invention is not particularly limited, and examples thereof include a tapered roller bearing, a cylindrical roller bearing and a self-aligning roller bearing.

Further, a constituent member to be used in this invention is not particularly limited, and for example a constituent member obtained by subjecting bearing steel such as SUJ2, case hardening steel such as SCR420, or stainless steel such as SUS440 to a quenching and tempering process, or carburization or carbonitriding treatment and a quenching and tempering process may be mentioned.

The term "rolling surface" as used in this invention refers to a rolling surface with a counterpart member, and for example it refers to a raceway surface of an inner ring and outer ring or a rolling contact surface of a roller.

Although the solid lubricant film according to this invention is not particularly limited as long as it is formed on at least a raceway surface of an inner ring and outer ring or a surface that includes a rolling contact surface of a roller, preferably the solid lubricant film is formed on a surface that includes the rolling contact surface of a roller.

A substance used as a raw material of the solid lubricant film used in this invention is not particularly limited as long as it has the required strength when used as a surface film of a constituent member of a roller bearing and has good adherence with the constituent member on which the solid lubricant film is to be formed. As examples thereof, molybdenum disulfide, tungsten disulfide, boron nitride, metallic soap, fluorocarbon resin, nylon, polyacetal, polyolefin, polyester, polyethylene, PTFE (polytetrafluoroethylene), graphite, calcium fluoride, barium fluoride, fluorocarbide, tin, tin alloy, nickel, copper alloy, pure iron, pure copper and pure chromium may be mentioned.

A method of forming the solid lubricant film according to this invention is not particularly limited, and the film may be formed in a similar manner to the first embodiment.

Further, according to the roller bearing of this invention, by further specifying the thickness of the solid lubricant film or the shape of the surface on which to form the solid lubricant film, a further reduction in torque can be realized even when the roller bearing is used in an environment in which the lubrication state is unfavorable.

Figure 10:
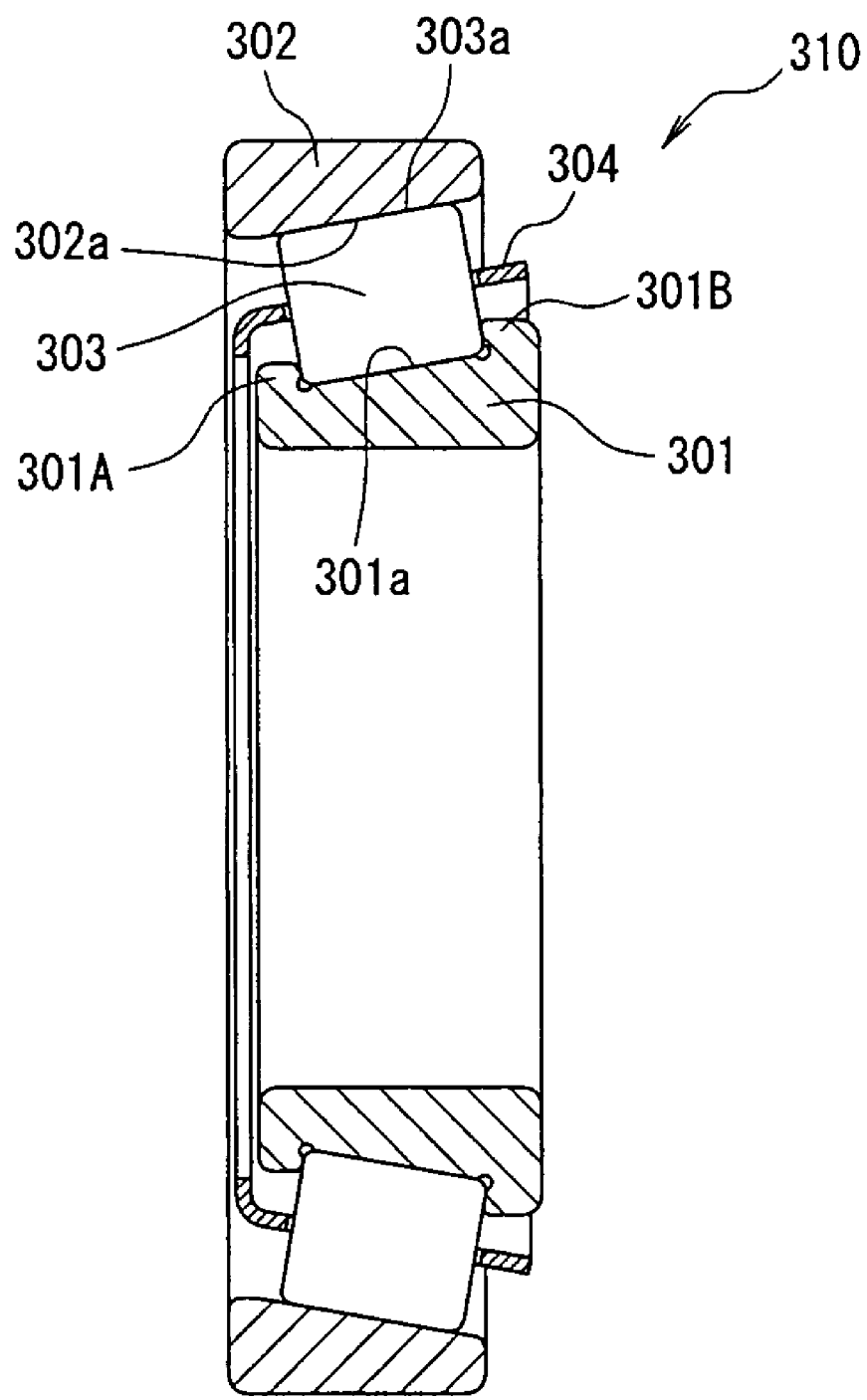
FIG. 10 is a cross section that shows the configuration of a tapered roller bearing according to the fifth embodiment.

Hereunder, the fifth embodiment is described while referring to the drawings. A tapered roller bearing 310 according to this embodiment as shown in FIG. 10 is a tapered roller bearing of the bearing designation HR30307C (internal diameter: 35 mm, external diameter: 80 mm, maximum width: 22.75 mm) made by NSK Ltd.

This tapered roller bearing 310 comprises an inner ring 301 having an inner ring raceway surface (rolling surface) 301a, an outer ring 302 having an outer ring raceway surface (rolling surface) 302a, a plurality of conical rollers 303 having a rolling contact surface (rolling surface) 303a that are rollably disposed between the inner ring raceway surface 301a and the outer ring raceway surface 302a, and a cage 304 that rollably retains the rollers 303.

Face ribs 301A and 301B are formed at both ends in the axial direction of the inner ring 301 in the tapered roller bearing 310, and the tapered roller bearing 310 is configured such that the axial-direction end faces of the roller 303 are guided in a state in which they are in rolling contact with respect to the face ribs 301A and 301B.

The inner ring 301, outer ring 302 and rollers 303 were fabricated in the following manner. First, raw material comprising high-carbon chromium bearing steel type 2 (SUJ2) was processed into the respective shapes of the inner ring 301, the outer ring 302 and the rollers 303, subjected to carbonitriding for 3 hr in a mixed gas atmosphere (RX gas+enriched gas+ammonia gas) at 840° C., and then subjected to oil hardening and tempering. The amount of retained austenite in the respective surface layer portions (portion from surface to depth of 250 μm) of the inner ring 301, the outer ring 302 and the rollers 303 was then adjusted to 15 to 40 vol %, and the hardness of the surface layer portions was adjusted to HRC 62 to 67 (Hv 746 to 900).

Next, the same treatment as described in the first embodiment was carried out for the rollers 303 that were obtained in this manner, to complete the rollers 303 denoted by Nos. 1 to 27 shown in Table 7.

A solid lubricant film was formed on a surface of the roller 303 including the rolling contact surface 303a by accelerating and spraying molybdenum disulfide of a mean particle diameter of 3 μm as specified in JIS R6001 as a solid lubricant in atmosphere.

The film formation method "baking" described in Table 7 refers to a method that is similar to a method described in the above described Japanese Patent No. 3567942. More specifically, a solid lubricant film was formed on a surface including the rolling contact surface 303a of the roller 303 by baking the roller 303 by a heat treatment after spraying with a suspension liquid obtained by adding molybdenum disulfide as a solid lubricant to an alcohol solvent having polyamide-imide mixed therein as a binding agent.

Further, upon measuring the hardness of the roller 303 after formation of the solid lubricant film, in the same manner as in the first embodiment, an improvement of 5 to 20% in the hardness was recognized.

Subsequently, the tapered roller bearing 310 was assembled using the inner ring 301, outer ring 302 and rollers 303 obtained in this manner as well as the cage 304 made of SPCC, and a rotation test was performed under the conditions described below.

Figure 11:
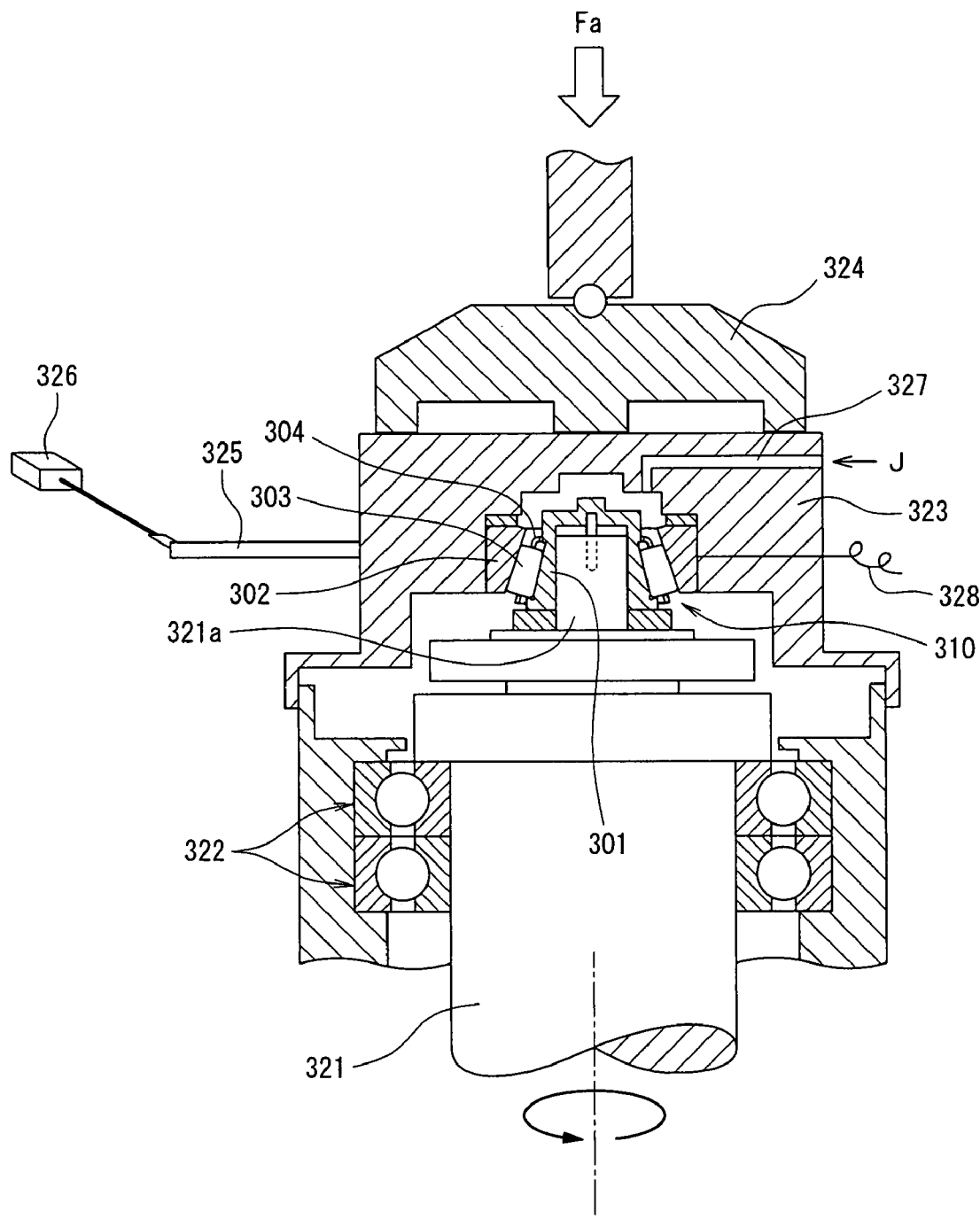
FIG. 11 is a cross section that illustrates a rotation testing machine used in the fifth and sixth embodiments.

The rotation test was carried out using a vertical, rotating inner ring testing machine shown in FIG. 11. As shown in FIG. 11, this testing machine comprises a main shaft 321, a support bearing 322 provided at one end 321a in the axial direction of the main shaft 321, a main body part 323, and a hydrostatic bearing 324 provided on an upper end face in the axial direction of the main body part 323. The testing machine is configured to be used in a state in which the inner ring 301 of the tapered roller bearing 310 as a test bearing is fitted inside the main shaft 321, and the outer ring 302 is fitted inside the main body part 323.

The testing machine is configured such that an axial load Fa can be applied from above the hydrostatic bearing 324. A load cell 326 is connected via a bar 325 to a side face of the main body part 323, to enable detection of the dynamic friction torque that is applied to the main body part 323. Further, a channel 327 for supplying a lubricating oil J to the rolling surface of the tapered roller bearing 310 as a test bearing and a thermocouple 328 for detecting the temperature of the rolling surface are provided on a side face of the main body part 323.

This rotation test was performed by rotating the inner ring 301 under the conditions shown below while supplying an amount of the lubricating oil J that is smaller than a normal amount (300 ml/min), and the bearing torque was measured after rotating the inner ring 301 for a certain time (24 hours). The results are shown in Table 7 as ratios with respect to a case in which the bearing torque of a tapered roller bearing 310 that used a roller 303 denoted by No. 22 as a comparative example is taken as 1.

<Rotation Test Conditions>
Load: 9.8 kN
Rotational speed: 1500 min$^{-1}$
Lubricating oil: turbine oil (ISO VG32)
Bearing oil amount: 200 ml/min
Lubrication oil temperature: 30±3° C.

In particular, based on the results of Nos. 1 to 5 and No. 6, as well as Nos. 7 to 12 and No. 13, it was found that the bearing torque is further reduced by making the area ratio of the solid lubricant film no less than 75%.

Further, based on the results of Nos. 1 to 5, No. 14 and No. 15, as well as Nos. 7 to 12, No. 16 and No. 17, it was found that the bearing torque is further reduced by making the solid lubricant film thickness no less than 0.1 μm and no more than 8.0 μm.

In addition, based on the results of Nos. 7 to 12, No. 18 and No. 19, it was found that the bearing torque is further reduced by regulating the depth of dimples on the surface on which the solid lubricant film is to be formed to a depth of no less than 0.10 μm and no more than 5.0 μm.

Furthermore, based on the results of Nos. 1 to 5 and No. 20, and the results of Nos. 7 to 12 and No. 21, it was found that the bearing torque is further reduced by making the center line average roughness (Ra) of the surface no less than 0.10 μm and no more than 0.50 μm.

Figure 12:
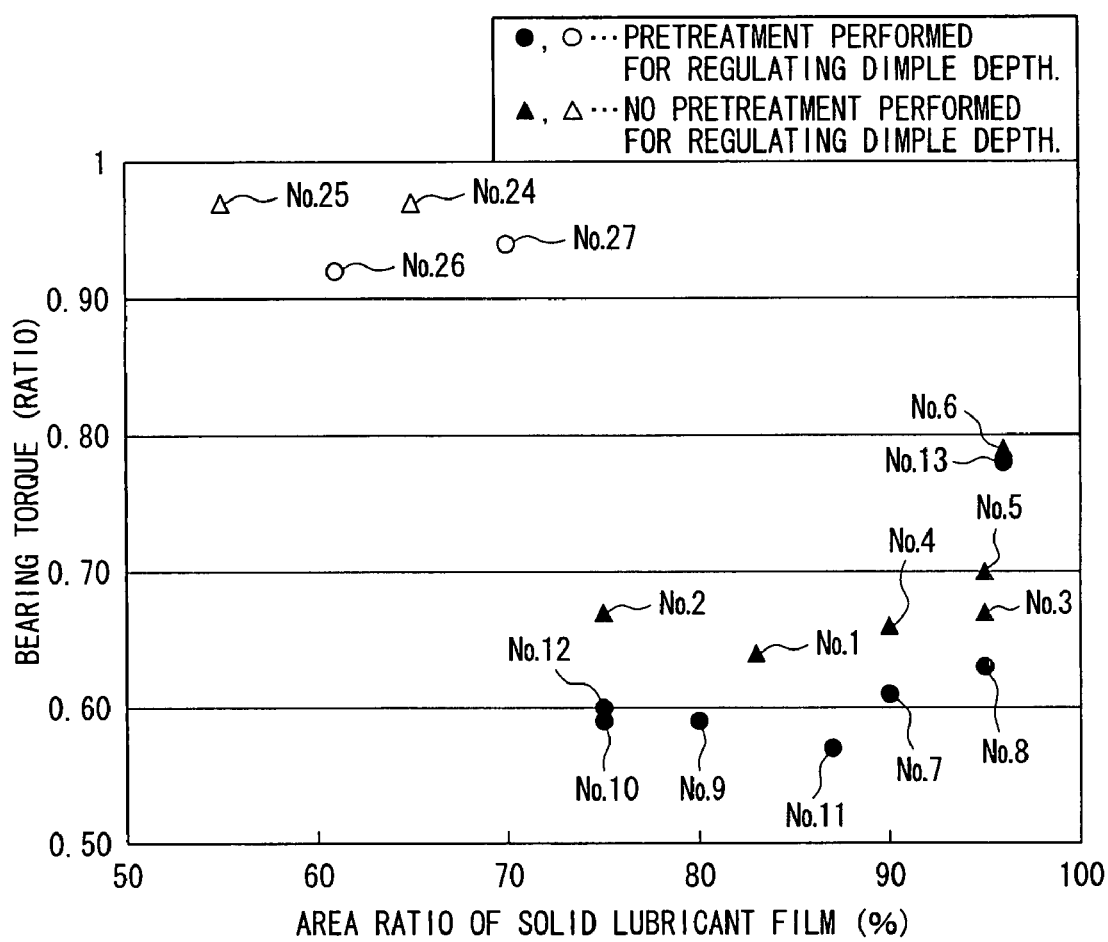
FIG. 12 is a graph illustrating the relation between the area ratio of a solid lubricant film and bearing torque according to the fifth embodiment.

The graph shown in FIG. 12 that illustrates the relationship between the area ratio of the solid lubricant film and bearing

TABLE 7

| | Composition of Conical Rollers | | | | | | Rotation | |
| --- | --- | --- | --- | --- | --- | --- | --- | --- |
| No. | None or Yes of Pretreatment | Film Formation Method | Film Area Ratio (%) | Mean Film Thickness (μm) | Dimple Depth (μm) | Surface Roughness Ra (μm) | Test Result (torque ratio) | Remarks |
| 1 | None | Shot | 83 | 1.0 | — | 0.15 | 0.64 | Invention |
| 2 | None | Shot | 75 | 0.5 | — | 0.20 | 0.67 | Example |
| 3 | None | Shot | 95 | 2.0 | — | 0.15 | 0.67 | |
| 4 | None | Shot | 90 | 2.0 | — | 0.10 | 0.66 | |
| 5 | None | Shot | 95 | 0.5 | — | 0.30 | 0.70 | |
| 6 | None | Shot | 96 | 1.0 | — | 0.35 | 0.79 | |
| 7 | Yes | Shot | 90 | 5.0 | 2.00 | 0.40 | 0.61 | |
| 8 | Yes | Shot | 95 | 2.0 | 5.00 | 0.50 | 0.63 | |
| 9 | Yes | Shot | 80 | 3.0 | 0.10 | 0.45 | 0.59 | |
| 10 | Yes | Shot | 75 | 5.0 | 1.00 | 0.35 | 0.59 | |
| 11 | Yes | Shot | 87 | 8.0 | 3.00 | 0.30 | 0.57 | |
| 12 | Yes | Shot | 75 | 0.1 | 0.50 | 0.35 | 0.60 | |
| 13 | Yes | Shot | 96 | 2.0 | 2.00 | 0.40 | 0.78 | |
| 14 | None | Shot | 85 | 0.05 | — | 0.10 | 0.79 | |
| 15 | None | Shot | 80 | 10.0 | — | 0.30 | 0.79 | |
| 16 | Yes | Shot | 90 | 0.05 | 0.50 | 0.20 | 0.80 | |
| 17 | Yes | Shot | 90 | 12.0 | 5.00 | 0.45 | 0.82 | |
| 18 | Yes | Shot | 75 | 3.0 | 0.05 | 0.25 | 0.81 | |
| 19 | Yes | Shot | 90 | 2.0 | 10.00 | 0.25 | 0.78 | |
| 20 | None | Shot | 75 | 0.5 | — | 0.05 | 0.81 | |
| 21 | Yes | Shot | 90 | 3.0 | 3.00 | 0.55 | 0.80 | |
| 22 | None | Baking | 50 | 10.0 | — | 0.55 | 1 | Comparative |
| 23 | None | — | — | — | — | 0.04 | 1.50 | Example |
| 24 | None | Shot | 65 | 0.5 | — | 0.10 | 0.97 | |
| 25 | None | Shot | 55 | 1.0 | — | 0.25 | 0.97 | |
| 26 | Yes | Shot | 61 | 0.5 | 0.50 | 0.20 | 0.92 | |
| 27 | Yes | Shot | 70 | 1.0 | 1.00 | 0.25 | 0.94 | |

As shown in Table 7, for the tapered roller bearings 310 that used the rollers 303 denoted by Nos. 1 to 21 that had a solid lubricant film formed on their surfaces at an area ratio of no less than 75% by a shot peening process, the bearing torque was small in comparison to a case using the roller 303 denoted by No. 22 that had a solid lubricant film formed on its surface by baking, or using the roller 303 denoted by No. 23 that did not have a solid lubricant film formed on its surface, or using the rollers 303 denoted by Nos. 24 to 27 that had a solid lubricant film having an area ratio outside the above described range formed on their surfaces, and the bearing torque was a ratio of 0.59 or less with respect to that of No. 22.

torque was created using the results of Nos. 1 to 13 and Nos. 24 to 27 among the results shown in Table 7.

As shown in FIG. 12, it was found that bearing torque was less for tapered roller bearings 310 that used rollers 303 on which a solid lubricant film having an area ratio of no less than 75% was formed on a portion including the rolling contact surface 303a in comparison to tapered roller bearings 310 that used rollers 303 on which a solid lubricant film having an area ratio of less than 75% was formed.

Further, it was found that bearing torque was less for tapered roller bearings 310 that used rollers 303 on which a solid lubricant film was formed after performing pretreatment for regulating the depth of dimples in comparison to tapered roller bearings 310 that used rollers 303 on which a solid lubricant film was formed without performing pretreatment.

Based on these results, it was found that by using rollers 303 on which a solid lubricant film having an area ratio of no less than 75% was formed on a portion including the rolling contact surface 303a, the bearing torque of the tapered roller bearing 310 can be reduced even when used in an environment in which the lubrication state is unfavorable.

It was also found that the bearing torque of the tapered roller bearing 310 can be further reduced, even when used in an environment in which the lubrication state is unfavorable, by also specifying the thickness of the solid lubricant film to be formed on the surface of the roller 333, the depth Cf dimples Cn the surface and the center line average roughness.

Although this embodiment described a case in which the present invention was applied to only the rollers 303 of the tapered roller bearing 310, the present invention is not limited thereto, and the present invention may be applied to only the inner ring 301 or only the outer ring 302, or may be applied to two or more members of the group consisting of the inner ring 301, the outer ring 302 and the rollers 303.

Figure 13:
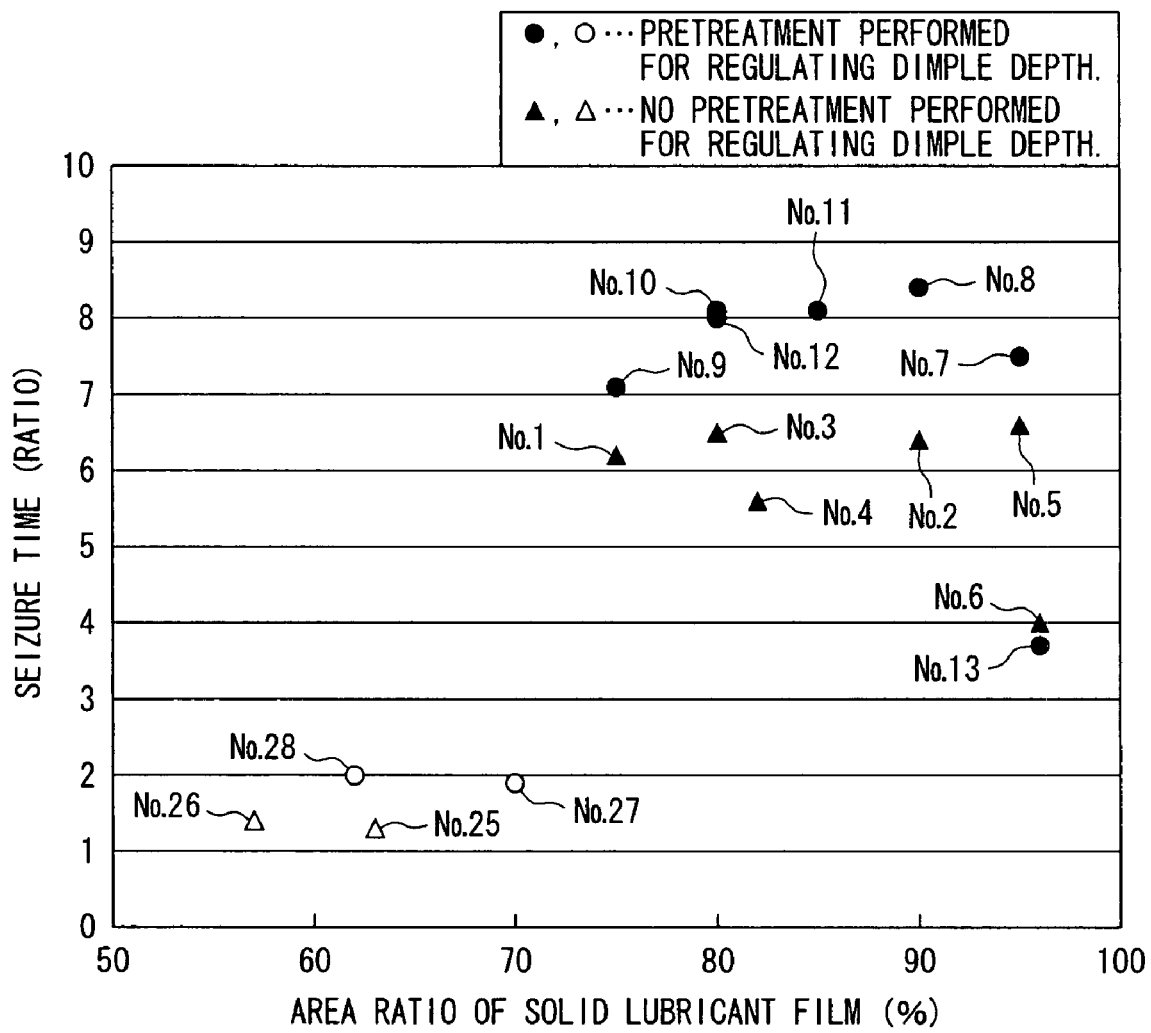
FIG. 13 is a graph illustrating the relation between the area ratio of a solid lubricant film and seizure time according to the sixth embodiment.
Figure 14:
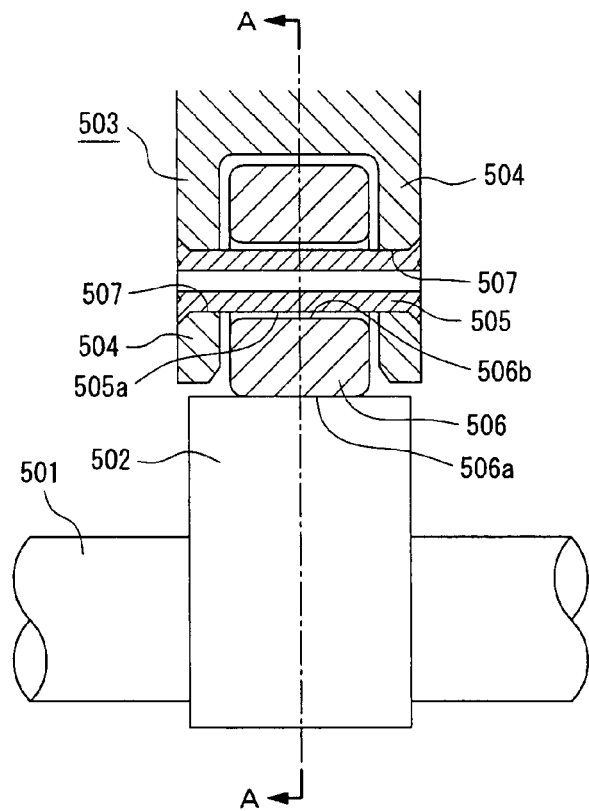
FIG. 14 is a cross section of a tappet roller bearing according to the seventh embodiment.

Further, although according to this embodiment the case of a single-row tapered roller bearing was described as one example of a roller bearing of this invention, the present invention is not limited thereto, and this invention can also be favorably used for other roller bearings to be used in an environment in which the lubrication state is unfavorable. For example, as shown in FIG. 13, this invention may be applied to a back-to-back duplex tapered roller bearing or a face-to-face duplex tapered roller bearing. Further, as shown in FIG. 14, this invention may be applied to various kinds of cylindrical roller bearings, or may be applied to a known self-aligning roller bearing.

Sixth Embodiment

This invention can be applied to a roller bearing such as a tapered roller bearing, a cylindrical roller bearing or a self-aligning roller bearing, and in particular to a roller bearing in which a face rib that supports a roller is formed on at least one bearing ring among the group consisting of an inner ring and an outer ring. This embodiment differs from the fifth embodiment in that a solid lubricant film is provided on only a face rib and the end face of a roller, on only a face rib, or on only an end face of the roller.

In a bearing that has a face rib, even if a lubricating oil film is sufficiently formed between a raceway surface and a roller, unless a lubricating oil film is sufficiently formed on a sliding-contact surface between the face rib and a roller, skewing occurs at the roller and the sliding-contact surface between the face rib and the roller is liable to become displaced towards the outer circumference side. If this displacement grows large, the sliding-contact surface between the face rib and the roller becomes small and the contact pressure of the entire sliding-contact surface increase such that the film thickness of the lubricating oil film becomes thin and, at the same time, an edge stress acts and the lubricating oil film is liable to rupture. As a result, metallic contact is liable to occur on the sliding-contact surface between the face rib and the roller, and surface damage such as scoring or seizure is liable to occur.

The sixth embodiment is described hereunder. Processes that are the same as in the fifth embodiment were performed with the roller in an aligned state, and a molybdenum disulfide film was formed only on the end face of the roller. Thereafter, a test was conducted under the following conditions in the same manner as in the fifth embodiment.

<Seizure Test Conditions>

Load: 9.8 kN

Rotational speed: 300 min$^{-1}$

Lubricating oil: turbine oil (ISO VG32)

Bearing oil amount: 200 ml/min

Lubricating oil temperature: 30±3° C.

TABLE 8

| | | Composition of Conical Rollers | | | | | | |
|---|---|---|---|---|---|---|---|---|
| No. | None or Yes of Pretreatment | Solid Lubricant Film Formation Method | Film Area Ratio (%) | Mean Film Thickness (μm) | Dimple Depth (μm) | Surface Roughness Ra (μm) | Time Until Seizure Occurred (ratio) | Remarks |
| 1 | None | Shot | 75 | 0.5 | — | 0.10 | 6.2 | Invention |
| 2 | None | Shot | 90 | 2.0 | — | 0.25 | 6.4 | Example |
| 3 | None | Shot | 80 | 1.0 | — | 0.20 | 6.5 | |
| 4 | None | Shot | 82 | 1.0 | — | 0.15 | 5.6 | |
| 5 | None | Shot | 95 | 2.0 | — | 0.15 | 6.6 | |
| 6 | None | Shot | 96 | 2.0 | — | 0.20 | 4.0 | |
| 7 | Yes (shot A) | Shot | 95 | 3.0 | 5.00 | 0.50 | 7.5 | |
| 8 | Yes (shot A) | Shot | 90 | 5.0 | 3.00 | 0.45 | 8.4 | |
| 9 | Yes (shot A) | Shot | 75 | 8.0 | 0.20 | 0.45 | 7.1 | |
| 10 | Yes (shot A) | Shot | 80 | 3.0 | 2.00 | 0.30 | 8.1 | |
| 11 | Yes (shot A) | Shot | 85 | 2.0 | 2.00 | 0.15 | 8.1 | |
| 12 | Yes (shot A) | Shot | 80 | 0.1 | 1.00 | 0.20 | 8.0 | |
| 13 | Yes (shot A) | Shot | 96 | 3.0 | 2.00 | 0.30 | 3.7 | |
| 14 | None | Shot | 80 | 0.05 | — | 0.10 | 3.7 | |
| 15 | None | Shot | 85 | 11.0 | — | 0.35 | 4.0 | |
| 16 | Yes (shot A) | Shot | 80 | 0.05 | 3.00 | 0.15 | 4.0 | |
| 17 | Yes (shot A) | Shot | 96 | 10.0 | 5.00 | 0.40 | 3.9 | |
| 18 | Yes (shot A) | Shot | 90 | 3.0 | 0.05 | 0.30 | 3.4 | |
| 19 | Yes (shot A) | Shot | 95 | 5.0 | 8.00 | 0.20 | 3.9 | |
| 20 | None | Shot | 75 | 1.0 | — | 0.05 | 3.8 | |
| 21 | Yes (shot A) | Shot | 95 | 4.0 | 3.00 | 0.55 | 4.0 | |

TABLE 8-continued

| | | Composition of Conical Rollers | | | | | | |
|---|---|---|---|---|---|---|---|---|
| No. | None or Yes of Pretreatment | Solid Lubricant Film Formation Method | Film Area Ratio (%) | Mean Film Thickness (μm) | Dimple Depth (μm) | Surface Roughness Ra (μm) | Time Until Seizure Occurred (ratio) | Remarks |
| 22 | None | <u>Spray</u> | 60 | 3.0 | — | 0.35 | 1 | Comparative Example |
| 23 | Yes (shot B) | — | — | — | 0.50 | 0.15 | 2.0 | |
| 24 | Yes (SF) | — | — | — | — | 0.07 | 0.3 | |
| 25 | None | Shot | <u>63</u> | 0.5 | — | 0.15 | 1.3 | |
| 26 | None | Shot | <u>57</u> | 0.5 | — | 0.26 | 1.4 | |
| 27 | Yes (shot A) | Shot | <u>70</u> | 1.0 | 1.00 | 0.15 | 1.9 | |
| 28 | Yes (shot A) | Shot | <u>62</u> | 2.0 | 1.00 | 0.25 | 2.0 | |

As shown in Table 8, for tapered roller bearings that used the rollers denoted by Nos. 1 to 21 that had a solid lubricant film formed by a shot peening process on a surface of a large-diameter-side end face at an area ratio of no less than 75%, the time until seizure occurred was long in comparison to the case of using the roller denoted by No. 22 that had a solid lubricant film formed on its surface by spray coating, or using the rollers denoted by No. 23 and No. 24 that did not have a solid lubricant film formed on their surface, or using the rollers denoted by Nos. 25 to 28 that had a solid lubricant film having an area ratio outside the above described range formed on their surfaces, and the time until seizure was a multiple of 3.7 or more with respect to that of No. 22.

In particular, based on the results of Nos. 1 to 5 and No. 6, as well as Nos. 7 to 12 and No. 13, it was found that the time until seizure is further increased by making the area ratio of the solid lubricant film that is formed on the large-diameter-side end face of the roller no less than 75% and no more than 95%.

Further, based on the results of Nos. 1 to 5, No. 14 and No. 15, as well as Nos. 7 to 12, No. 16 and No. 17, it was found that the time until seizure is further increased by making the solid lubricant film thickness no less than 0.1 μm and no more than 8.0 μm.

In addition, based on the results of Nos. 7 to 12, No. 18 and No. 19, it was found that the time until seizure is further increased by regulating the depth of dimples on the surface on which the solid lubricant film is to be formed to a depth of no less than 0.10 μm and no more than 5.0 μm.

Furthermore, based on the results of Nos. 1 to 5 and No. 20, and the results of Nos. 7 to 12 and No. 21, it was found that the time until seizure is further increased by making the center line average roughness (Ra) of the surface forming the large-diameter-side end face of the roller no less than 0.10 μm and no more than 0.50 μm.

The graph shown in FIG. 13 that illustrates the relationship between the area ratio of the solid lubricant film that is formed on the large-diameter-side end face of the roller and the time until seizure was created using the results of Nos. 1 to 13 and Nos. 25 to 28 among the results shown in Table 8.

As shown in FIG. 13, it was found that the time until seizure was extended further for tapered roller bearings that used rollers on which a solid lubricant film was formed at an area ratio of no less than 75% on the large-diameter-side end face thereof in comparison to tapered roller bearings that used rollers on which a solid lubricant film having an area ratio of less than 75% was formed.

Further, it was found that time until seizure was extended further for tapered roller bearings that used rollers on which a solid lubricant film was formed after performing pretreatment for regulating the depth of dimples in comparison to tapered roller bearings that used rollers on which a solid lubricant film was formed without performing pretreatment.

Based on these results, it was found that by using rollers on which a solid lubricant film was formed at an area ratio of no less than 75% on the large-diameter-side end face thereof, it was hard for seizure to occur on a sliding-contact surface between a face rib and the roller and the rolling fatigue life of the tapered roller bearing can be extended, even when used in an environment in which it is difficult to adequately form a lubricating oil film on the sliding-contact surface.

It was also found that the rolling fatigue life of the tapered roller bearing can be further extended by also specifying the thickness of the solid lubricant film to be formed on the surface forming the large-diameter-side end face of the roller, or the center line average roughness and depth of dimples on that surface, even when used in an environment in which it is difficult to adequately form a lubricating oil film on the sliding-contact surface between a face rib and the roller.

Although this embodiment described a case in which a solid lubricant film was formed only on a surface forming the large-diameter-side end face of a roller of a tapered roller bearing, this invention is not limited thereto, and in addition to a surface forming the large-diameter-side end face of a roller, the solid lubricant film may be formed on a surface forming the small-diameter-side end face of a roller, or on an internal surface of an inner ring on which a face rib was formed that makes a sliding contact with the roller.

Further, although according to this embodiment a case was described of applying this invention to a tapered roller bearing in which a face rib makes a sliding contact with a roller was formed on an inner ring, the present invention is not limited thereto, and this invention can also be applied to a tapered roller bearing in which a face rib that makes a sliding contact with a roller is formed on an outer ring.

Further, although according to this embodiment the case of a single-row tapered roller bearing was described as one example of a roller bearing according to this invention, the present invention is not limited thereto, and this invention can also be applied to other roller bearings to be used in an environment in which it is difficult to adequately form a lubricating oil film on a sliding-contact surface between a face rib and a roller. For example, although not illustrated in the drawings, the present invention may also be applied to a known cylindrical roller bearing or self-aligning roller bearing or the like.

Seventh Embodiment

This invention can be applied to a tappet roller bearing, and more particularly to a tappet roller bearing that is favorably used in a driven component such as an air supply and exhaust valve driving apparatus or a fuel injection device of an internal combustion engine.

With the object of reducing the rate of fuel consumption and decreasing wear inside the engine, a tappet roller bearing is commonly utilized at a section that converts the rotation of a cam shaft that is synchronized with a crankshaft to a reciprocating motion of an air supply valve and exhaust valve.

For example, a configuration forth is kind of tappet roller bearing is disclosed in JP-A-2000-34907. More specifically, a rocker arm that is an oscillating member that receives a motion of a cam that is fixed to a cam shaft that rotates in synchrony with an engine crankshaft is provided facing the cam. A pair of supporting wall portions are provided at the ends of this rocker arm with a clearance between the pair of supporting wall portions, and a steel support shaft hangs between the pair of supporting wall portions. The support shaft is passed through a through hole of a tappet roller that contacts against the outside edge of the cam, and rotatably supports the tappet roller.

Since the outside edge of the cam and the outside edge of the tappet roller, and the outside edge of the support shaft and the inside edge of the tappet roller make a rolling contact at the time of engine operation, these portions are lubricated with engine oil. According to a valve driving mechanism of an engine incorporating a tappet roller bearing configured in this manner, since a frictional force between the rocker arm and the cam is reduced, it is possible to decrease the rate of fuel consumption at the time of engine operation.

Since a large force is applied to a rolling contact portion between the outside edge of a tappet roller constituting this kind of tappet roller bearing and the outside edge of a cam as a counterpart member as well as to a rolling contact portion between the inside edge of the tappet roller and the outside edge of a support shaft as a counterpart member under a lean lubrication environment at a time of rotation, there is a problem that surface damage such as abrasion or peeling occurs at these rolling contact portions. Consequently, various devices are implemented conventionally to improve the lubricity of these rolling contact portions.

For example, Japanese Patent No. 2758518 (hereunder, referred to as Publication 8-2) discloses technology that improves oil film retention by use of an oil reservoir effect (micro-elastohydrodynamic lubrication effect) that uses minute dents that are randomly formed on a sliding surface as effect means for decreasing surface damage on the outside edge of the tappet roller. Further, Japanese Patent No. 3496286 (hereafter, referred to as Publication 8-3) discloses technology that forms a surface-treated layer on the surface of the support shaft and the tappet roller by baking a solid lubricant film together with a thermosetting resin as effective means for reducing surface damage on the inside edge of the tappet roller and the outside edge of the support shaft.

However, although the technology disclosed in Publication 8-2 attempts to extend the roller life by modifying the shape of the rolling surface and is effective means for reducing surface damage, it has been found that there is a limit to the enhancement of the roller life achieved by only performing a surface treatment that forms oil reservoirs having a skewness Rsk value of not more than −1.6 on the rolling surface.

Further, when a surface-treated layer is formed by baking a solid lubricant film together with a thermosetting resin as in the technology disclosed in Publication 8-3, heat treatment is required for the baking and this increases the cost. Also, since thermosetting resin is used as a binder, a proportion occupied by the solid lubricant is limited and thus the inherent performance of the solid lubricant can not be adequately utilized and room for improvement remains.

An object of this invention is to solve the problems of the prior art as described above, and to provide a tappet roller bearing with a long life in which it is difficult for failures such as smearing, seizure, abrasion, peeling and the like to occur, even when used in a lean lubrication environment or an exhausted lubrication environment.

To solve the problems, this invention has the following configuration. More specifically, a tappet roller bearing according to this invention is provided in a tappet that moves in correspondence with rotation of a cam, and comprises a roller that contacts against the cam, and a support shaft that rotatably supports the roller, characterized in that a lubricant film formed of a solid lubricant is coated at an area ratio of 75% or more on a portion of at least one member of the group consisting of a surface of the roller that contacts with the cam, a surface of the roller that contacts with the support shaft, and a surface of the support shaft that contacts with the roller.

By adopting this configuration, since metal-to-metal contact is inhibited by the lubricant film, even when used, for example, in a lean lubrication environment or an exhausted lubrication environment, the occurrence of failures such as smearing, seizure, abrasion, peeling and the like are reduced, resulting in a longer life. When the area ratio of the portion on which the lubricant film is coated is less than 75%, there is a risk that the life of the tappet roller bearing will be insufficient.

In the tappet roller bearing according to this invention, the lubricant film thickness is preferably no less than 0.05 μm and no more than 8 μm.

According to this configuration, the tappet roller bearing has a longer life. If the lubricant film thickness is less than 0.05 μm, there is a risk that the lubricity will be insufficient. In contrast, if the lubricant film thickness exceeds 8 μm, there is a risk that the strength of the lubricant film will be insufficient and the lubricant film will be liable to drop off. If the lubricant film drops off, there is a risk that it will act as a foreign substance and cause acoustic faults and vibrations.

Further, in the tappet roller bearing of this invention, preferably dimples of a depth of no less than 0.1 μm and no more than 5 μm are provided on at least a portion on which the lubricant film is coated among the group consisting of the surface of the roller that contacts with the cam, the surface of the roller that contacts with the support shaft, and the surface of the support shaft that contacts with the roller.

According to this configuration, since the solid lubricant is filled in the dimples to improve the adherence between the portion on rich the lubricant film was coated and the lubricant film, the tappet roller bearing will have a longer life in comparison to a case without dimples. Further, since the solid lubricant is trapped inside the dimples when the tappet roller bearing is driven, the effect of the lubricant film is maintained longer. In order to obtain this effect, the depth of the dimples is preferably no less than 0.1 μm. Since no additional effect can be anticipated even if the depth of the dimples exceeds 5 μm, the depth of the dimples is preferably made no more than 5 μm. To make this effect even more reliable, the dimple depth is more preferably made no less than 0.2 μm and no more than 3 μm.

Further, in the tappet roller bearing of this invention, the center line average roughness Ra on the surface of the lubricant film is preferably no less than 0.1 μm and more than 1 μm.

With this configuration, as well as a long life, the acoustic characteristics of the tappet roller bearing are also favorable. If the center line average roughness Ra exceeds 1 μm, the lubrication conditions become severe and surface origin flaking may occur. In this connection, the ability to form a lubricant film does not noticeably decrease even when the center line average roughness Ra is a value as described above.

The tappet roller bearing of this invention as described above has a long life.

Figure 15:
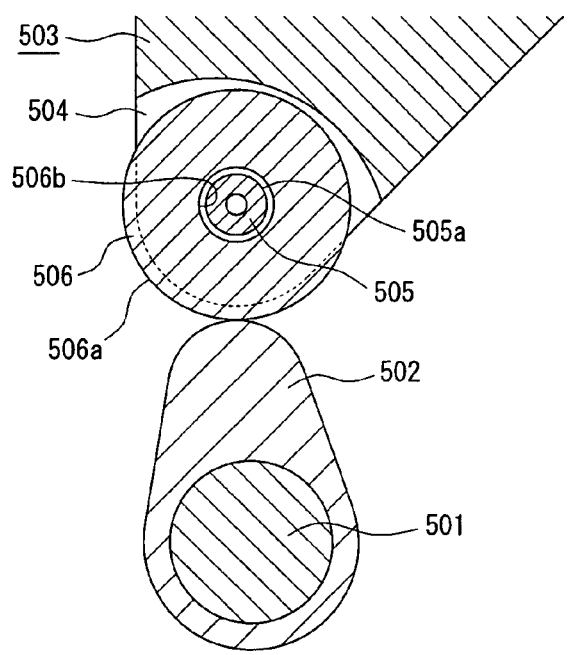
FIG. 15 is across section along a line A-A of the tappet roller bearing shown in FIG. 14.

The tappet roller bearing according to the seventh embodiment will now be described in detail referring to the drawings. FIG. 14 is a view of a cross section in a case where a tappet roller bearing is cut on the surface along the axial direction, and FIG. 15 is a cross section along a line A-A of the tappet roller bearing shown in FIG. 14. For the respective drawings described hereafter, the same symbols are assigned to identical or corresponding parts.

For the purpose of reducing friction inside the engine and decrease the rate of fuel consumption, the tappet roller bearing shown in FIGS. 14 and 15 is utilized at a section that converts the rotation of a cam shaft that is synchronized with a crankshaft to a reciprocating motion of an air supply valve and an exhaust valve.

A rocker arm 503 (tappet) that oscillates in correspondence to the rotation of a cam 502 that is fixed to a cam shaft 501 that rotates in synchrony with an unshown engine crankshaft is disposed facing the cam 502. A pair of supporting wall portions 504, 504 are provided at the end of the rocker arm 503 with a clearance between the pair of supporting wall portions 504 and 504, and a hollow or solid support shaft 505 made of steel hangs between the pair of supporting wall portions 504 and 504. The two ends of the support shaft 505 are not subjected to quenching, and when fixing the support shaft 505 to the supporting wall portions 504, 504, these non-quenched parts are inserted into through holes 507, 507 formed in the supporting wall portions 504, 504 and attached by caulking.

The support shaft 505 is passed through a through hole provided at the core of a tappet roller 506, and rotatably supports the tappet roller 506. The outside edge of the tappet roller 506 contacts against the outside edge of the cam 502.

A lubricant film (not shown) composed of a solid lubricant is coated at an area ratio of no less than 75% on at least one member of the group consisting of a contact surface 506a of the tappet roller 506 with the cam 502 (outside edge of the tappet roller 506), a contact surface 506b of the tappet roller 506 with the support shaft 505 (inside edge of the tappet roller 506), and a contact surface 505a of the support shaft 505 with the tappet roller 506 (outside edge of the support shaft 505).

The thickness of this lubricant film is preferably no less than 0.05 μm and no more than 8 μm. Further, dimples of a depth of no less than 0.1 μm and no more than 5 μm are preferably provided on at least a portion on which the lubricant film is coated among the group consisting of the contact surface 506a of the tappet roller 506 with the cam 502, the contact surface 506b of the tappet roller 506 with the support shaft 505, and the contact surface 505a of the support shaft 505 with the tappet roller 506. The center line average roughness Ra of at least a portion on which the lubricant film is coated among the group consisting of the contact surface 506a of the tappet roller 506 with the cam 502, the contact surface 506b of the tappet roller 506 with the support shaft 505, and the contact surface 505a of the support shaft 505 with the tappet roller 506 is preferably no less than 0.1 μm and no more than 1 μm.

Thus, since metal-to-metal contact is inhibited by the lubricant film, it is difficult for failures such as smearing, seizure, abrasion, peeling and the like to occur even when the tappet roller bearing is used in a lean lubrication environment or an exhausted lubrication environment, and the tappet roller bearing has a long life.

Engine oil is supplied to the section in which the tappet roller 506 is provided at the time of engine operation. By means of that engine oil, the area between the outside edge of the cam 502 and the outside edge of the tappet roller 506, and the area between the outside edge of the support shaft 505 and the inside edge of the tappet roller 506 is lubricated.

Figure 16:
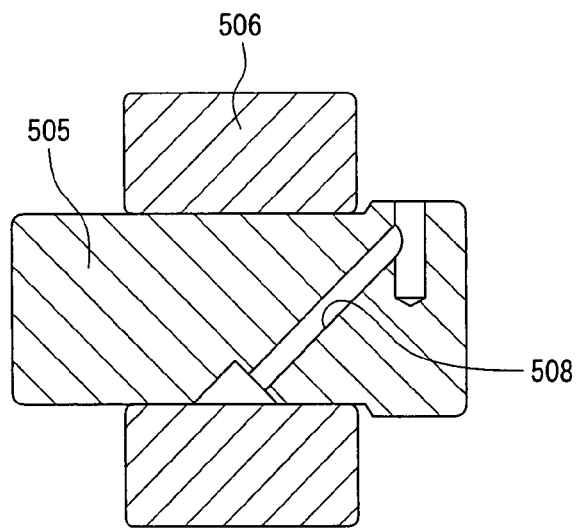
FIG. 16 is a cross-section showing a modification example of the tappet roller bearing shown in FIG. 14.

At this time, in order to ensure that engine oil is efficiently supplied to the area between the outside edge of the support shaft 505 and the inside edge of the tappet roller 506, as shown in FIG. 16, an oil feed hole 508 may be provided in the support shaft 505. In the case of the tappet roller bearing as shown in FIG. 16, the two ends of the oil feed hole 508 open into an end that protrudes to outside the tappet roller 506 and an intermediate part that is disposed on the inward side of the tappet roller 506, respectively, along the outside edge of the support shaft 505. Engine oil is thus supplied with a high degree of efficiency from an outer space to an area between the outside edge of the support shaft 505 and the inside edge of the tappet roller 506 via the oil feed hole 508.

Figure 17:
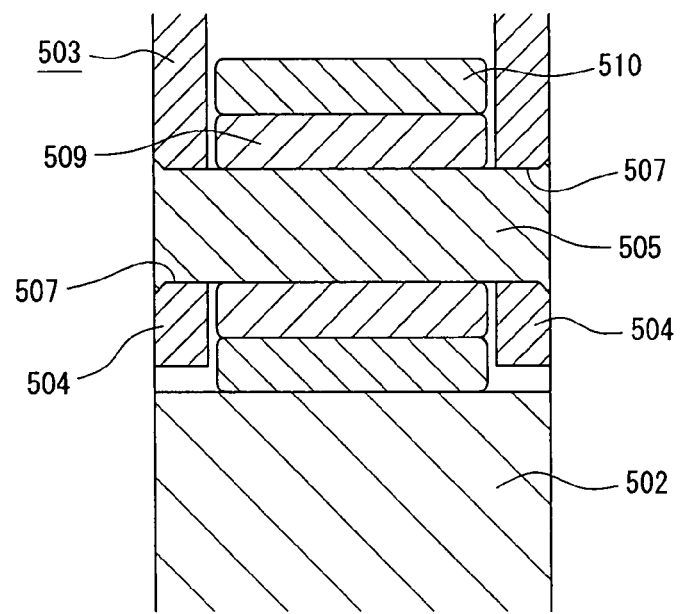
FIG. 17 is across section showing another modification example of the tappet roller bearing shown in FIG. 14.

To decrease rotational resistance of the tappet roller, the tappet roller may have a double structure as shown in FIG. 17. In the case shown in FIG. 17, an inner-diameter-side roller 509 is rotatably supported at the periphery of the support shaft 505, and outer-diameter-side rollers 510 are rotatably supported with respect to the inner-diameter-side roller 509 at the periphery of the inner-diameter-side roller 509. By having a sliding surface at two places through configuration of the tappet roller with a double structure in this manner, the rotation of the outer-diameter-side roller 510 that contacts with the cam 502 is performed smoothly. In this case also, engine oil is supplied to the area between the opposing peripheral surfaces of the support shaft 505 and the inner-diameter-side roller 509 and the area between the opposing peripheral surfaces of the inner-diameter-side roller 509 and each of the outer-diameter-side rollers 510 at the time of engine operation, to thereby lubricate each of these areas.

Figure 18:
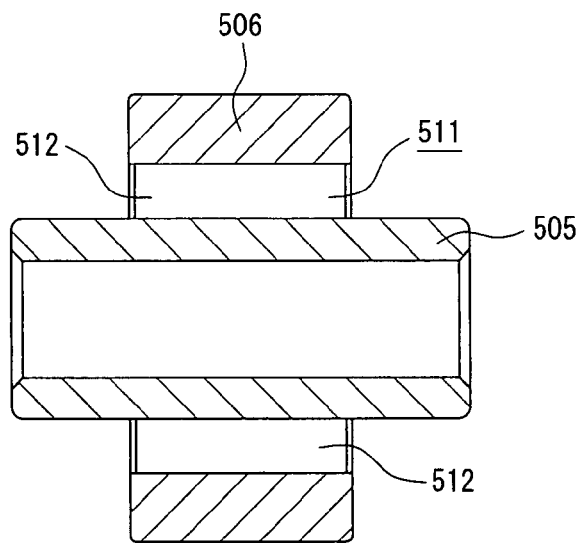
FIG. 18 is across-section showing a further modification example of the tappet roller bearing shown in FIG. 14.

Furthermore, to also reduce the rotational resistance of the tappet roller, as shown in FIG. 18, a radial needle bearing 511 may be provided between the support shaft 505 and the tappet roller 506, to rotatably support the tappet roller 506 through this radial needle bearing 511. In the case illustrated in FIG. 18 also, engine oil is supplied to the radial needle bearing 511 at the time of engine operation to lubricate the rolling contact surface of a plurality of needles 512 comprising the radial needle bearing 511 as well as a rolling contact section between the outside edge of the support shaft 505 and the inside edge of the tappet roller 506.

Figure 19:
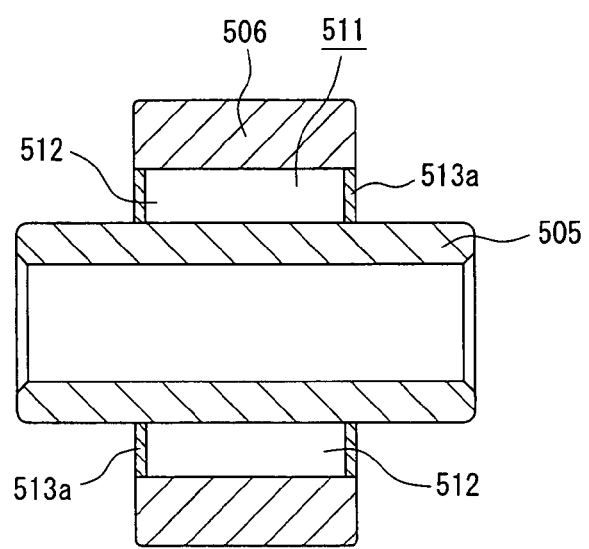
FIG. 19 is across-section showing a further modification example of the tappet roller bearing shown in FIG. 14.
Figure 20:
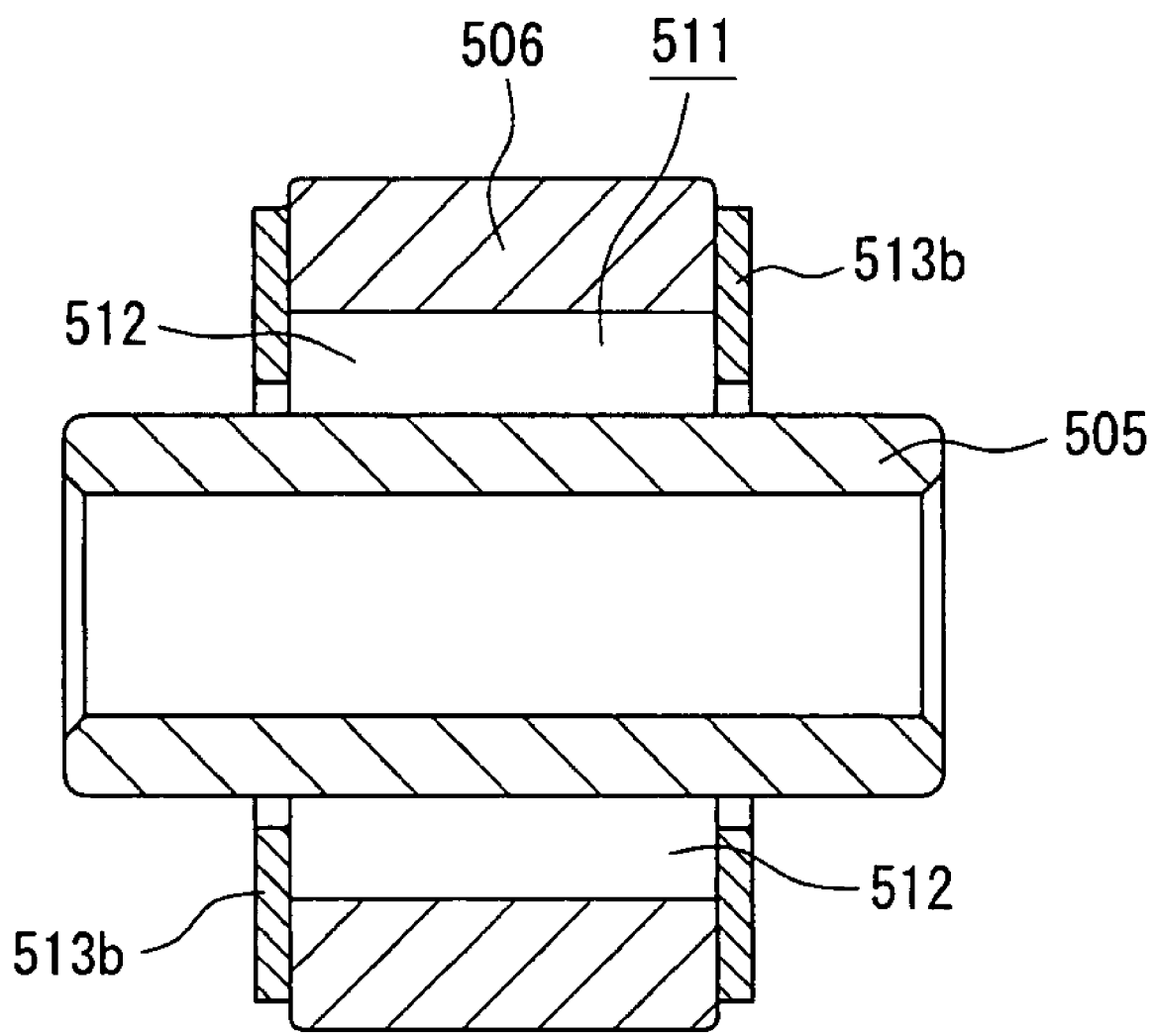
FIG. 20 is a cross-section showing a further modification example of the tappet roller bearing shown in FIG. 14.

The tappet roller bearing may also be configured as shown in FIGS. 19 and 20. More specifically, in the example shown in FIG. 19, annular slide washers 513a, 513a are provided at both end sides in the axial direction of the plurality of needles 512 that constitute the radial needle bearing 511. In the example shown in FIG. 20, annular slide washers 513b, 513b are provided at both end sides in the axial direction of the tappet roller 506 and the plurality of needles 512, respectively. In order that direct contact does not occur between the two sides of the needles 512 and the tappet roller 506 and the inner surfaces of the pair of supporting wall portions 504, 504

(see FIGS. 14 and 17), the sliding resistance of each of these contact parts can be decreased by the slide washers 513a and 513b.

Example

This invention is described more specifically by way of the following examples. Various tappet roller bearings having substantially the same configuration as the tappet roller bearing shown in FIG. 14 as shown above were prepared to carry out a rotation test, and evaluate the life and the like of the samples.

The method of manufacturing the tappet roller and support shaft will now be described in detail. First, high-carbon chromium bearing steel SUJ2 that was employed as the raw material for the tappet roller and support shaft was subjected to carbonitriding for 2 to 4 hr in a mixed gas atmosphere including RX gas, enriched gas and ammonia gas at 820 to 890° C., and then subjected to oil hardening at 60 to 100° C., tempering for 2 hr at 150 to 190° C., and then finished by grinding.

The surface hardness after grinding was adjusted to HRC 62 to 67, the amount of retained austenite in a surface layer of a thickness of at least 1 μm was adjusted to 15 to 40 vol %, the carbon content of the surface layer was adjusted to 1.0 to 2.0 mass %, and the nitrogen content of the surface layer was adjusted to 0.05 to 0.5 mass %. To suppress surface damage and increase the life, the surface hardness of the surface layer is preferably made harder than the cam, and to achieve an even longer life it is more preferable to perform carbonitriding treatment as in the present embodiment to achieve a hardness of HRC 62.

The amount of retained austenite of the surface layer is preferably no less than 15 vol % to suppress surface damage, and preferably no more than 40 vol % to maintain surface hardness. The carbon content of the surface layer is preferably no less than 1.0 mass % to suppress abrasion, and preferably no more than 2.0 mass % to inhibit generation of giant carbides. The nitrogen content of the surface layer is preferably no less than 0.05 mass % in order to suppress abrasion, and preferably no more than 0.5 mass % to inhibit dropping off of the carbonitriding layer and to shorten the carbonitriding time. When providing minute dimples by barrel treatment or a shot peening process after finishing by grinding, the surface roughness after by grinding is preferably no more than 1 μmRa in order to make a suitable depth and dimple shape.

The tappet roller and support shaft obtained in this manner are subjected to similar treatment as in the first embodiment. The surfaces to undergo treatment are the outside edge and inside edge of the tappet roller and the outside edge of the support shaft, and these surfaces are referred to as "treatment surface" in the following description. Tin powder of a mean particle diameter of 45 μm or molybdenum disulfide powder of a mean particle diameter of 3 μm was used as the solid lubricant.

Although tin or molybdenum disulfide was used as the solid lubricant in this example, the kind of solid lubricant is not particularly limited. For example, polyethylene, fluorocarbon resin, nylon, polyacetal, polyolefin, polyester, polytetrafluoroethylene, metallic soap, tungsten disulfide, boron nitride, graphite, calcium fluoride, barium fluoride and tin alloy can be used. However, since it is preferable to use a high-purity solid lubricant in order to suppress peeling of the lubricant film or a decrease in the lubricity of the lubricant film caused by impurities, a substance with a purity of at least 95% is preferable, and a substance with a purity of at least 98% is more preferable.

After coating with the lubricant film, the surface hardness was measured using a microhardness meter in a similar manner to the first embodiment, and an improvement in hardness of 5 to 25% was observed.

Figure 21:
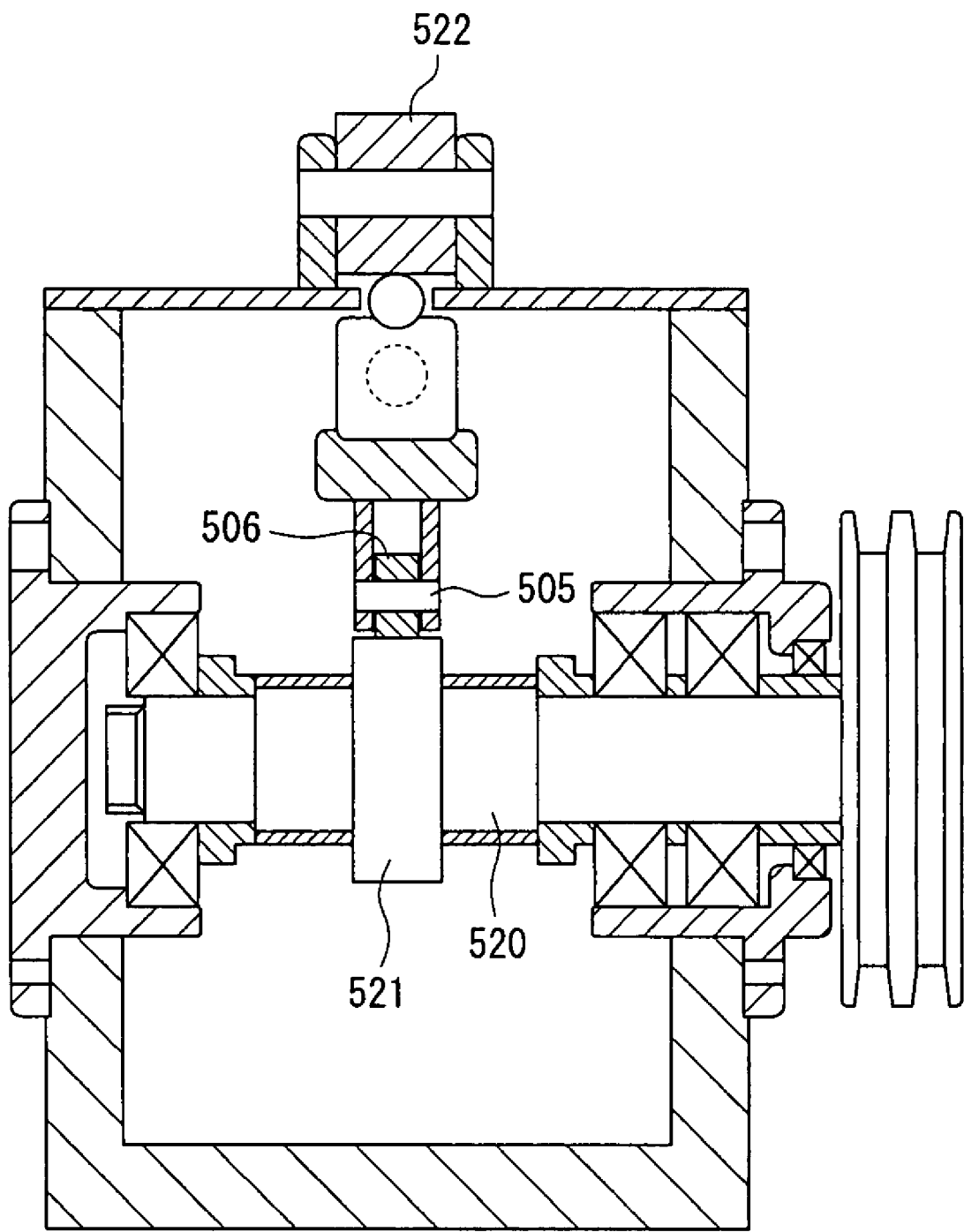
FIG. 21 is a cross section showing the configuration of a surface damage testing machine that performs an endurance test for a tappet roller.

Next, the method of assessing the performance of the tappet roller bearing will be described. Tappet roller bearings in which a lubricant film was coated on a contact surface of the tappet roller with the cam (outside edge of tappet roller) and in which a lubricant film was not coated on a contact surface of the tappet roller with the support shaft (inside edge of tappet roller) and the contact surface of the support shaft with the tappet roller (outside edge of support shaft), were mounted on a surface damage testing machine as shown in FIG. 21 and rotated, and the state of surface damage formed on the outside edge of the tappet rollers and the life of the tappet roller bearings were assessed.

The coverage ratio of the lubricant film that was coated on the contact surface of the tappet roller with the cam (outside edge of tappet roller), the mean thickness of the lubricant film, the dimple depth, and the center line average roughness Ra of the contact surface are as shown in Tables 9 and 10.

TABLE 9

| | | Lubricant Film | | | Center Line Average | Rate of Surface Damage |
|---|---|---|---|---|---|---|
| | Pretreatment Type[1] | Coverage Ratio[2] | Thickness[3] | Dimple Depth[3] | Roughness Ra[3] | Occurrence (%) |
| Example 1 | None | 78 | 1.0 | 0.2 | 0.26 | 10 |
| Example 2 | None | 80 | 0.5 | 0.3 | 0.25 | 10 |
| Example 3 | None | 75 | 0.1 | 0.2 | 0.15 | 10 |
| Example 4 | None | 88 | 1.5 | 0.1 | 0.10 | 10 |
| Example 5 | None | 95 | 1.0 | 0.5 | 0.25 | 10 |
| Example 6 | None | 84 | 0.5 | 1.0 | 0.25 | 10 |
| Example 7 | Shot | 95 | 3.0 | 5.0 | 0.75 | 0 |
| Example 8 | Barrel | 75 | 8.0 | 0.5 | 0.40 | 0 |
| Example 9 | Shot | 85 | 1.0 | 4.0 | 1.00 | 0 |
| Example 10 | Barrel | 90 | 2.0 | 2.0 | 0.50 | 0 |
| Example 11 | Shot | 82 | 0.5 | 1.0 | 0.60 | 0 |
| Example 12 | Shot | 90 | 2.5 | 3.0 | 0.35 | 0 |

TABLE 9-continued

|  | Pretreatment Type[1] | Lubricant Film | | | Center Line Average Roughness Ra[3] | Rate of Surface Damage Occurrence (%) |
|---|---|---|---|---|---|---|
|  |  | Coverage Ratio[2] | Thickness[3] | Dimple Depth[3] |  |  |
| Example 13 | None | 95 | 0.05 | 0.5 | 0.25 | 20 |
| Example 14 | None | 90 | 10 | 0.5 | 0.15 | 20 |

[1] shot: shot peening process; barrel: barrel treatment
[2] numerical values represent area percentage units
[3] numerical values represent μm units

TABLE 10

|  | Pretreatment Type[1] | Lubricant Film | | | Center Line Average Roughness Ra[3] | Rate of Surface Damage Occurrence (%) |
|---|---|---|---|---|---|---|
|  |  | Coverage Ratio[2] | Thickness[3] | Dimple Depth[3] |  |  |
| Example 15 | Shot | 86 | 0.05 | 3.0 | 0.30 | 20 |
| Example 16 | Barrel | 82 | 10 | 2.0 | 0.20 | 20 |
| Example 17 | None | 84 | 1.0 | 0.05 | 0.20 | 20 |
| Example 18 | None | 94 | 0.5 | 7.0 | 0.20 | 20 |
| Example 19 | Shot | 78 | 5.0 | 0.05 | 0.40 | 20 |
| Example 20 | Barrel | 76 | 2.0 | 7.0 | 0.35 | 20 |
| Comparative Example 1 | Barrel | 0 | — | 1.5 | 0.23 | 60 |
| Comparative Example 2 | None | 0 | — | — | 0.05 | 100 |
| Comparative Example 3 | Shot | 0 | — | 0.5 | 0.80 | 80 |
| Comparative Example 4 | None | 71 | 0.2 | 0.1 | 0.20 | 60 |
| Comparative Example 5 | None | 65 | 0.1 | 0.3 | 0.20 | 60 |
| Comparative Example 6 | Shot | 64 | 0.5 | 1.0 | 0.25 | 50 |
| Comparative Example 7 | Shot | 69 | 2.0 | 2.0 | 0.35 | 50 |

[1] shot: shot peening process; barrel: barrel treatment
[2] numerical values represent area percentage units
[3] numerical values represent μm units A ring 521 that corresponds to a cam is attached to the midsection of a rotating shaft 520 that is rotatingly driven by an unshown electric motor. The outside edge of the tappet roller 506 is rotatably supported by the support shaft 505, and is pressed toward the outside edge of the ring 521 by a radial load from a load lever 522. A rotation test was performed under the following conditions in a state in which lubricating oil was dropped between the outside edge of the tappet roller 506 and the outside edge of the ring 521, and lubricating oil was not dropped between the inside edge of the tappet roller 506 and the outside edge of the support shaft 505.

Rotational speed of tappet roller: 2000 min$^{-1}$

Radial load: 1960N

Lubricating oil: engine oil

Lubricating oil temperature: 110° C.

Lubricating oil dropping amount: 0.1 ml/min

Figure 22A:
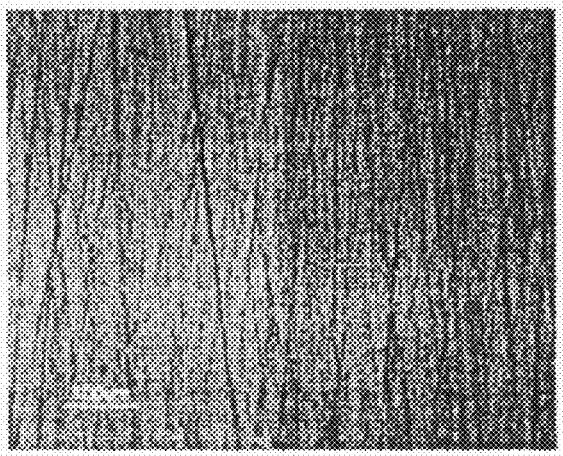
FIGS. 22A and 22B are views showing the situation of occurrence of surface damage before and after a rotation test.
Figure 22B:
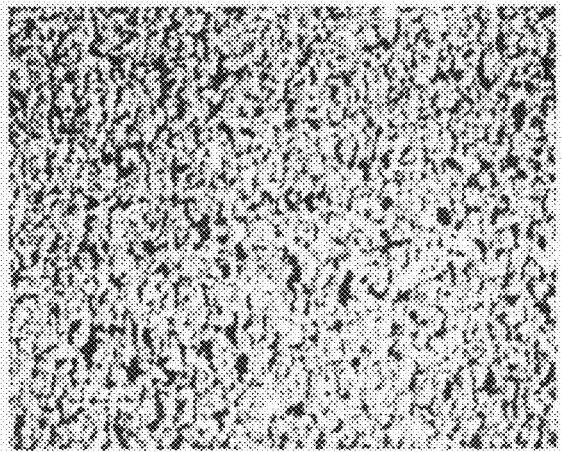

After conducting the rotation test for 20 hr, surface damage at the outside edge of the tappet roller 506 was observed using a metallurgical microscope. The test was conducted for 10 tappet rollers, and the proportion of tappet rollers in which surface damage was recognized was calculated as the rate of surface damage occurrence. For example, in a case where surface damage was not recognized on all of the tappet rollers, the rate of surface damage occurrence is 0%. The results are shown in Tables 9 and 10. In this connection, FIGS. 22A and 22B show optical microscope photographs of the outside edge of a tappet roller before and after the rotation test. Minute peeling of the surface that was not seen before the rotation test can be seen after the rotation test.

Since Examples 1 to 20 are cases in which a lubricant film is coated at an area ratio of no less than 75%, the samples of these examples have a significantly longer life than the samples of Comparative Example 1 that is in accordance with the prior art (technology described in the aforementioned Publication 8-2), and the rate of surface damage occurrence was no more than 20%. The samples of Comparative Example 1 did not have a lubricant film, and the skewness Rsk value as a surface roughness parameter was −1.6 or less. In this connection, the samples of Comparative Examples 1 to 3 did not have a lubricant film, aid a barrel treatment was performed as pretreatment in Comparative Example 1, grinding was performed as pretreatment in Comparative Example 2, and a two-stage shot peening process was performed as pretreatment in Comparative Example 3.

Figure 23:
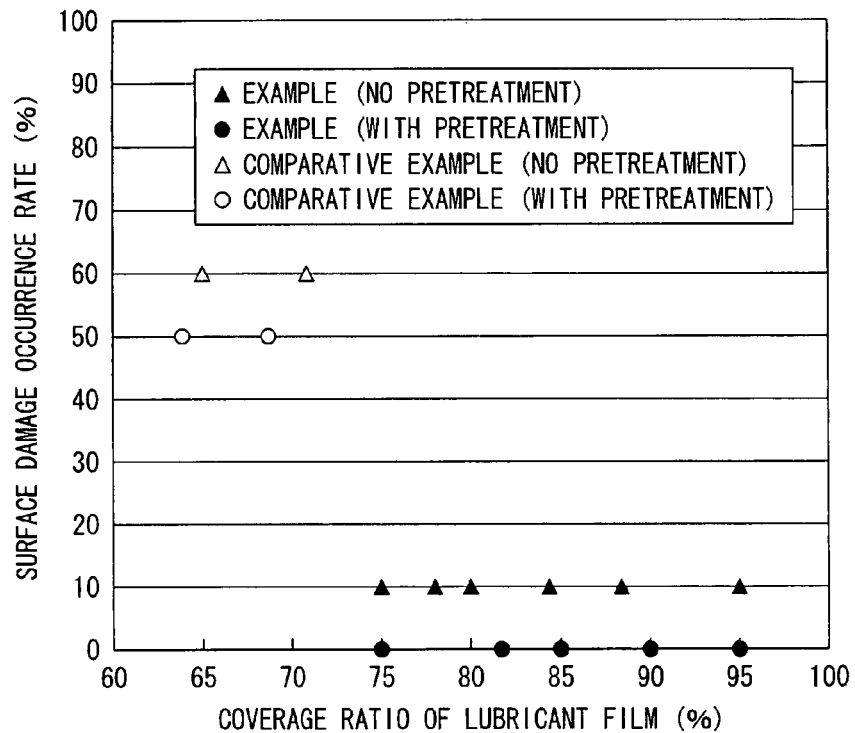
FIG. 23 is a graph illustrating the correlation between a lubricant film coverage ratio and the rate of occurrence of surface damage according to the seventh embodiment.

The samples of Examples 1 to 6 were not subjected to pretreatment and did not have minute dimples formed thereon. The samples of Examples 7 to 12 were subjected to pretreatment and had minute dimples formed thereon. As will be understood from the graph shown in FIG. 23, it is preferable to perform pretreatment and form minute dimples.

In Comparative Examples 4 to 7, although the lubricant film thickness is within a preferable range, the area ratio at which the lubricant film was coated is outside the preferable range, and thus the rate of surface damage occurrence is high in comparison to Examples 1 to 20. It was thus found that stipulation of only the lubricant film thickness is insufficient, and that stipulation of the area ratio at which to coat the lubricant film is important.

Next, tappet roller bearings for which a lubricant film was coated on the contact surface of the tappet roller with a support shaft (inside edge of tappet roller) or on the contact surface of the support shaft with the tappet roller (outside edge of support shaft), and a lubricant film was not coated on the contact surface of the tappet roller with a cam (outside edge of tappet roller), were mounted in a surface damage testing machine as illustrated in FIG. 21 and rotated to assess the life thereof.

The member on which a lubricant film was coated (tappet roller or support shaft), and the coverage ratio of the lubricant film that was coated on the contact surface of the tappet roller with the support shaft (inside edge of tappet roller) or on the contact surface of the support shaft with the tappet roller (outside edge of support shaft), the mean thickness of the lubricant film, the dimple depth and the center line average roughness Ra of the contact surface are as shown in Tables 11 and 12.

TABLE 11

| | | Lubricant Film | | | | Center Line Average | |
|---|---|---|---|---|---|---|---|
| | Pretreatment Type[1] | Coated Member | Coverage Ratio[2] | Thickness[3] | Dimple Depth[3] | Roughness Ra[3] | Life |
| Example 31 | None | Roller | 95 | 1.0 | 0.2 | 0.25 | 7.3 |
| Example 32 | None | Roller | 80 | 1.0 | 0.5 | 0.32 | 7.9 |
| Example 33 | None | Roller | 76 | 0.1 | 0.1 | 0.15 | 7.8 |
| Example 34 | None | Support shaft | 88 | 2.0 | 0.1 | 0.10 | 7.8 |
| Example 35 | None | Support shaft | 75 | 1.5 | 0.3 | 0.25 | 6.9 |
| Example 36 | None | Support shaft | 84 | 1.0 | 0.2 | 0.30 | 8.4 |
| Example 37 | Shot | Roller | 95 | 2.0 | 5.0 | 0.65 | 8.5 |
| Example 38 | Barrel | Roller | 75 | 3.0 | 1.0 | 0.40 | 8.6 |
| Example 39 | Shot | Roller | 80 | 8.0 | 4.0 | 0.50 | 9.0 |
| Example 40 | Barrel | Support shaft | 91 | 2.0 | 1.0 | 1.00 | 9.0 |
| Example 41 | Shot | Support shaft | 85 | 0.5 | 2.0 | 0.50 | 9.4 |
| Example 42 | Shot | Support shaft | 78 | 1.0 | 3.0 | 0.30 | 9.2 |
| Example 43 | None | Roller | 95 | 0.05 | 0.5 | 0.30 | 6.0 |
| Example 44 | None | Support shaft | 85 | 10 | 0.5 | 0.20 | 6.3 |

[1] shot: shot peening process; barrel: barrel treatment
[2] numerical values represent area percentage units
[3] numerical values represent μm units

TABLE 12

| | Pretreatment Type[1] | Coated Member | Lubricant Film | | | Center Line Average | |
| --- | --- | --- | --- | --- | --- | --- | --- |
| | | | Coverage Ratio[2] | Thickness[3] | Dimple Depth[3] | Roughness Ra[3] | Life |
| Example 45 | Shot | Roller | 88 | 0.05 | 2.0 | 0.25 | 6.0 |
| Example 46 | Barrel | Support shaft | 77 | 10 | 2.5 | 0.20 | 5.8 |
| Example 47 | None | Roller | 88 | 2.0 | 0.05 | 0.25 | 5.8 |
| Example 48 | None | Support shaft | 90 | 0.5 | 7.0 | 0.20 | 6.3 |
| Example 49 | Shot | Roller | 81 | 3.0 | 0.05 | 0.40 | 5.9 |
| Example 50 | Barrel | Support shaft | 75 | 1.0 | 7.0 | 0.30 | 5.3 |
| Comparative Example 31 | Barrel | Support shaft | 20 | 5 | 1.5 | 0.10 | 1.0 |
| Comparative Example 32 | None | — | 0 | — | — | 0.05 | 0.1 |
| Comparative Example 33 | Shot | — | 0 | — | 0.5 | 0.20 | 0.2 |
| Comparative Example 34 | None | Roller | 70 | 0.5 | 0.1 | 0.15 | 1.9 |
| Comparative Example 35 | None | Support shaft | 65 | 0.1 | 0.2 | 0.20 | 1.8 |
| Comparative Example 36 | Shot | Roller | 67 | 1.0 | 1.0 | 0.25 | 3.0 |
| Comparative Example 37 | Shot | Support shaft | 61 | 2.0 | 1.5 | 0.30 | 2.5 |

[1] shot: shot peening process; barrel: barrel treatment
[2] numerical values represent area percentage units
[3] numerical values represent μm units A rotation test was performed under the following conditions in a state in which lubricating oil was dropped between the outside edge of the tappet roller 506 and the outside edge of the ring 521, and lubricating oil was not dropped between the inside edge of the tappet roller 506 and the outside edge of the support shaft 505. The time until surface damage occurred on the inside edge of the tappet roller 506 and the temperature of the tappet roller 506 rose abnormally, or the time until a remarkable vibration occurred, or the time until the current value of the electric motor for driving the shaft 520 became an excess current value was regarded as the lifetime of the sample.

Figure 24:
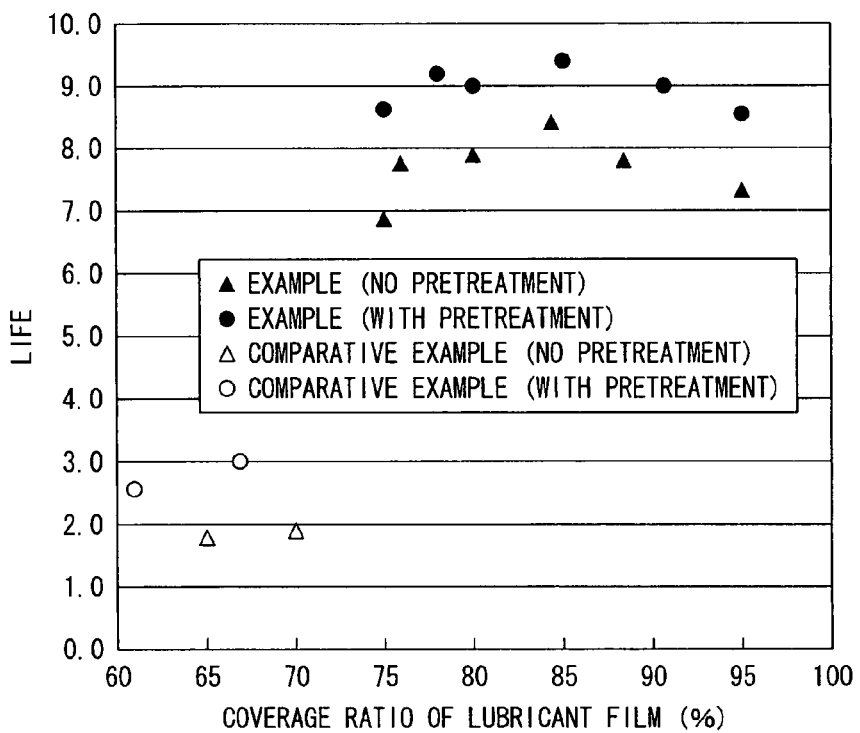
FIG. 24 is a graph illustrating the correlation between a lubricant film coverage ratio and the life of a tappet roller bearing according to the seventh embodiment.

Rotational speed of tappet roller: 2000 min$^{-1}$
Radial load: 1470N
Lubricating oil: engine oil
Lubricating oil temperature: 110° C.
Lubricating oil dropping amount: 0.4 ml/min The assessment results are shown collectively in Tables 11 and 12. The correlation between the coverage ratio of the lubricant film and the life of the tappet roller bearing is illustrated in the graph of FIG. 24. The numerical values for the life of the bearings as shown in Tables 11 and 12 and the graph of FIG. 24 represent relative values for a case where the life of the tappet roller bearing of Comparative Example 31 is taken as 1. The tappet roller bearing of Comparative Example 31 was obtained according to the prior art (technology described in the aforementioned Publication 8-3) in which a lubricant film is formed by baking a solid lubricant on the surface together with a thermosetting resin. Further, in Comparative Examples 32 and 33 the samples did not have a lubricant film, in Comparative Example 32 SF treatment was performed as pretreatment, and in Comparative Example 33 a two-stage shot peening process was performed as pretreatment.

As will be understood from Tables 11 and 12, since the lubricant film of Examples 31 to 50 is coated at an area ratio of 75% or more, the samples of these examples had a significantly longer life (5.3 or more) than those of Comparative Example 31 that are samples according to the prior art.

In Examples 31 to 36, pretreatment was not performed and minute dimples were not formed, while in Examples 37 to 42, pretreatment was performed and minute dimples were formed. As will be understood from the graph shown in FIG. 24, it is preferable to perform pretreatment and form minute dimples.

In Comparative Examples 34 to 37, although the lubricant film thickness is within a preferable range, the area ratio at which the lubricant film was coated is outside the preferable range, and the life of those samples was short in comparison to those of Examples 31 to 50. It was thus found that stipulation of only the lubricant film thickness is insufficient, and that stipulation of the area ratio at which to coat the lubricant is important.

Eighth Embodiment

This invention can be applied to a linear motion device such as a linear guide device or a ball screw. More specifically, provides a linear motion device comprising a shaft having a raceway surface on an outer surface, a linear motion body that has a raceway surface facing the raceway surface of the shaft and that is fitted onto the shaft so as to be relatively moveable in an axial direction, and a plurality of rolling elements that are rollably disposed between the raceway surface of the shaft and the raceway surface of linear motion body, characterized in that a lubricant film consisting of a solid lubricant is coated at an area ratio of no less than 75% on at least one member of the group consisting of the raceway surface of the shaft, the raceway surface of the linear motion body and the rolling contact surface of the rolling elements.

A material to be used as the raw material of the lubricant film is not particularly limited, and any material may be used as long as it has the strength necessary when used as a surface film of a constituent member of a linear motion device and has good adherence with the constituent member on which the lubricant film is to be formed. For example, molybdenum disulfide, tungsten disulfide, boron nitride, metallic soap, fluorocarbon resin, nylon, polyacetal, polyolefin, polyester, polyethylene, PTFE (polytetrafluoroethylene), graphite, calcium fluoride, barium fluoride, fluorocarbide, tin, tin alloy, nickel, copper alloy, pure iron, pure copper, and pure chromium may be mentioned.

This kind of linear motion device may be provided with a rolling element return path that circulates the rolling elements from the end point to the starting point of the rolling element rolling path that is formed between the two raceway surfaces. Further, a retaining piece having two concave sides that respectively face the rolling elements may be provided between neighboring rolling elements. The surface hardness of the rolling contact surface of the rolling elements is preferably no less than HRC 63.

The linear motion device according to this invention is described in detail hereunder taking the example of a ball screw.

Figure 26:
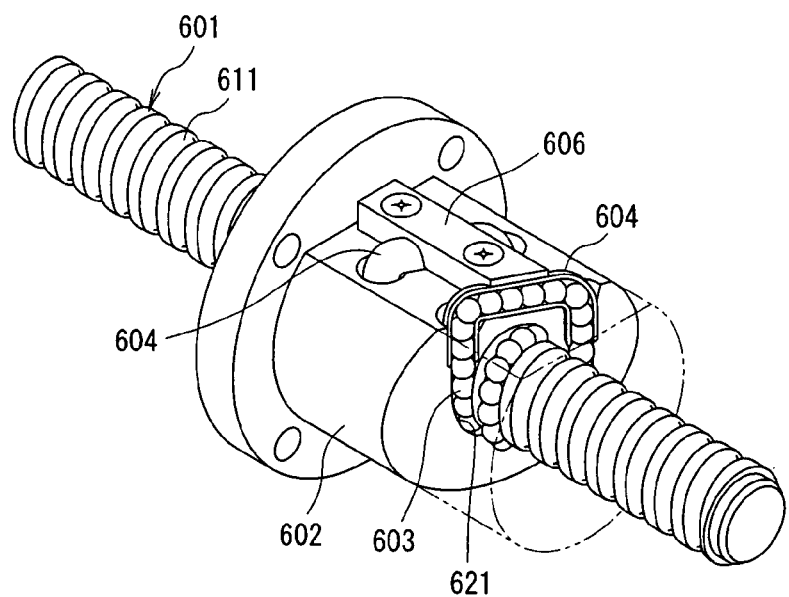
FIG. 26 is an oblique perspective view of one example of a ball screw.
Figure 27:
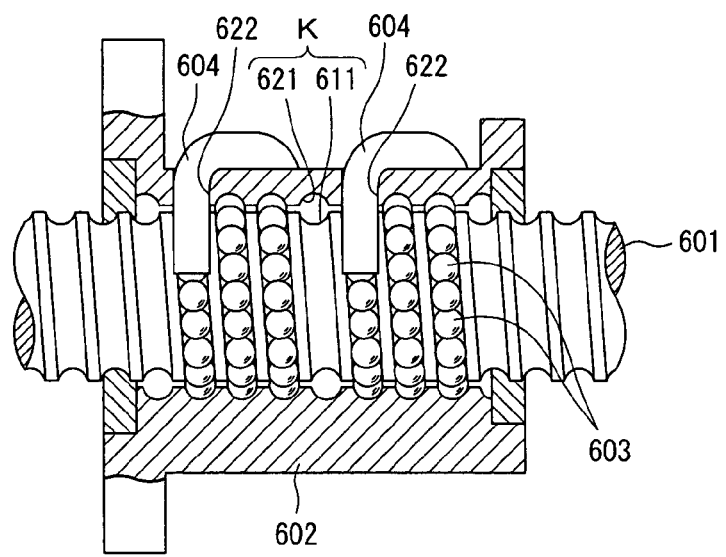
FIG. 27 is a cross section showing one example of a ball screw.

An example of a conventional ball screw is shown in FIG. 26 (oblique perspective view) and FIG. 27 (cross section). This ball screw is a tubular ball screw that uses a tube as a ball return path, and comprises a screw shaft 601, a nut 602, balls 603 and tubes 604.

Reference numeral 606 in FIG. 26 denotes a tube clamp that fixes the tubes 604 to the nut 602. This tube clamp 606 is omitted in FIG. 27. Helical grooves 611 and 621 are formed on the outside edge of the screw shaft 601 and the inside edge of the nut 602, and a raceway K for the balls 603 is formed by these grooves 611 and 621. Upon movement of the balls 603 in a loaded condition along the raceway K, the nut 602 makes a linear movement in a relative manner with respect to the screw shaft 601.

The tubes 604 are formed in a substantially gate shape, and the two ends thereof are inserted into through holes 622 that are provided in the cylinder constituting the nut 602, and are disposed to diagonally sandwich the screw shaft 601 so as to connect the starting point and end point of the raceway K. Accordingly, a ball 603 that reached the end point of the raceway K returns to the starting point of the raceway K through the tube 604. In this example, since two ball circulation paths (raceway+return path) are provided, the ball screw comprises two tubes 604.

A ball screw for a motor-driven injection molding machine or a pressing machine is a comparatively large and receives heavy load. More specifically, the ball screw repeats a reciprocating motion of rotating in reverse after temporarily stopping in a state in which the maximum load acted when the ball screw is used at a short stroke at which a heavy load is instantaneously applied. Since it is used under such severe conditions, conventionally the ball screw used for this purpose is one in which an assembly clearance is made extremely small (about 1/400 in proportion to the ball diameter) using a single nut. As a method for increasing the load capacity of the ball screw and extending the life thereof, a method that makes the ratio (R/D) of the radius (R) of a cross-sectional arc of the grooves 611 and 621 (of the screw shaft 601 and nut 602) with respect to the diameter (D) of the ball 603 smaller than the conventional 52.0 to 54.0% may be mentioned.

However, according to this method, the long axis of the contact ellipse with the grooves forming the raceway with the ball becomes longer than the conventional ball screw, and a sliding component increases. Accompanying this, since a tangential force within the contact ellipse increases, the possibility of surface origin flaking occurring or internal origin flaking occurring by white structure cannot be denied. Further, since the rolling speed of a ball is slower in a ball screw than in an ordinary rolling bearing such as a ball bearing, it is difficult to form an oil film. Hence, when making the ratio (R/D) less than 52.0 to 54.0% for a ball screw, it is necessary to devise a countermeasure to prevent premature damage.

The technology described hereunder may be mentioned as conventional examples of countermeasures that enhance the lubrication properties of a ball screw. JP-A-2001-49274 describes using a specific grease in order to prevent premature flaking of a ball screw used in a drive system of a motor-driven injection molding machine.

JP-A-6-109022 (hereafter, referred to as Publication 9-2) discloses technology that forms a solid lubricant film on at least a part of a friction surface of a sliding friction surface and a rolling friction surface of a mechanical component that used a rolling element by blasting fine particles comprising a soft metal such as gold, silver, lead, zinc, tin or indium, or polytetrafluoroethylene (PTFE) or perfluoro-alkoxyfluoro plastic (PTA) together with air from a nozzle.

JP-A-2004-60742 (hereafter, referred to as Publication 9-3) discloses technology that forms a lubricant film with a film thickness of 0.5 μm or less on a sliding contact section (surface) of at least one member of the group consisting of a ball, a groove of a nut, and a groove of a screw shaft of a ball screw by blasting fine particles of molybdenum disulfide onto the sliding contact section to adhere thereto. According to Publication 9-3, since the film thickness is 0.5 μm or less while that of the film formed by the method described in Publication 9-2 is 1 to 5 μm, the adherence of the film with respect to the sliding contact portion is improved and the film is less liable to peel, and it is described that even if peeling occurs, control can be carried out to lessen the change in the dimensions.

An object of the present invention is to extend the life of a ball screw that has a large load capacity.

To achieve the above described object, the present invention provides a screw shaft in which a helical groove is formed on an outside edge, a nut in which a helical groove is formed on an inside edge, a raceway in which a groove of a screw shaft and a groove of a nut are formed facing each other, a return path that connects an end point and a starting point of the raceway, and a plurality of balls that are disposed inside the return path and inside the raceway, characterized in that in at least one member of the group consisting of the screw shaft and the nut, the groove cross-section is a gothic arch shape (shape in which two arcs having the same radius and different centers are joined) and a ratio (R/D) of the radius (R) of the arcs forming the gothic arch of the groove cross-section with respect to the ball diameter (D) is no less than 51.0% and no more than 52.0%, and a solid lubricant film is formed on the surface of at least one member of the group consisting of the groove of the screw shaft, the groove of the nut, and the balls.

According to this ball screw, since the groove cross-section for at least one member of the group consisting of the screw shaft and the nut forms a gothic arch shape and the ratio (R/D) is no less than 51.0% and no more than 52.0%, the load capacity can be made large. Although the long axis of a contact ellipse between the grooves forming the raceway and the balls lengthens as a result and a sliding component increases, since a solid lubricant film is formed on the surface of at least one member of the group consisting of the groove of the screw shaft, the groove of the nut, and the balls, favorable lubrication properties are ensured and premature damage is prevented. Further, similarly to the first to seventh embodiments, dimples may be provided on the surface of the solid lubricant film, the groove of the screw shaft, the groove of the nut, or the balls.

Since a clearance between the balls and the raceway in the ball screw for a pressing machine or a motor-driven injection molding machine is no less than 5 μm and no more than 70 μm, by making the thickness of the solid lubricant film no less than 0.05 μm and no more than 8 μm (preferably, no less than 0.5 μm and no more than 3 μm), favorable lubrication properties can be obtained. As examples of the solid lubricant film, a film comprising molybdenum disulfide ($MoS_2$) or tin (Sn) may be mentioned. In the ball screw according to this invention, a retaining piece is preferably disposed between the balls.

According to the present invention as described above, a ball screw with a large load capacity and a long life is provided.

Figure 25:
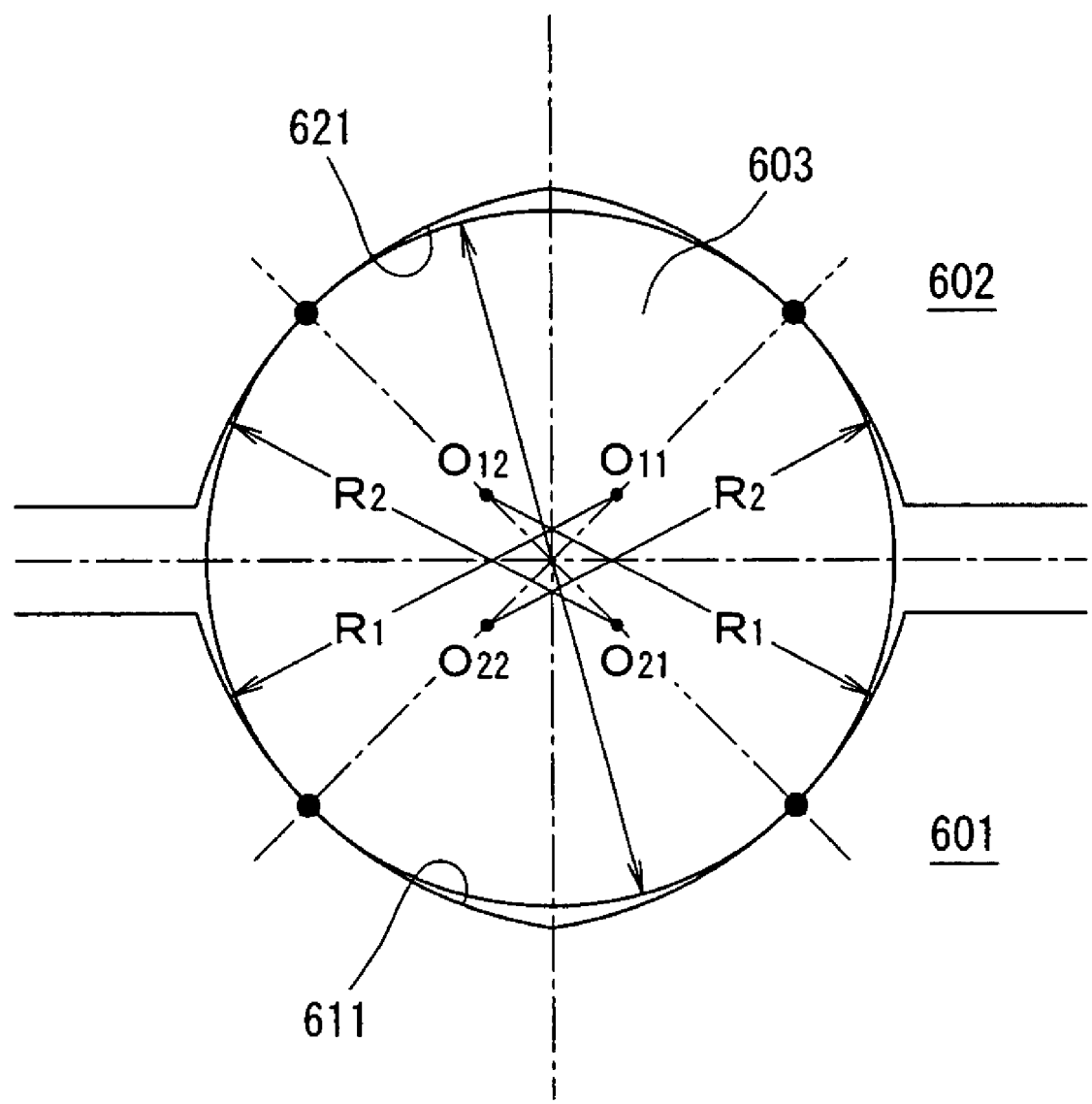
FIG. 25 is a view showing a groove cross section of a nut and a screw shaft of a ball screw according to the eighth embodiment.

Hereunder, the eighth embodiment is described. FIG. 25 is a view showing a cross section of the grooves of the nut and screw shaft of the ball screw according to this embodiment. The cross section of the groove 611 of the screw shaft 601 is formed in a gothic arch shape, i.e. a shape in which two arcs having the same radius ($R_1$) and different centers $O_{11}, O_{12}$ are connected. The cross section of the groove 621 of the nut 602 is also formed in a gothic arch shape, i.e. a shape in which two arcs having the same radius ($R_2=R_1$) and different centers $O_{21}, O_{22}$ are connected. Further, the ratio (R/D) of the radius (R) of the cross-sectional arcs of the grooves 611, 621 with respect to the diameter (D) of the ball 603 is no less than 51.0% and no more than 52.0%.

A film comprising molybdenum disulfide ($MoS_2$) is formed on the surface of the ball 603 at a thickness of no less than 0.5 μm and no more than 3.0 μm. A clearance between the ball 603 and a raceway formed by the grooves 611 and 621 of the screw shaft 601 and the nut 602 is no less than 5 μm and no more than 70 μm. Thus, the ball screw according to this embodiment has a larger load capacity and a longer life than a conventional ball screw.

Although according to this embodiment, a solid lubricant film is formed on the ball 603, a solid lubricant film may be formed on either or both members of the group consisting of the groove 611 of the screw shaft 601 and the groove 621 of the nut 602 without forming the solid lubricant film on the ball 603, or the solid lubricant film may be formed on the ball 603 and on either or both members of the group consisting of the groove 611 of the screw shaft 601 and the groove 621 of the nut 602. Further, the material of the solid lubricant film may be other than molybdenum disulfide ($MOS_2$) (for example, a material disclosed in the aforementioned Publication 9-2).

Figure 28:
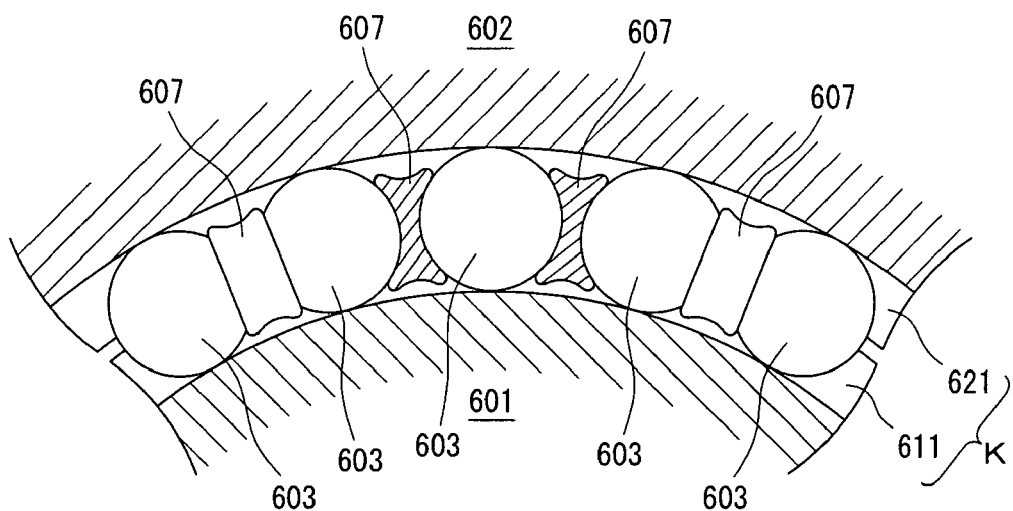
FIG. 28 is a partial cross section showing one example of a ball screw having a retaining piece.

Although a ball screw having an overall ball structure in which balls contact together was described according to this embodiment, as shown in FIG. 28, the ball screw according to this invention may have a structure in which retaining pieces 607 are disposed between the balls 603 to retain the balls 603 using the retaining pieces 607.

The retaining piece 607 can be obtained by forming a synthetic resin into a predetermined shape. Examples of a synthetic resin that can be used include a polyamide resin such as polyamide 6, polyamide 66, polyamide 64 or an aromatic polyamide, a polyacetal resin, polybutylene terephthalate, polybutylene terephthalate elastomer, polybutylene teraphthalate elastomer and the like. These synthetic resins may be mixed with glass fiber, carbon fiber, titanium fiber, potassium whiskers, aluminum borate whiskers or the like as a reinforcing material.

Figure 29:
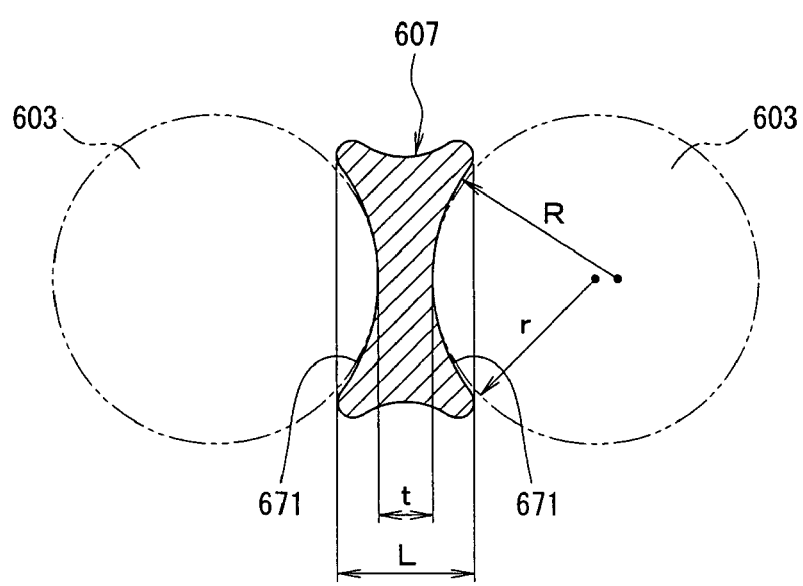
FIG. 29 is a cross section showing one example of a retaining piece.
Figure 30:
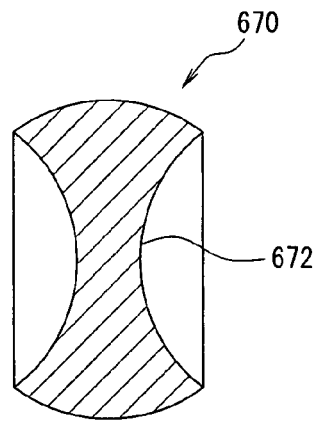
FIG. 30 is a cross section showing one example of a retaining piece.

The shape of the retaining piece illustrated in FIG. 29 and FIG. 30 may be mentioned as an example of the shape of the retaining piece. The retaining piece 607 shown in FIG. 29 has a substantially columnar shape, in which concavities 671 that receive the balls 603 are formed in the two bottom faces of the column. In the retaining piece 607, since the concavities 671 are formed such that a radius of curvature R is a larger spherical surface than the radius r of the ball 603, a thickness t of the center part of the retaining piece 607 is smaller than a thickness L of the periphery thereof. It is therefore possible to provide a plurality of balls 603 within the raceway K, and also reduce the contact area between the ball 603 and the retaining piece 607 to reduce the sliding resistance.

The concavities 671 of the retaining piece 607 can be formed in a gothic arch shape in which two arcs are connected or in a conical shape. Further, a through hole may be provided in the concavities 671 to retain lubricant within the through hole so as to decrease contact resistance with the balls 603. The size of the external diameter of the retaining piece 607 is designed to be less than the diameter of the ball 603 so that the retaining piece 607 can circulate smoothly when it passes within the raceway K and the tube 604, without interfering with the raceway K, the tube 604 or a contact part. More specifically, the external diameter of the retaining piece 607 is preferably 0.5 to 0.9 times the size of the diameter of the ball 603.

A retaining piece 670 shown in FIG. 30 is formed in a shape in which two sides that are mutually opposing sides of a spherical object are removed to form a concave spherical surface 672, and the outer circumference has a convex surface. Further, balls may be retained by a member in which a plurality of retaining pieces are connected by a connecting member. In addition to use with a motor-driven injection molding machine or a pressing machine, the ball screw of this invention is also be suitable for use with, for example, a brake of a vehicle or a continuously variable transmission (belt-type CVT) of a vehicle.

Example

Using a single-nut tubular ball screw "BS6316-10.5" manufactured by NSK Ltd., the ratio (R/D) of the radius ($R=R_1=R_2$) of arcs of a gothic-arch shaped groove cross section of the nut and the screw shaft as well as the film thickness and material of a solid lubricant film were varied as shown in Table 13 below, to perform a life test.

An $MoS_2$ (molybdenum disulfide) film and an Sn (tin) film were formed by shot peening while adjusting the process time to obtain films of predetermined thicknesses. The thicknesses of these films were calculated by measuring the ball diameter before and after film formation using an electrical dial gage and dividing a difference between the two values by two.

The specifications for "BS6316-10.5" are: number of active circuits: 3.5×3 rows; screw shaft external diameter: 65 mm; lead: 16 mm; ball diameter: 12.7 mm; BCD: 65 mm; unit clearance: 20 to 30 μm.

Each ball screw was mounted in a ball screw endurance and life testing machine made by NSK Ltd., and an endurance and life test was performed by causing the ball screws to make a reciprocating motion under the following conditions: test load (axial direction load): 300 kN; stroke: 80 mm; rotational speed: 500 $min^{-1}$; temperature: outer circumference of nut maintained at 80° C.; lubricant: "YS2 grease" made by LUBE Corporation was automatically supplied with an automatic grease feeder. This test measured the distance traveled until flaking occurred on either the groove of the nut or the screw shaft, or the ball as the life of the ball screw. Next, relative values that took the life on sample No. 10 as "1" were calculated based on the life obtained for each sample. These results are also shown below in Table 13.

TABLE 13

| No. | R/D (%) | Solid Lubricant Film | | Life (relative value) |
| --- | --- | --- | --- | --- |
| | | Material | Thickness (μm) | |
| 1 | 51.3 | MoS$_2$ | 0.4 | 1.11 |
| 2 | 51.7 | MoS$_2$ | 1.8 | 1.37 |
| 3 | 51.2 | MoS$_2$ | 1.3 | 1.62 |
| 4 | 51.5 | MoS$_2$ | 2.6 | 1.58 |
| 5 | 51.5 | MoS$_2$ | 3.6 | 1.20 |
| 6 | 51.4 | MoS$_2$ | 5.7 | 1.11 |
| 7 | 51.2 | Sn | 1.5 | 1.62 |
| 8 | 51.9 | Sn | 2.7 | 1.28 |
| 9 | 51.8 | Sn | 1.9 | 1.67 |
| 10 | <u>52.1</u> | None | | 1 |
| 11 | 51.6 | None | | 0.95 |
| 12 | <u>53.2</u> | MoS$_2$ | 2.2 | 1.06 |
| 13 | <u>52.5</u> | Sn | 2.8 | 1.02 |

Based on the results shown in this table, it was found that the ball screws denoted by Nos. 1 to 9 that correspond to examples of this invention had a longer life than those of Nos. 10 to 13 that correspond to comparative examples. Among the samples denoted by Nos. 1 to 9, while the life of the samples denoted by Nos. 2 to 4 and 7 to 9 in which the thickness of the solid lubricant film is no less than 1.5 μm and no more than 2.7 μm was 1.28 to 1.67 times the life of the sample denoted by No. 10, the life of the samples denoted by No. 1 with a film thickness of 0.4 μm, No. 5 with a film thickness of 3.6 μm and No. 6 with a film thickness of 5.7 μm was 1.11 to 1.20 times that of the sample denoted by No. 10. As will be understood from these results, the thickness of the solid lubricant film is preferably between 0.5 μm and 3.0 μm.

In Nos. 12 and 13, although a solid lubricant film of a thickness between 2.2 and 2.8 μm was formed, the ratio R/D is outside the range of this invention and therefore the samples denoted by Nos. 12 and 13 had a life that was approximately equal to that of No. 10. In No. 11, although the ratio R/D is 51.6%, a solid lubricant film was not formed and therefore the life of this sample was shorter than that of No. 10.

Ninth Embodiment

The present invention can also be applied to a metal cage to be incorporated into a rolling device. A rolling bearing as one example of a rolling device comprises an inner ring (inner member), an outer ring (outer member), a rolling element that is rollably disposed between the inner ring and the outer ring, and a cage that rollably supports the rolling element between the inner ring and the outer ring. To extend the rolling fatigue life (total number of rotations until a rolling component wears down and flaking appears on a part of the surface thereof due to repeated sheer stress received by the rolling surface accompanying rotational movement of the rolling bearing) of this kind of rolling bearing, a cage is commonly used in accordance with the environment in which the rolling bearing is to be used.

For example, a cage made of a resin such as 4-6 nylon or 6-6 nylon is generally used for a rolling bearing to be used in an environment that requires high speed rotation, self lubricity, low frictional properties, light weight, corrosion resistance, low noise levels and the like, while a metal cage such as a machined cage that is formed by planing or a pressed cage that is formed by a pressing process is generally used for a rolling bearing to be used in an environment that requires heat resistance or durability.

It is known that the rolling fatigue life of a rolling bearing is closely related to the lubrication state of the rolling surface thereof. More specifically, the quality of the lubrication state of the rolling surface is represented by the oil film parameter $\Lambda$ that is the ratio between the surface roughness of the rolling surface and the oil film thickness formed on the rolling surface. The oil film parameter $\Lambda$ is calculated by the formula $\Lambda = h/\sigma$. In this formula, h represents EHL oil film thickness, and $\sigma$ represents the composite surface roughness $\sqrt{(\sigma_1^2 + \sigma_2^2)}$ with respect to the roughness of two contacting surfaces (root-mean-square roughness) $\sigma_1$ and $\sigma_2$.

In this case, as the oil film parameter $\Lambda$ increases, the lubrication state improves since it becomes difficult for surface origin flaking due to contact between microspikes on the surfaces to occur. Conversely, as the oil film parameter $\Lambda$ decreases the lubrication state deteriorates since it becomes easier for surface origin flaking due to contact between microspikes on the surfaces to occur. As a result, seizure or peeling damage is liable to occur on the rolling surface and a failure such as a cage breakage is also liable to occur due to wear between a rolling element and the cage or between an inner ring and outer ring and the cage, thus shortening the rolling fatigue life.

Examples of bearings that are used in this kind of poor lubrication environment include a planetary gear bearing used in a transmission or the like or a compressor bearing used in an air conditioner or the like.

In a planetary gear bearing, since a helical gear is used so that transmission of force from a planetary gear (inner member) to a planetary shaft (outer member) is performed smoothly, the running track of the planetary shaft becomes distorted. The planetary gear bearing is also used in a condition of a high speed rotation that exceeds 10000 min$^{-1}$. Consequently, a cage that retains a needle roller that is disposed between the planetary gear and planetary shaft makes a sliding contact with the planetary gear due to the action of a centrifugal force and the distortion thereby causing the lubrication state to deteriorate, and as a result in some cases a remarkable degree of wear occurs and ultimately the bearing itself is damaged.

Further, from the viewpoint of enhancing fuel consumption accompanying $CO_2$ emissions controls in recent years, accompanying progress in lowering the viscosity of lubricating oils in order to increase torque at a time of high speed rotation, improved seizure resistance and durability at times of high speed rotation are also being demanded for planetary gear bearings.

In this case, although a resin cage as described above is generally used in a rolling bearing to be used in a high speed rotation condition, since the usage temperature for a planetary gear bearing is a high temperature of 150° C. or more, use of a resin cage in a planetary gear bearing will result in insufficient strength. Hence, metal cages are mostly used for planetary gear bearings regardless of whether the bearing is used under a high speed rotation condition.

However, in a case where needle rollers of a planetary gear bearing are provided in double rows and a shaft hole oiling system is employed in which a shaft hole is provided that communicates from the shaft end to inside the bearing and oil is fed through this shaft hole to increase durability or seizure resistance at times of high speed rotation, there is a problem that wear occurs at the outside edge of the metal cage when the amount of lubricating oil is insufficient.

A compressor bearing is used under a wide range of conditions that range from high-speed rotation to low-speed rotation and from an unloaded state to a heavily loaded state, in order to support a drive shaft that moves at a wide range of rotational speeds that range from low-speed rotation at idling time to high speed rotation at acceleration time. Similarly to the above described planetary gear bearing, a metal cage is also mostly used for the compressor bearing because the strength of a resin cage is insufficient.

However, when this compressor bearing is subjected to high speed rotation in an unloaded state there is a problem that a large amount of vibration occurs and the lubrication state becomes unfavorable, and thus wear is liable to occur at the outside edge of the cage or a needle roller may creep at a pocket part of the cage to damage the cage.

The technologies described in the following three publications have been proposed as technology for preventing this kind of wear.

Japanese Patent No. 2548811 (hereunder, referred to as Publication 10-1) proposes a mechanical component comprising a sliding surface that makes a sliding contact while receiving a thrust load, in which innumerable micro-dents are randomly provided in an independent manner on the sliding surface, the mean surface area of the micro-dents is from 35 to 150 µm$^2$, and the micro-dents are provided at an area ratio of 10 to 40%.

JP-A-2002-339083 (hereunder, referred to as Publication 10-2) proposes forming a solid lubricant film comprising a material for shot of molybdenum disulfide that contains approximately 95% by weight or more of molybdenum disulfide having an average grain size of approximately 1 µm to 20 µm on a material surface that comprises any of the group consisting of a metal, a resin, a glass and a ceramic.

JP-A-2004-60742 (hereunder, referred to as Publication 10-3) proposes adhering fine particles of molybdenum disulfide on a sliding-contact surface of at least one member of the group consisting of a screw shaft, a nut and a ball so as to form a solid lubricant film with a thickness of 0.5 µm or less thereon.

Recently, accompanying the downsizing of devices, the planetary gear bearings and compressor bearings as described above are being used under conditions of higher speed rotation and higher temperatures. For this reason, cages are required in which wear is difficult to occur and which can achieve a longer rolling fatigue life even when used under conditions of high speed rotation and high temperatures.

However, according to the technology described in the above described Publication 10-1, in a case where a low-viscosity lubricating oil is used or the amount of lubricating oil is insufficient, lubricating oil can not be adequately retained in the micro-dents and it is difficult to prevent wear.

Further, the above described Publication 10-2 only specifies the material of the solid lubricant film, and there is no description regarding the thickness or area ratio of a solid lubricant film that can make it difficult for wear to occur.

Furthermore, it is considered that according to the technology described in the aforementioned Publication 10-3, the adherence of the solid lubricant film is insufficient and the solid lubricant film will easily fall off. Further, accompanying the increasingly higher rotation speeds and higher temperature conditions under which the bearings are used, in some cases a solid lubricant film of a thickness of no more than 0.5 µm can not adequately prevent failures.

The present invention was made in view of the foregoing circumstances, and an object of this invention is to provide a cage for a rolling device in which wear is unlikely to occur and which can extend the rolling fatigue life, even when used in a rolling device to be used under conditions of high speed rotation and high temperature.

To achieve the above object, the present invention provides a metal cage that is used in a rolling device comprising an inner member having a raceway surface on an outer surface, an outer member having a raceway surface facing the raceway surface of the inner member and disposed outward of the inner member, and a plurality of rolling elements that are rollably disposed between the two raceway surfaces, wherein the cage retains the rolling elements between the inner member and the outer member, and a solid lubricant film is formed on the cage at an area ratio of 75% or more.

Thus, a favorable lubricity is provided on the metal cage and it is difficult for wear to occur due to sliding contact between the inner member and outer member and the rolling elements. It is therefore possible to lengthen the rolling fatigue life of a rolling device, even when used in a rolling device that is used under conditions of high speed rotation and high temperature.

In this invention, the term "rolling device" refers to, for example, a rolling bearing, a ball screw or a linear guide. When the rolling device is a rolling bearing, the terms "inner member" and "outer member" refer to an inner ring and an outer ring. When the rolling device is a ball screw, the terms "inner member" and "outer member" refer to a screw shaft and a nut. When the rolling device is a linear guide, the terms "inner member" and "outer member" refer to a guide rail and a slider.

According to this invention, the term "metal cage" refers to, for example, a cage formed with a cold-worked steel plate (SPCC or the like) and a low-alloy steel plate (SCM435 or the like), or a material obtained by subjecting these materials to a hardening heat treatment such as carburization or carbonitriding, or with a non-ferrous metal such as brass, and as examples thereof a machined cage or a pressed cage may be mentioned.

Further, according to this invention, a surface of a cage on which a solid lubricant film is formed is not particularly limited as long as it includes a surface on which wear is liable to occur, and examples thereof include a surface of a pocket part, an inside edge or an outside edge of the cage.

In this invention, a material to be used as the raw material of the solid lubricant film is not particularly limited, and any material may be used as long as it has the required strength when used as a surface film of a cage for a rolling device and has good adherence with the metallic material that is the raw material of the cage. For example, molybdenum disulfide, tungsten disulfide, boron nitride, metallic soap, fluorocarbon resin, nylon, polyacetal, polyolefin, polyester, PTFE (polytetrafluoroethylene), graphite, calcium fluoride, barium fluoride, tin, tin alloy and metallic oxide may be mentioned.

As a method for formation a solid lubricant film as described above, for example, coating, baking, thermal spraying, sputtering, ion plating, and shot peening may be mentioned. In particular, in consideration of enhancing the hardness of the cage surface after a solid lubricant film was formed, the application of a shot peening method is preferable.

On the cage for a rolling device according to the present invention, the thickness of the solid lubricant film is preferably no less than 0.10 µm and no more than 8.0 µm. Since the strength necessary as a cage can thus be obtained while retaining a favorable lubrication state, the rolling fatigue life can be further extended. In this case, if the solid lubricant film thickness is less than 0.10 µm, a favorable lubricity can not be obtained. In contrast, if the thickness exceeds 8.0 µm, the strength necessary as a cage can not be obtained.

Further, for the cage for a rolling device according to the present invention, micro-dents (dimples) of a depth of no less than 0.10 µm and no more than 5.0 µm are preferably formed on the surface on which the solid lubricant film is formed. Thereby, the solid lubricant film is filled into the micro-dents that are formed on the surface, thereby enabling the solid lubricant film to be adhesively formed on the surface of the cage, and thus the rolling fatigue life can be extended further. In this case, if the depth of the micro-dents is less than 0.10 µm a favorable adherence can not be obtained. In contrast, if the depth exceeds 5.0 µm, the obtained effect is saturated.

According to this invention, examples of a method for forming micro-dents on the surface of the cage include a method that performs a shot peening process using a shot material such as steel balls having a mean particle diameter of 45 µm as stipulated by JIS R6001, or silicon carbide, silicon dioxide, alumina or glass beads, or a barrel treatment, either independently or in combination.

For the cage for a rolling device according to the present invention, the micro-dents are preferably formed by a shot peening process. Thereby, since the hardness of the cage surface after formation of the micro-dents is enhanced, the rolling fatigue life can be further extended.

According to the cage for a rolling device of this invention as described above, by forming a solid lubricant film on the surface thereof at a specified area ratio, it is difficult for wear due to sliding contact between the inner member and outer member or rolling elements to occur. Hence, by using the cage for a rolling device according to this invention in a rolling device to be used under conditions of high speed rotation and high temperatures, the rolling fatigue life of the rolling device can be extended.

A rolling device comprising this kind of cage will have a long life, even when used under conditions of high speed rotation and high temperatures. In this rolling device, the aforementioned solid lubricant film may be formed on a section at which the cage and inner member, outer member or rolling elements contact.

More specifically, in a rolling device comprising an inner member having a raceway surface on an outer surface; an outer member having a raceway surface facing the raceway surface of the inner member and disposed outward of the inner member; a plurality of rolling elements that are rollably disposed between the two raceway surfaces; and a cage that retains the rolling elements between the inner member and the outer member; a lubricant film consisting of a solid lubricant may be coated on a portion that is equivalent to an area ratio of 75% or more of at least one member of the group consisting of the contact surface of the inner member with the cage, the contact surface of the outer member with the cage, the contact surface of the cage with the inner member, the contact surface of the cage with the outer member, and the contact surface of the cage with the rolling elements. In this case, as an example of the contact surface of the inner member and the outer member with the cage, the cage riding land may be mentioned. Further, as an example of the contact surface of the cage with the inner member and outer member, the surface of the cage that contacts the cage riding land may be mentioned.

Hereunder, the ninth embodiment is described while referring to the drawings. As shown in FIG. 1, a thrust needle roller bearing comprises an inner ring 1, an outer ring 2, a plurality of needle rollers 3 that are rollably disposed between an inner ring raceway surface 1a and an outer ring raceway surface 2a, and a cage 4 that movably retains the needle rollers 3. The bearing dimensions of the thrust needle roller bearing consist of an internal diameter of 40 mm, an external diameter of 70 mm, and a width of 5.5 mm.

Firstly, a pressed cage 4 made of cold-rolled steel plate type 1 (SPCC) that is used in a thrust needle roller bearing was produced in the manner described below.

Initially, a pretreatment was performed to from microdents (dimples) on the surface of pressed cages 4 for which "Yes" appears in the pretreatment column shown in Table 14.

In this connection, for the cages 4 for which "Yes (shot)" appears in the pretreatment column shown in Table 14, dimples were formed on each surface of the cage 4 by blasting steel balls having a mean particle diameter of 45 µm as stipulated by JIS R6001 as shot material, under conditions of a blasting pressure of 98 to 392 kPa and a blasting time of 10 to 20 min using a shot peening apparatus.

Further, for the cages 4 for which "Yes (barrel)" appears in the pretreatment column shown in Table 14, dimples were formed on each surface of the cage 4 by performing a rough-grinding process that mixes a variety of media and additives to form large dimples on the surface of the cage 4, and thereafter performing a finish-machining process that regularizes the roughness of a plateau portion (flat portion).

Next, a solid lubricant film was formed on the surface of the cage 4. More specifically, a solid lubricant film was formed on each surface of the cage 4 by blasting tin under conditions of a blasting pressure of 98 to 392 kPa and a blasting time of 10 to 20 min using a shot peening apparatus. The dimple depth and area ratio were measured in the same manner as the first embodiment.

Secondly, an inner ring 1, an outer ring 2 and needle rollers 3 to be used in a thrust needle roller bearing were manufactured in the allowing manner. First, high-carbon chromium bearing steel type 2 (SUJ2) was processed into a predetermined shape, subjected to carbonitriding for 3 hr in a mixed gas atmosphere (RX gas+enriched gas+ammonia gas) of 840° C., and then subjected to oil hardening and tempering. The amount of retained austenite in the respective surface layer portions (portion from surface to depth of 250 µm) of the inner ring 1, outer ring 2 and needle rollers 3 was then adjusted to 15 to 40 vol %, and the hardness of the surface layer portions was adjusted to HRC 62 to 67 (Hv 746 to 900).

A thrust needle roller bearing was assembled using the cage 4, inner ring 1, outer ring 2 and needle rollers 3 that were obtained in this manner, and a life test was performed under the conditions shown below that assumed use in an environment of high speed rotation and lubrication failure. This life test was conducted using a thrust-type bearing life tester as illustrated in FIG. 3. Since the structure of this thrust-type bearing life tester is the same as that described in the first embodiment, a description thereof is omitted here.

The life test was performed by rotating the thrust needle roller bearing until the vibration value reached five times the initial vibration value or until the temperature of the external diameter of the outer ring 2 reached 150° C., and the time from the start of the test to the end was regarded as the life of the bearing. This life test was performed 10 times for each example to calculate the average life of the respective samples. The results are shown in Table 14 as ratios with respect to a case in which the life of a sample denoted by No. 23 as a comparative example is taken as 1.

The cage denoted by No. 23 is a comparative example in which the dimples described in the aforementioned Publication 10-1 are formed on the surface thereof. The maximum surface roughness (Ra) of the surface on which the dimples are provided is 1.0 µm, the parameter (SK value) of the surface roughness is −2.0, the mean surface area of the dimples is 80 μm², and the area ratio of the dimples is 25%.

In this case, for thrust needle roller bearings for which the test was stopped when the vibration value reached five times the initial vibration value, the presence or absence of damage was checked using a stereomicroscope, and if damage was observed the test was ended and the time from the start of the test until the vibration value reached five times the initial vibration value was regarded as the life of the bearing, and if damage was not observed the test was restarted.

Further, for thrust needle roller bearings for which the test was stopped when the external diameter temperature of the outer ring 2 reached 150° C., it was considered that damage had occurred due to seizure and the test was ended, and the time from the start of the test until the external diameter temperature of the outer ring 2 reached 150° C. was regarded as the life of the bearing.

<Life Test Conditions>
Load: 5% of dynamic load rating (P/C=0.05)
Rotational speed: 12000 min$^{-1}$
Lubricating oil: mineral oil VG10
Ambient temperature: room temperature (about 28° C.)
Bearing temperature: 100-110° C. at external diameter of outer ring
Oil film parameter Λ: 0.1 to 0.5 surface thereof at an area ratio of less than 75%, and the length of the rolling fatigue life for the thrust needle roller bearings that used a cage 4 of Nos. 1 to 22 was greater by a multiple of 5.2 or more in comparison to use of the cage 4 denoted by No. 23.

In particular, based on the results of Nos. 1 to 6 and Nos. 7 and 8, as well as Nos. 9 to 15 and No. 16, it was found that the rolling fatigue life is further extended by making the area ratio of the solid lubricant film no less than 75% and no more than 95%.

Further, based on the results of Nos. 3, 17 and 18, Nos. 10 and 11, and Nos. 19 and 20, it was found that the rolling fatigue life is further extended by making the solid lubricant film thickness no less than 0.10 μm and no more than 8.0 μm.

In addition, based on the results of Nos. 1 to 8, Nos. 9 to 16, Nos. 11 and 12, and Nos. 21 and 22, it was found that the rolling fatigue life is further extended by making the depth of dimples no less than 0.10 μm and no more than 5.0 μm using a shot peening method. The reason for this is considered to be that the solid lubricant film is formed with greater adherence on the surface of the cage 4 by making the dimple depth within the aforementioned range, and that the surface hardness of the cage 4 is enhanced by the shot peening method.

Figure 31:
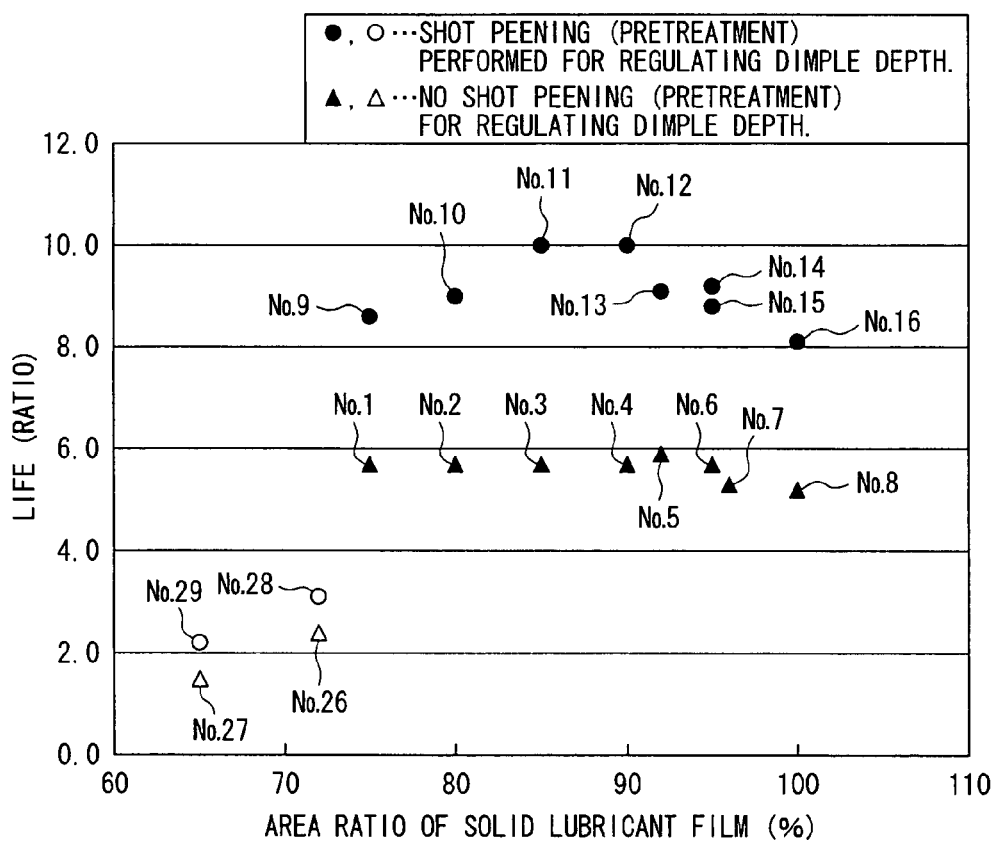
FIG. 31 is a graph that illustrates the relation between the area ratio of a solid lubricant film formed on the surface of a cage and the life according to the ninth embodiment.

The graph shown in FIG. 31 that illustrates the relationship between the area ratio of the solid lubricant film and the life

TABLE 14

| | | Composition of Cage | | | Life | |
|---|---|---|---|---|---|---|
| No. | Pretreatment | Film Area Ratio (%) | Mean Film Thickness (μm) | Dimple Depth (μm) | Test Result (ratio) | Remarks |
| 1 | None | 75 | 1.00 | — | 5.7 | Example |
| 2 | None | 80 | 0.10 | — | 5.7 | |
| 3 | None | 85 | 2.00 | — | 5.7 | |
| 4 | None | 90 | 0.40 | — | 5.7 | |
| 5 | None | 92 | 6.00 | — | 5.9 | |
| 6 | None | 95 | 3.00 | — | 5.7 | |
| 7 | None | 96 | 1.50 | — | 5.3 | |
| 8 | None | 100 | 8.00 | — | 5.2 | |
| 9 | Yes (shot) | 75 | 2.50 | 3.00 | 8.6 | |
| 10 | Yes (shot) | 80 | 0.80 | 0.30 | 9.0 | |
| 11 | Yes (shot) | 85 | 0.50 | 0.50 | 10.0 | |
| 12 | Yes (shot) | 90 | 3.50 | 0.80 | 10.0 | |
| 13 | Yes (shot) | 92 | 2.40 | 2.50 | 9.1 | |
| 14 | Yes (shot) | 95 | 1.50 | 3.00 | 9.2 | |
| 15 | Yes (shot) | 95 | 0.20 | 4.80 | 8.8 | |
| 16 | Yes (shot) | 100 | 1.50 | 2.00 | 8.1 | |
| 17 | None | 85 | 0.05 | — | 5.0 | |
| 18 | None | 85 | 10.0 | — | 5.1 | |
| 19 | Yes (shot) | 85 | 0.05 | 0.50 | 7.8 | |
| 20 | Yes (shot) | 80 | 10.0 | 0.30 | 5.0 | |
| 21 | Yes (shot) | 85 | 0.50 | 0.05 | 7.5 | |
| 22 | Yes (shot) | 90 | 3.50 | 6.00 | 9.0 | |
| 23 | Yes (barrel) | — | — | 0.30 | 1 | Comparative Example |
| 24 | Yes (shot) | — | — | 0.40 | 1.0 | |
| 25 | None | — | — | — | 0.4 | |
| 26 | None | 72 | 0.10 | — | 2.4 | |
| 27 | None | 65 | 2.40 | — | 1.5 | |
| 28 | Yes (shot) | 72 | 6.00 | 0.50 | 3.1 | |
| 29 | Yes (shot) | 65 | 0.80 | 0.30 | 2.2 | |

As shown in Table 14, for thrust needle roller bearings that used a cage 4 of Nos. 1 to 22 that had a solid lubricant film formed on the surface thereof at an area ratio of 75% or more, the rolling fatigue life was longer in comparison to the case of using a cage 4 of Nos. 23 to 25 that did not have a solid lubricant film formed on the surface thereof or a cage 4 of Nos. 26 to 29 that had a solid lubricant film formed on the was created based on the results of Nos. 1 to 16 and Nos. 26 to 29. As shown in FIG. 31, for thrust needle roller bearings that used the cage 4 on which a solid lubricant film was formed after the depth of dimples was regulated by a shot peening method, it was found that the life was longer than thrust needle roller bearings that used a cage 4 on which a solid lubricant film was formed without performing pretreatment.

Based on these results, it was found that by using the cage 4 that had a solid lubricant film formed at a specific area ratio on the surface thereof, the rolling fatigue life of the thrust needle roller bearing can be increased even when used in an environment of high speed rotation and lubrication failure.

It was also found that the rolling fatigue life of the thrust needle roller bearing can be further increased by specifying the depth of dimples or thickness of the solid lubricant film formed on the surface of the cage 4.

Although according to this embodiment a case was described of applying the cage for a rolling device according to this invention to a thrust needle roller bearing as one example of a rolling device, this invention is not limited thereto, and the cage for a rolling device according to this invention can also be favorably used with a rolling device to be used in an environment in which wear of a cage due to lubrication failure is a problem. Examples of this kind of rolling device include ball bearings such as a deep groove ball bearing, an angular ball bearing, a self-aligning ball bearing and a thrust ball bearing; roller bearings such as a cylindrical roller bearing, a self-aligning roller bearing and a thrust roller bearing; a linear motion device such as a ball screw, a linear guide and a linear motion bearing; and a rolling bearing unit such as a toroidal continuously variable transmission.

INDUSTRIAL APPLICABILITY

The rolling device according to this invention can be applied to engineering machinery and the like.

The invention claimed is:

1. A rolling device comprising an inner member having a raceway surface on an outer surface, an outer member having a raceway surface facing the raceway surface of the inner member and disposed outward of the inner member, and a plurality of rolling elements that are rollably disposed between the two raceway surfaces, characterized in that at least one of the group consisting of the raceway surface of the inner member, the raceway surface of the outer member, and the rolling contact surface of the rolling elements is coated with a lubricant film that consists of a solid lubricant of tin, which is formed by shot peening that accelerates tin as a shot material using an inert gas or an active gas, over an area that is equivalent to an area ratio of 80% or more.

2. The rolling device according to claim 1, characterized in that a thickness of the lubricant film is no less than 0.2 μm and no more than 8 μm.

3. The rolling device according to claim 2, characterized in that dimples of a depth of no less than 0.2 μm and no more than 5 μm are formed on a least a portion on which the lubricant film is coated among the group consisting of the raceway surface of the inner member, the raceway surface of the outer member, and the rolling contact surface of the rolling elements.

4. The rolling device according to claim 2, characterized in that a center line average roughness Ra of the surface of the lubricant film is no more than 1 μm.

5. The rolling device according to claim 1, characterized in that dimples of a depth of no less than 0.2 μm and no more than 5 μm are formed on a least a portion on which the lubricant film is coated among the group consisting of the raceway surface of the inner member, the raceway surface of the outer member, and the rolling contact surface of the rolling elements.

6. The rolling device according to claim 5, characterized in that a center line average roughness Ra of the surface of the lubricant film is no more than 1 μm.

7. The rolling device according to claim 1, characterized in that a center line average roughness Ra of the surface of the lubricant film is no more than 1 μm.

8. A ball screw applying the rolling device according to claim 1.

9. A tapered roller bearing applying the rolling device according to claim 1.

10. A radial needle bearing applying the rolling device according to claim 1.

* * * * *